United States Patent [19]
Sumita et al.

[11] Patent Number: 5,649,193
[45] Date of Patent: Jul. 15, 1997

[54] DOCUMENT DETECTION SYSTEM USING DETECTION RESULT PRESENTATION FOR FACILITATING USER'S COMPREHENSION

[75] Inventors: Kazuo Sumita; Hideki Hirakawa; Seiji Miike, all of Kanagawa-ken; Yumi Mizutani, Tokyo, all of Japan

[73] Assignee: Kabushiki Kaisha Toshiba, Kawasaki, Japan

[21] Appl. No.: 560,512

[22] Filed: Nov. 17, 1995

Related U.S. Application Data

[63] Continuation of Ser. No. 212,146, Mar. 14, 1994, abandoned.

[30] Foreign Application Priority Data

Mar. 12, 1993 [JP] Japan .................. 5-079149

[51] Int. Cl.$^6$ .................................................. G06F 17/30
[52] U.S. Cl. .................. 395/614; 395/612; 395/613
[58] Field of Search ...................... 395/600, 575, 395/425

[56] References Cited

U.S. PATENT DOCUMENTS

| | | | |
|---|---|---|---|
| 4,736,296 | 4/1988 | Katayama et al. | 364/419.08 |
| 4,839,853 | 6/1989 | Deerwester | 364/900 |
| 5,020,019 | 5/1991 | Ogawa | 364/900 |
| 5,095,521 | 3/1992 | Trousset et al. | 395/121 |
| 5,115,390 | 5/1992 | Fukuda et al. | 364/146 |
| 5,123,103 | 6/1992 | Ohtaki et al. | 395/600 |
| 5,220,625 | 6/1993 | Hatakeyama et al. | 382/54 |
| 5,257,186 | 10/1993 | Ukita et al. | 364/419.1 |
| 5,265,065 | 11/1993 | Turtle | 395/600 |
| 5,280,573 | 1/1994 | Kuga et al. | 395/145 |
| 5,301,109 | 4/1994 | Landauer et al. | 364/419.19 |
| 5,317,647 | 5/1994 | Dagallo | 382/14 |
| 5,321,608 | 6/1994 | Namba et al. | 364/419.08 |
| 5,408,655 | 4/1995 | Oren et al. | 395/600 |
| 5,463,773 | 10/1995 | Sakakibara et al. | 395/600 |

OTHER PUBLICATIONS

Wendlandt, E.B. et al., Proc. 14th Annual Int. ACM/SIGIR Conf. on Research and Development in Information Retrieval, Incorporating a Semantic Analysis into a Document Retrieval Strategy, Oct. 13, 1991, Chicago, IL, pp. 270–279.

Sutcliffe, R.F.E., Proc. 14th Annual Int. ACM/SIGIR Conf. on Research and Development in Information Retrieval, Distributed Representations in a Text Based Information Retrieval System; A New Way of Using the Vector Space Model, pp. 123–132, Oct. 1991.

Research Disclosure, No. 346, Extending the Vector Space Model to Include a Reading Level Dimension, Feb. 1993, p. 156.

E.D. Liddy et al., "DR-LINK Project Description", ACM SIGIR Forum, vol. 26, No. 2, 1992, pp. 39–43.

*Primary Examiner*—Thomas G. Black
*Assistant Examiner*—C. Lewis
*Attorney, Agent, or Firm*—Foley & Lardner

[57] ABSTRACT

A document detection system using a detection result presentation that can facilitate a user's quick comprehension of the relevancy of each detected document. In this system, a user's input for commanding a document detection is analyzed to extract keywords and viewpoints relevant to each keyword contained in the user's input, and a detection command is constructed from the keywords and the viewpoints extracted from the user's input. Then, the detection operation is executed to detect those documents among a plurality of stored documents which match with the constructed detection command as detected documents for a detection result. The detection result can be presented in the multi-dimensional display formed by setting the viewpoints to axes with the detection command as an origin and using distances of the detected documents with respect to the origin for each viewpoint as coordinates of the detected documents with respect to each axis representing each viewpoint.

21 Claims, 52 Drawing Sheets

FIG. 6

| | |
|---|---|
| (WITH AN OBJECT OF) | ⇒OBJECT |
| (CONCLUDE [PAST TENSE] ) | ⇒CONCLUSION |
| (OBTAIN [PAST TENSE, PASSIVE VOICE] ) | ⇒CONCLUSION |
| (DEVELOP [PAST TENSE] ) | ⇒CONCLUSION |

FIG. 7

| (FORMAT) | (EXAMPLES) |
|---|---|
| ⟨KEYWORD⟩ : <br> ⟨VIEWPOINT LIST⟩ | COMPUTER : OBJECT <br> DESIGN : OBJECT, CONCLUSION <br> TOOL : CONCLUSION <br> EXAMPLE : CONCLUSION |

FIG.10

| HEAD CHARACTER STORAGE REGION | SUBSEQUENT CHARACTER STORAGE REGION |
|---|---|
| 00053  機, 00305, 0, 0 | 00305  械, 00623, 0, file4, CONCLUSION, 0 |
| 00091  計, 00356, 0, 0 | 00321  機, 0, file30, OBJECT, CONCLUSION, 0 |
| 000AD  算, 00A15, 00A16, 0, 0 | 00335  計, 0, file30, CONCLUSION, file 31, OBJECT, 0 |
| 000B3  事, 00390, 0, 0 | 00356  算, 00321, 0, file81, BACKGROUND, 0 |
| 000B4  自, 00411, 0, 0 | |
| 000G1  設, 00335, 0, 0 | 00390  象, 0, file45, OBJECT, CONCLUSION, 0 |
| 000E5  翻, 00512, 0, 0 | 00411  動, 00623, 0, file21, BACKGROUND, 0 |
| | 00512  訳, 0, file21, OBJECT, 0 |
| | 00623  翻, 00914, 0, 0 |
| | 00914  訳, 0, file25, OBJECT, file21, CONCLUSION, 0 |
| | 00A15  法, 0, file24, OBJECT, BACKGROUND, 0 |
| | 00A16  術, 0, file28, CONCLUSION, 0 |

FIG.11

(FORMAT)

⟨DOCUMENT ID$_1$⟩ ; ⟨DISTANCE $_{11}$⟩ , ⟨DISTANCE $_{12}$⟩ , ⋯ , ⟨DISTANCE $_{1N}$⟩ /
⟨DOCUMENT ID$_2$⟩ ; ⟨DISTANCE $_{21}$⟩ , ⟨DISTANCE $_{22}$⟩ , ⋯ , ⟨DISTANCE $_{2N}$⟩ /
⋯
⟨DOCUMENT ID$_K$⟩ ; ⟨DISTANCE $_{K1}$⟩ , ⟨DISTANCE $_{K2}$⟩ , ⋯ , ⟨DISTANCE $_{KN}$⟩ /

(EXAMPLES)

file 21 ; 0.7,0.7,0.1/
file 28 ; 0.5,0.0,0.9/
file 29 ; 0.4,0.2,0.4/
file 30 ; 0.4,0.1,0.3/
file 35 ; 0.2,0.2,0.5

| (FORMAT) | (EXAMPLE) |
|---|---|
| ⟨DETECTION NODE ID⟩. | 11. |
| ⟨PARENT NODE ID⟩. | 10. |
| ⟨DETECTION COMMAND⟩. | COMPUTER : OBJECT / DESIGN : OBJECT,CONCLUSION / TOOL : CONCLUSION |
| ⟨DETECTION RESULT⟩. | file21 ; 0.7, 0.7, 0.1 / file28 ; 0.5, 0.0, 0.9/ file29 ; 0.4, 0.2, 0.4 / file30 ; 0.4, 0.1, 0.3/ file35 ; 0.2, 0.2, 0.5 |

FIG. 19
(a)
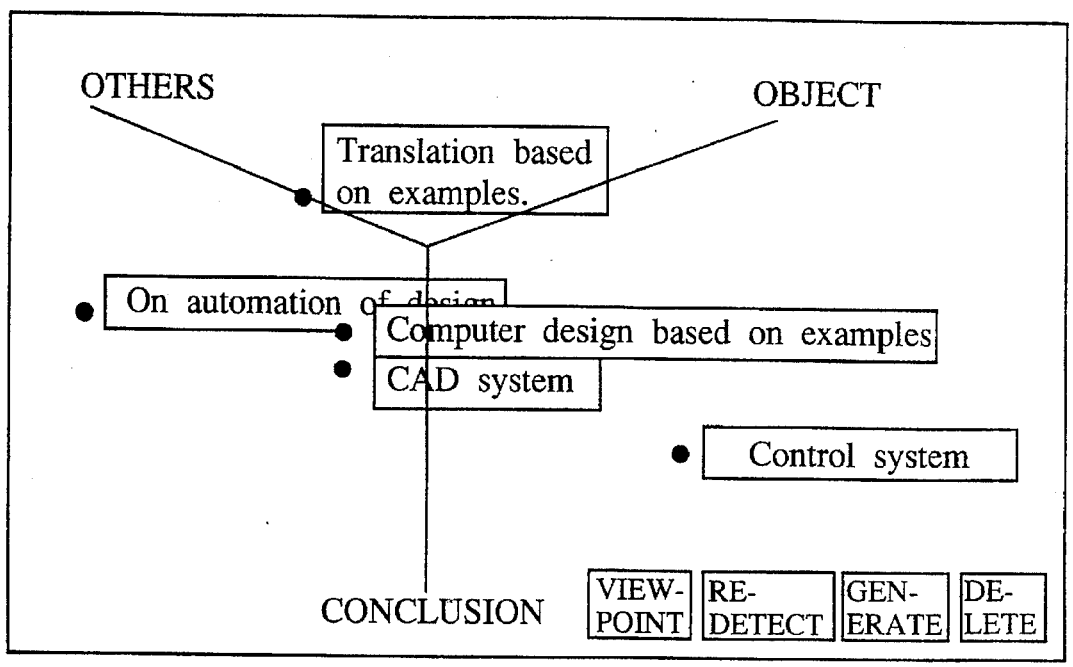
(b)
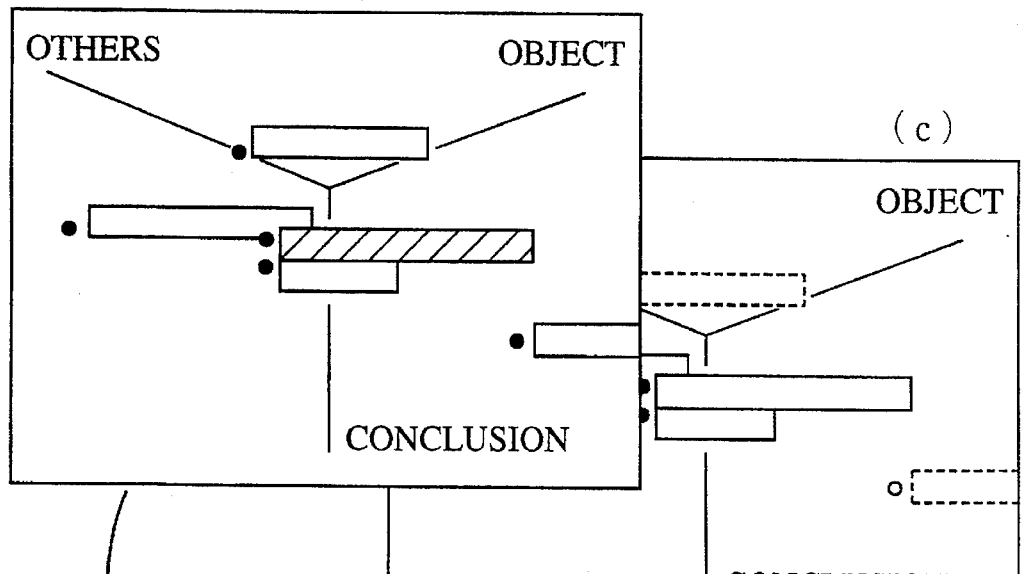
(c)
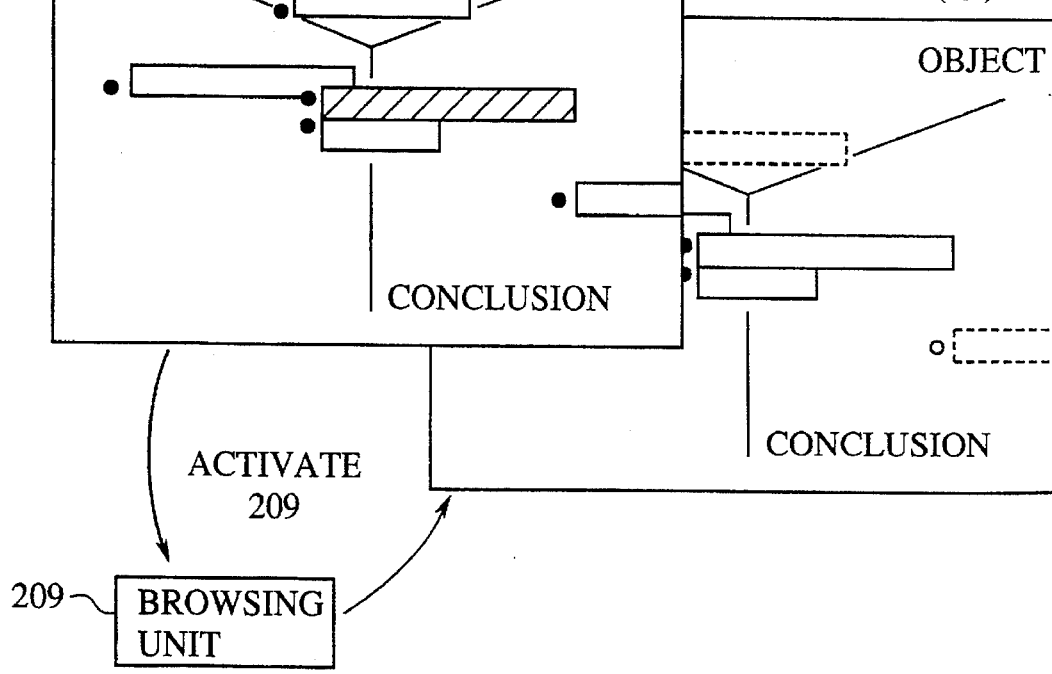

FIG.20

(FORMAT)

⟨DOCUMENT ID$_1$⟩ ; ⟨ACCEPT/REJECT DATA $_1$⟩ /
⟨DOCUMENT ID$_2$⟩ ; ⟨ACCEPT/REJECT DATA $_2$⟩ /
⋮
⟨DOCUMENT ID$_K$⟩ ; ⟨ACCEPT/REJECT DATA $_K$⟩ 。

(EXAMPLES)

file 21 ; 0.

file 28 ; 0.

file 30 ; 1.

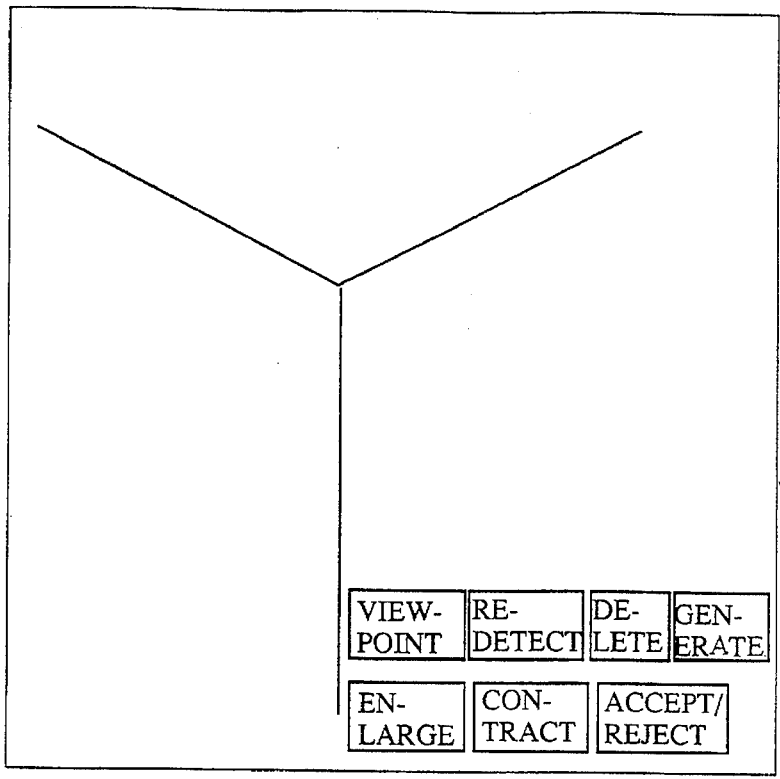
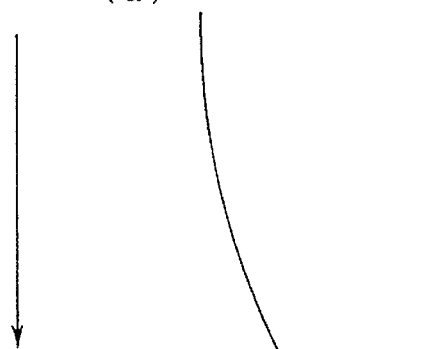
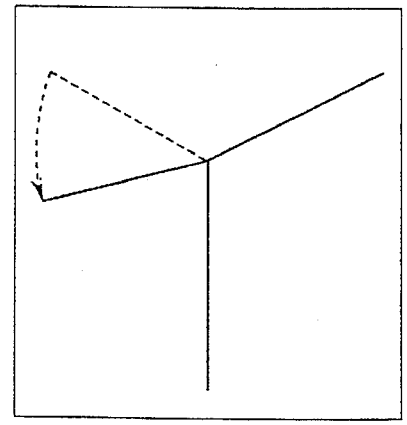
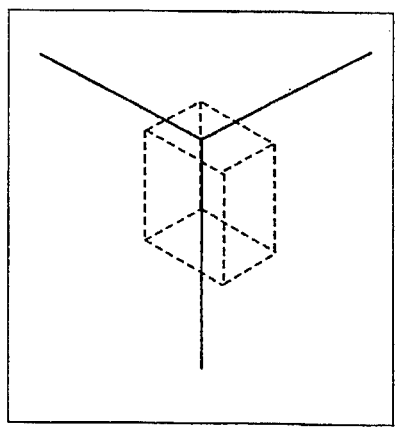
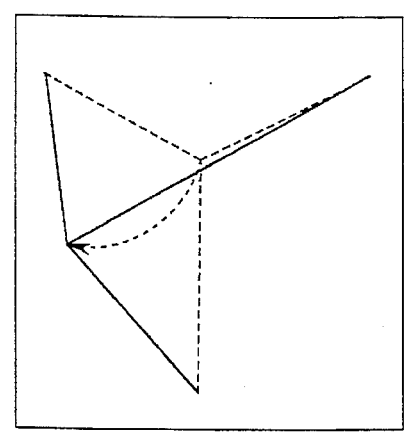
FIG.25

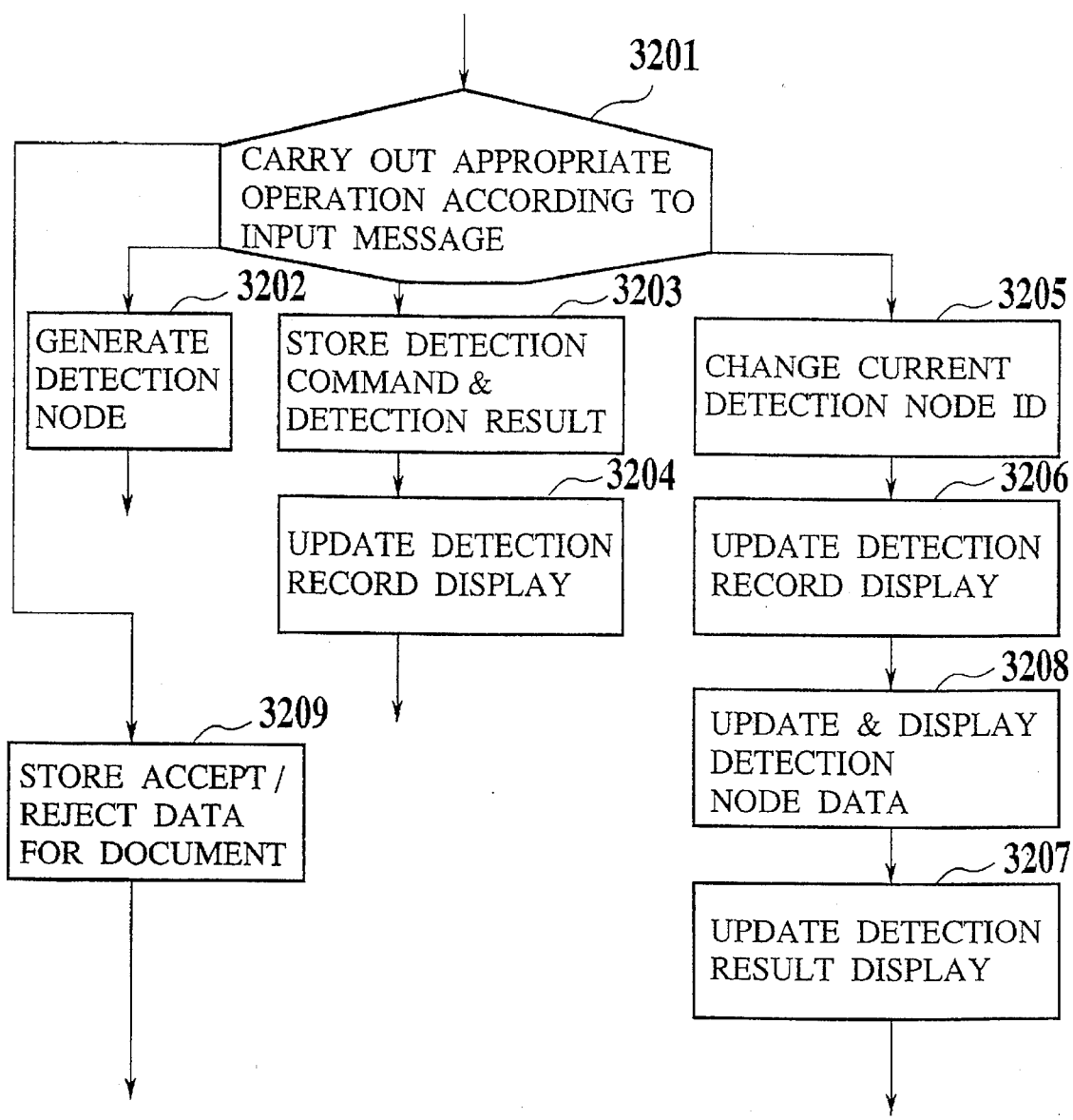

FIG.33

| (FORMAT) | (EXAMPLE) |
|---|---|
| ⟨DETECTION NODE ID⟩ . | 12. |
| ⟨PARENT NODE ID⟩ . | 10. |
| ⟨DETECTION DATE & TIME⟩ . | 1993012535846 |
| ⟨DETECTION INPUT RESULUT⟩ . | A design tool based on examples developed with an object of a computer design. |
| ⟨DETECTION COMMAND⟩ . | COMPUTER ; OBJECT/DESIGN ; OBJECT, CONCLUSION/TOOL ; CONCLUSION/EXAMPLE ; CONCLUSION |
| ⟨# OF DETECTED DOCUMENTS⟩ . | 61. |
| ⟨DETECTION RESULT⟩ . | file21 ; 35, 35, 5 / file28 ; 25, 0, 45/ file29 ; 20, 10, 20 / file30 ; 20, 5, 15/ file35 ; 10, 10, 25 |
| ⟨# OF OK DOCUMENTS⟩ . | 1. |
| ⟨ OK DOCUMENTS⟩ . | file 30. |
| ⟨# OF NG DOCUMENTS⟩ . | 2. |
| ⟨NG DOCUMENTS⟩ . | file21. file28. |

FIG.36

| DETECTION DATE & TIME | | 1993 ; 01/25 ; 13 : 58 |
|---|---|---|
| DETECTION INPUT SENTENCE | | A design tool based on examples developed with an object of a computer design. |
| VIEWPOINT | OBJECT | COMPUTER , DESIGN |
| | CONCLUSION | EXAMPLE , DESIGN , TOOL |
| # OF DETECTED DOCUMENTS | | 61 |
| # OF OK DOCUMENTS OK DOCUMENTS | | 1<br><br>"Computer design based on examples" |
| # OF NG DOCUMENTS NG DOCUMENTS | | 2<br><br>"Control system"<br>"Translation based on examples" |

FIG.42
(a)
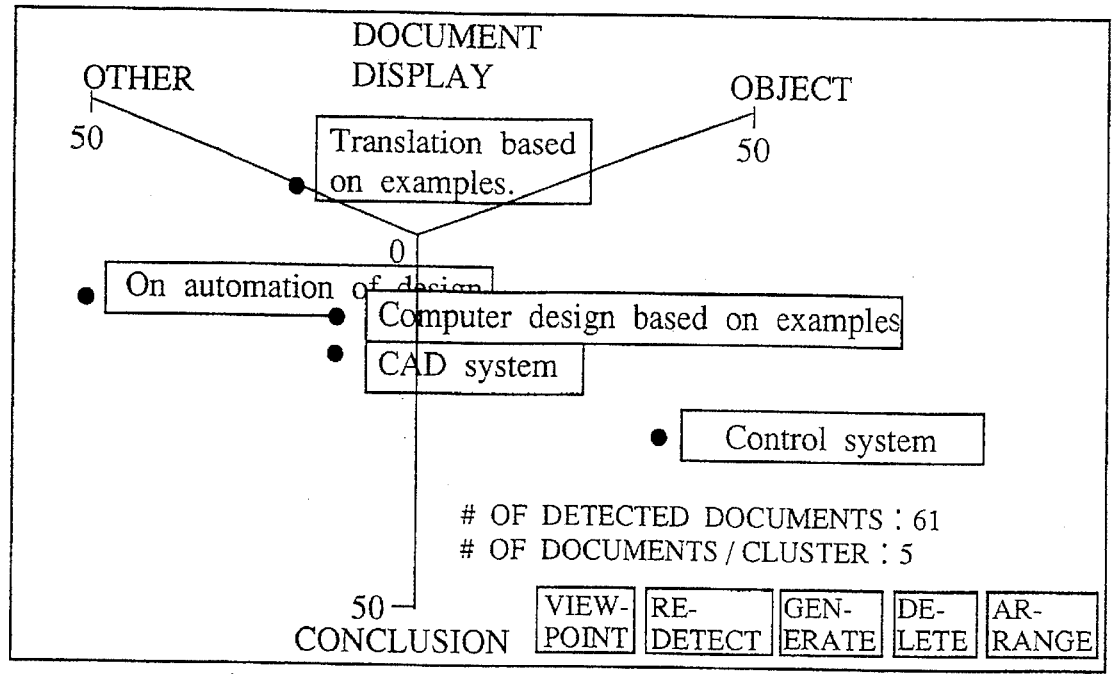
(b)
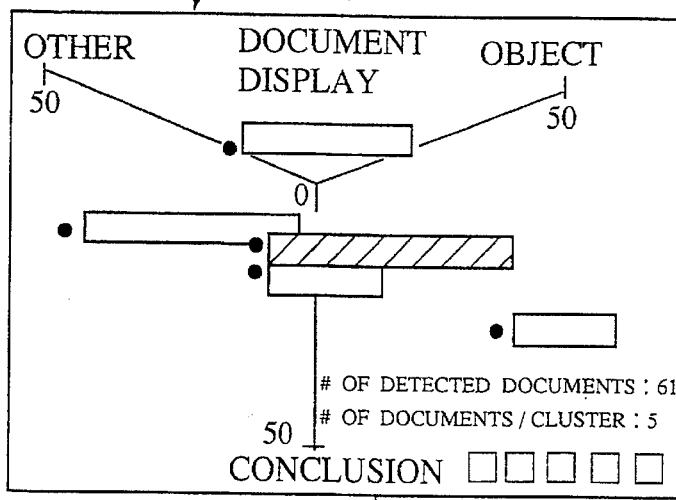
(c)
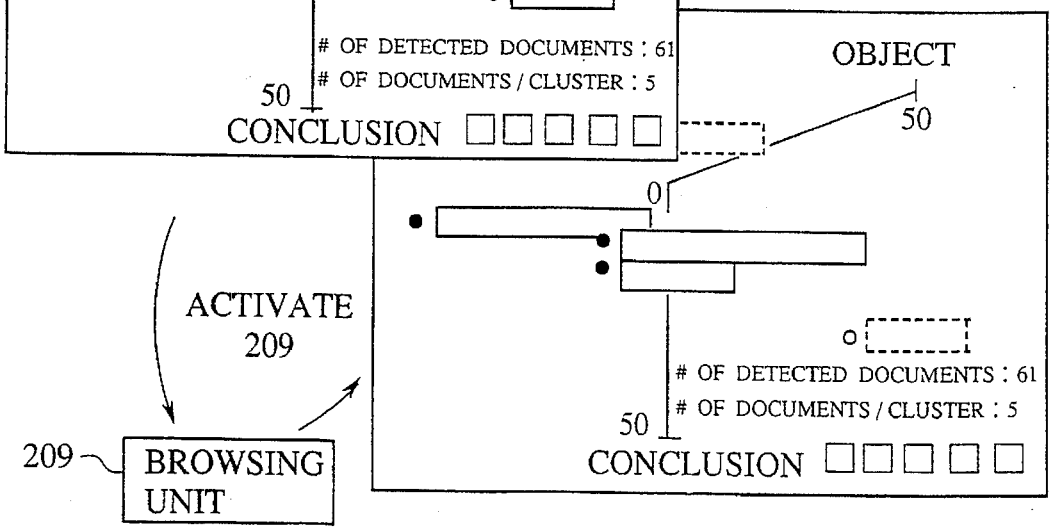

FIG.49

| | OBJECT | CON-CLUSION | BACK-GROUND | METHOD | OTHERS |
|---|---|---|---|---|---|
| 1 Translation based on examples | 0 | 0 | 20 | 60 | 30 |
| 2 Computer design based on examples | 0 | 0 | 30 | 50 | 40 |
| 3 Research on design automation | 0 | 10 | 28 | 50 | 30 |
| 4 CAD system | 0 | 20 | 10 | 30 | 50 |
| 5 Construction of large scale knowledge base | 30 | 10 | 67 | 51 | 36 |
| 6 Analysis and thoughts on citations | 42 | 29 | 0 | 67 | 19 |
| 7 Data extraction and user adaptation | 50 | 13 | 78 | 19 | 42 |
| 8 Control system | 50 | 15 | 18 | 36 | 29 |
| 9 CASE and knowledge base | 60 | 11 | 23 | 51 | 81 |
| 10 | | | | | |
| 11 | | | | | |
| 12 | | | | | |

FIG.50

| | TOTAL | OBJECT | CONCLUSION | BACKGROUND | METHOD | FEATURE |
|---|---|---|---|---|---|---|
| 1 TECHNICAL REPORT DATABASE | 3162 | 3019 | 3160 | 2816 | 3102 | 1987 |
| 2 REFERENCE ABSTRACT DATABASE | 1513 | 1312 | 1463 | 721 | 1096 | 854 |
| 3 SEARCH REPORT DATABASE | 691 | 689 | 690 | 510 | 613 | 303 |
| 4 USER MANUAL | 57 | 46 | 9 | 6 | 55 | 51 |
| 5 DRAWINGS MANAGEMENT DOCUMENT | 236 | 178 | 12 | 8 | 6 | 13 |
| 6 PRODUCT CATALOG | 43 | 21 | 13 | 7 | 24 | 18 |

(SELL (FROM (MONTH) / (DAY) / (YEAR) ) ) $\Rightarrow$ SALES DATE
(SELL (FOR (PRICE) ) ) $\Rightarrow$ PRICE
(IS ( (NUMBER) MIPS) ) $\Rightarrow$ PROCESSING SPEED

FIG.53A
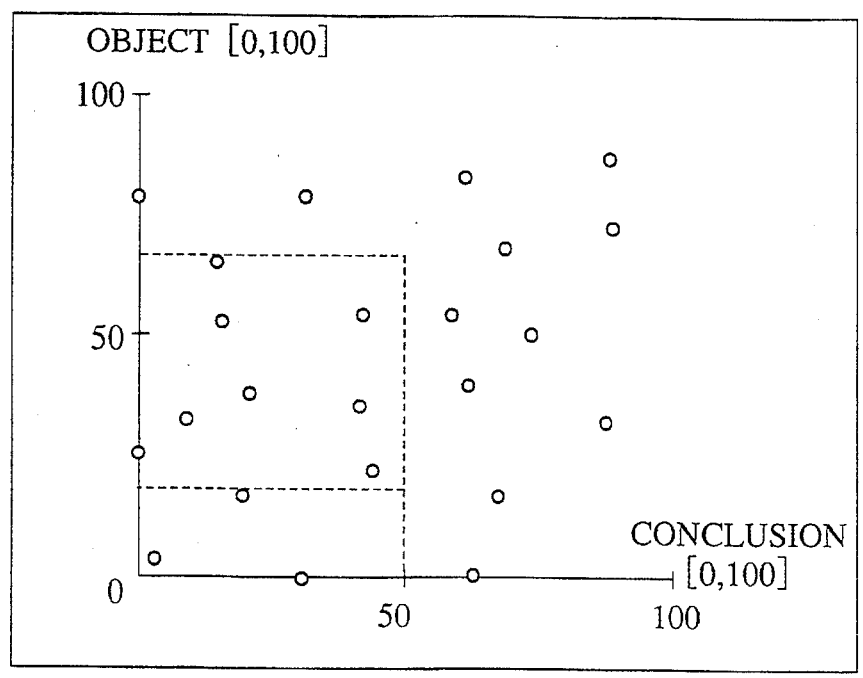
FIG.53B
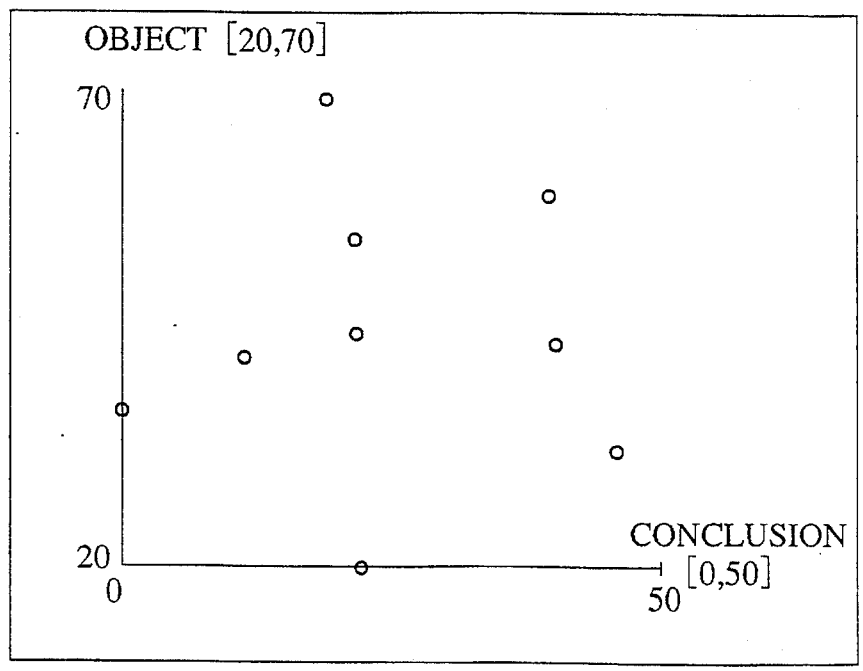
FIG.54
(CONCLUDE [PAST TENSE]) ⇒ CONCLUSION, 2
(DEVELOP [PAST TENSE]) ⇒ CONCLUSION, 1

DOCUMENT DETECTION SYSTEM USING DETECTION RESULT PRESENTATION FOR FACILITATING USER'S COMPREHENSION

This application is a continuation of application Ser. No. 08/212,146, filed Mar. 14, 1994 and now abandoned.

BACKGROUND OF THE INVENTION

1. Field of the Invention

The present invention relates to a document detection system for detecting desired documents from a large number of documents stored in a document database. It is to be noted that the term "retrieval" is often used in the literature of the field instead of the term "detection" used in the following description. The present specification adheres to the use of the term "detection" throughout.

2. Description of the Background Art

In recent years, due to the significant progress and spread of computers, the electronic manipulations of documents are becoming increasingly popular as in the electronic news and electronic mail systems and the CDROM publications of data sources such as dictionaries and encyclopedia that had previously only been available in hard copy. It is expected that this trend of electronic manipulation of documents will continue at an increasing pace in future.

In conjunction with such electronic manipulation of documents, much attention has been given to a document detection system for detecting desired documents from a large number of documents efficiently, so as to enable the effective utilization of the documents stored in a database system.

As a conventionally available document detection system, there has been a system which uses keywords in combination with logic operators such as AND, OR, NOT or proximity operators for specifying numbers of characters, sentences, and paragraphs that can exist between keywords, and detects a document by using a specified combination of keywords and operators as a detection key.

However, in such a conventional document detection system, the detection result has been informed by displaying either a number of detected documents or titles of the detected documents alone, so that in order for the user to check each of the detected documents to see if it is the desired document or not, it has been necessary for the user to read the entire content of each of the detected documents one by one, and this operation has been enormously time consuming.

Moreover, in the conventional document detection system, in displaying the titles of the detected documents, the titles are simply arranged in a prescribed order according to the user's query such as an order of descending similarities to the keywords used in the detection key. For this reason, it has been impossible for the user to comprehend the relative relationships among the detected documents and the level of similarity with respect to the detection command for each of the detected documents from the displayed detection result, and consequently it has been difficult for the user to have an immediate impression for the appropriateness of the displayed detection result.

Furthermore, in the conventional document detection system, the detection scheme is limited to that in which each document as a whole is treated as a single entity, so that the document containing the desired content in the background section and the document containing the desired content in the conclusion section will be detected together in mixture. In other words, the detection result contains variety of documents regardless of the viewpoint in which the desired content appear in the documents. For example, if there is no interest in what had been done in the past, the detected document which matches with the given keywords in the background section will be of no use. Yet, in the conventional document detection system, the documents having different perspectives such as the document containing the desired content in the background section and the document containing the desired content in the conclusion section will not be distinguished, and the mixed presence of these documents in different perspectives makes it extremely difficult for the user to judge the appropriateness of the detection result.

In view of these problems, there has been a proposition for a scheme to reduce the burden on the user to read entire content of each detected document by displaying only a portion of each detected document. However, in such a scheme, it is often impossible to make a proper judgement as to whether it is the desired document or not unless the relationship of the displayed portion and the remaining portion becomes apparent. For example, when the background section containing the desired content is displayed for one document while the conclusion section containing the desired content for the other document, as these documents cannot be comprehended in a unified viewpoint, it is difficult for the user to make a proper judgement as to which one of these document is the necessary one. As a result, in order to fully comprehend the perspectives of the displayed portions in these documents, the user would be forced to read the entire contents of these documents eliminating any practical reduction of the burden on the user.

Also, there has been a proposition for a scheme to reduce the burden on the user to read the entire content of each detected document by providing a man-made document summary for each stored document in advance in correspondence to each stored document itself and displaying the document summary at a time of displaying the detection result. However, in such a scheme, an enormous amount of human efforts is required for preparing the document summary for each document at a time of producing the database itself, which is not practically justifiable unless the database system has a remarkably high utilization rate. Moreover, there are many already existing database systems in which the document summary for each document is not provided, and an enormous amount of human efforts is similarly required for preparing the document summary for each document in such an already existing database system. In addition, the man-made document summary is produced in the very general viewpoint alone, so that there is no guarantee that each document is summarized from a viewpoint suitable for the required detection. As a result, the document summary displayed as the detection result can be off point from the viewpoint of the user with the specific document detection objective, and in such a case, it is possible for the user to overlook the actually necessary document at a time of judging whether each detected document is the desired document or not.

SUMMARY OF THE INVENTION

It is therefore an object of the present invention to provide a document detection system using a detection result presentation that can facilitate a user's quick comprehension of the relevancy of each detected document, so as to enable the user to conduct an entire operation using the a document detection system smoothly.

According to one aspect of the present invention there is provided a document detection system, comprising: document memory means for storing a plurality of documents; an input unit for entering user's input for commanding a document detection in the documents stored in the document memory; an input analysis unit for analyzing the user's input entered by the input unit to extract keywords and viewpoints relevant to each keyword contained in the user's input, and constructing a detection command from the keywords and the viewpoints extracted from the user's input; and a detection unit for detecting those documents stored in the document memory means which match with the detection command constructed by the input analysis unit as detected documents of a detection result.

According to another aspect of the present invention there is provided a method of document detection, comprising the steps of: analyzing a user's input for commanding a document detection to extract keywords and viewpoints relevant to each keyword contained in the user's input; constructing a detection command from the keywords and the viewpoints extracted from the user's input at the analyzing step; and detecting those documents among a plurality of stored documents which match with the detection command constructed at the constructing step as detected documents of a detection result.

Other features and advantages of the present invention will become apparent from the following description taken in conjunction with the accompanying drawings.

BRIEF DESCRIPTION OF THE DRAWINGS

FIG. 6 is a table of exemplary viewpoint extraction rules used in a viewpoint extraction unit in the input analysis unit of FIG. 3.

FIG. 7 is an illustration of a format and examples for a detection command generated by the detection command generation unit in the input analysis unit of FIG. 3.

FIG. 10 is a diagrammatic illustration of a keyword index stored in a document data memory unit in the document detection system of FIG. 2.

FIG. 11 is an illustration of a format and examples for a detection result obtained by the detection unit of FIG. 8.

FIG. 19 is illustrations of exemplary detection result displays presented by the detection result display unit in the document detection system of FIG. 2.

FIG. 20 is an illustration of a format and examples for an accept/reject data used in the document detection system of FIG. 2.

FIG. 25 is schematic illustrations of exemplary detection result displays presented by the detection result display unit according to the flow chart of FIGS. 24A and 24B.

FIG. 32 is a flow chart for the modified operation of the record management control unit in the sixth embodiment of a document detection system according to the present invention.

FIG. 33 is an illustration of a format and an example for a detection node stored in the detection record memory unit in the sixth embodiment of a document detection system according to the present invention.

FIG. 36 is an Illustration of the detection node data presented by the detection record display unit in the sixth embodiment of a document detection system according to the present invention.

FIG. 42 is illustrations of exemplary detection result displays in a document display mode presented by the detection result display unit in the sixth embodiment of a detection system according to the present invention.

FIG. 49 is an illustration of an exemplary table indicating similarities among detected documents presented by the detection result display unit in the eighth embodiment of a detection system according to the present invention.

FIG. 50 is an illustration of an exemplary table indicating viewpoints utilized in the document data memory unit in the ninth embodiment of a detection system according to the present invention.

FIGS. 53A and 53B are illustrations of exemplary detection result displays presented by the detection result display unit in the eleventh embodiment of a detection system according to the present invention.

FIG. 54 is a table of exemplary viewpoint extraction rules used in the twelfth embodiment of a detection system according to the present invention.

DETAILED DESCRIPTION OF THE PREFERRED EMBODIMENTS

Figure 1:
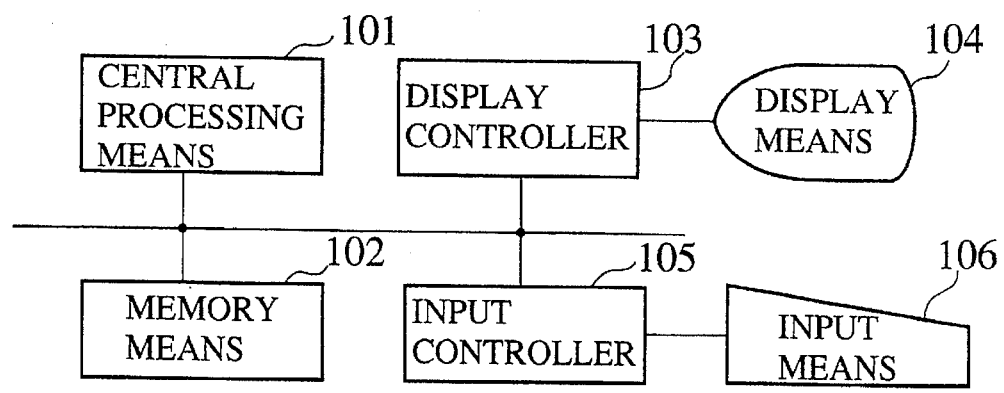
FIG. 1 is a schematic block diagram for an overall hardware configuration of a first embodiment of a document detection system according to the present invention.

Referring now to FIG. 1, the first embodiment of a document detection system according to the present invention will be described in detail.

In this first embodiment, the document detection system has an overall hardware configuration as shown in FIG. 1 in which a central processing means 101 is connected with a memory means 102, a display means 104 through a display controller 103, and an input means 106 through an input controller 105.

The central processing means 101 is formed by a processor for carrying out various processing operations. The memory means 102 is formed by a memory medium such as a semiconductor memory, a magnetic disk memory, an optical disk memory, etc. for storing programs and data used by the central processing means 101. The display means 104 is formed by a display device such as a liquid crystal display and a plasma display for displaying the text content of the document and the detection result under the control of the display controller 103. The input means 106 is formed from input devices such as a keyboard and a mouse for entering the detection commands from the user under the control of the input controller 106.

Figure 2:
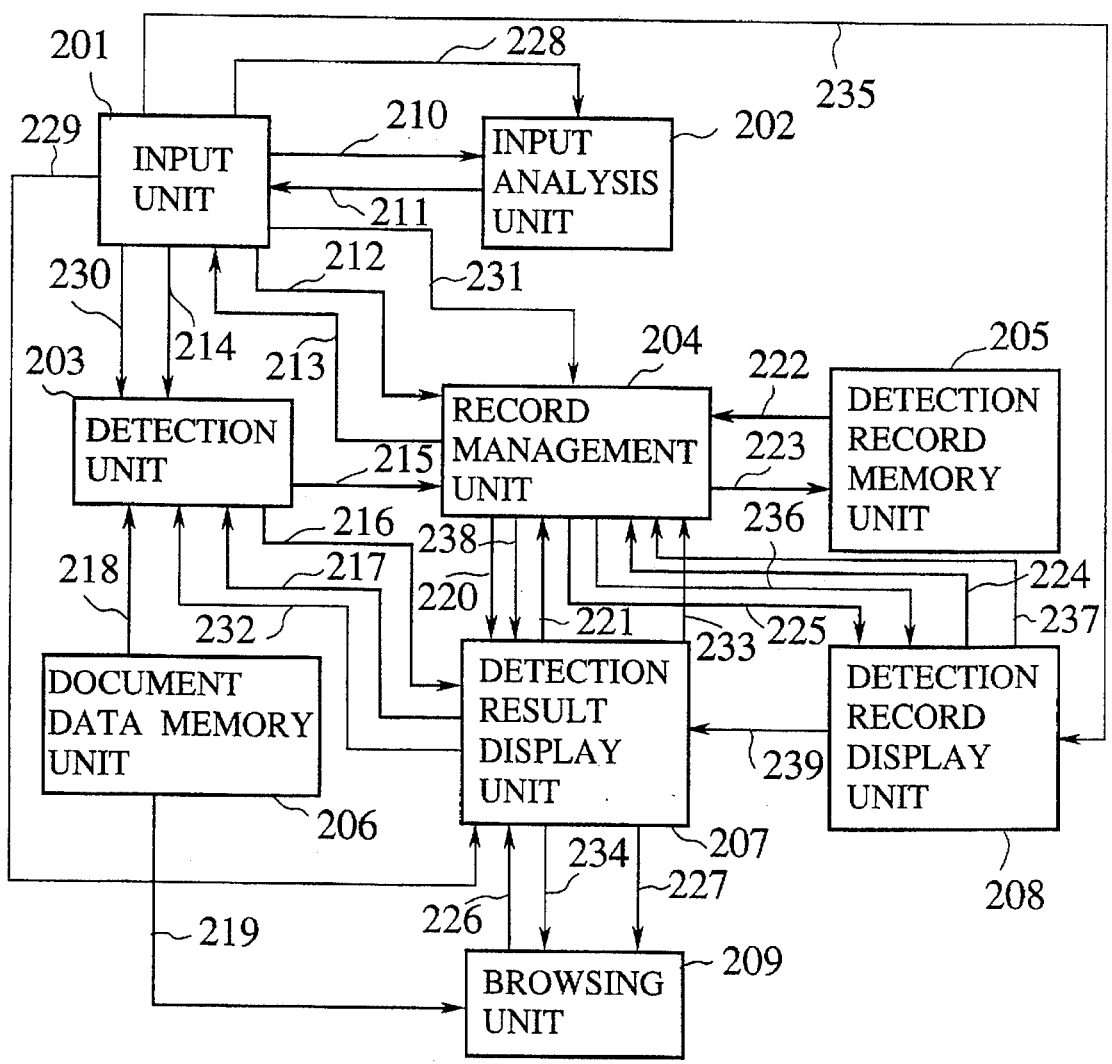
FIG. 2 is a block diagram for a detailed functional configuration of the document detection system of FIG. 1.

In further detail, the document detection system of this first embodiment has a detailed functional configuration as shown in FIG. 2, which comprises an input unit 201, an input analysis unit 202, a detection unit 203, a record management unit 204, a detection record memory unit 205, a document data memory unit 206, a detection result display unit 207, a detection record display unit 208, and a browsing unit 209, which are mutually connected by data lines 210–227 indicated by thick solid lines and control lines 228–238 indicated by thin solid lines in FIG. 2, as will be described in detail below.

The input unit 201 enters input sentences from the user given in a natural language or keywords for commanding the document detection operation. The input sentences are subsequently converted into the detection command at the input analysis unit 202 and the converted detection command is returned to this input unit 201, via the data lines 210 and 211. The input unit 201 receives a detection node ID from the record management unit 204 via the data line 213, and outputs the detection node ID and the detection command in pair to the record management unit 204 via the data line 212 and to the detection unit 203 via the data line 214.

The input analysis unit 202 receives the user's input from the input unit 201 via the data line 210, converts the user's input into the detection command, and outputs the converted detection command to the input unit 201 via the data line 211.

The detection unit 203 receives the pair of the detection command and the detection node ID from the input unit 201 via the data line 214, looks up document data stored in the document data memory unit 206 via the data line 218 to detect the related document set, and outputs a detection result concerning the related document set and the detection node ID in pair to the record management unit 204 via the data line 215, while outputting the detection result to the detection result display unit 207 via the data line 216.

The detection result display unit 207 receives the detection result via the data line 216, displays the document set of the detection result as a multi-dimensional display, and outputs a document ID of a document selected in the multi-dimensional display to the browsing unit 209 via the data line 227.

The browsing unit 209 looks up the document data stored in the document data memory unit 206 via the data line 219 according to the document ID received from the detection result display unit 207 via the data line 227, to display the content of the individual document.

The record management unit 204 stores the pair of the detection command and the detection node ID received via the data line 212 and the pair of the detection result and the detection node ID received via the data line 215 into the detection record memory unit 205 via the data line 223, while looking up the detection record via the data line 222, and outputs the detection record data to the detection record display unit 208 via the data line 225.

The detection record display unit 208 displays the detection record data received via the data line 225 in a tree structure, and outputs the detection node ID of a node specified in the displayed tree structure to the record management unit 204 via the data line 224.

The detection record memory unit 205 stores the detection record received from the record management unit 204 via the data line 223, while the document data memory unit 206 stores the document data.

The data line 226 is for transmitting an accept/reject data specified for each individual document by the user on the browsing unit 209 to the detection result display unit 207, the data line 220 is for transmitting the detection node ID generated at the record management unit 204 to the detection result display unit 207, the data lines 221 and 217 are for transmitting the immediately previous detection result, the document accept/reject data, and the detection node ID at a time of re-detection specified at the detection result display unit 207 to the detection unit 203 and the record management unit 204.

Figure 3:
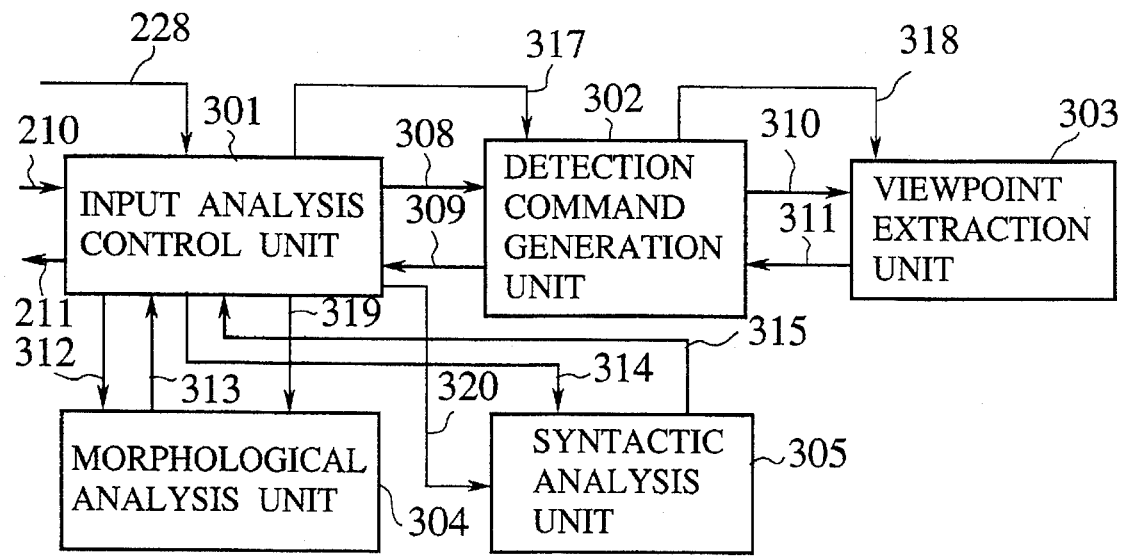
FIG. 3 is a block diagram of a detailed functional configuration of an input analysis unit in the document detection system of FIG. 2.

The input analysis unit 202 has a detailed functional configuration as shown in FIG. 3, which comprises an input analysis control unit 301, a detection command generation unit 302, a viewpoint extraction unit 303, a morphological analysis unit 304, and a syntactic analysis unit 305, which are mutually connected by data lines 308–315 indicated by thick solid lines and control lines 317–320 indicated by thin solid lines in FIG. 3, as will be described in detail below.

The input analysis control unit 301 is activated via the control line 228 from the input unit 201. The input analysis control unit 301 activates the morphological analysis unit 304 via the control line 319 and supplies the individual input sentence to the morphological analysis unit 304 via the data line 312, and then receives the morphological analysis result from the morphological analysis unit 304 via the data line 313. In addition, this input analysis control unit 301 activates the syntactic analysis unit 305 via the control line 320 and supplies the morphological analysis result of the individual input sentence to the syntactic analysis unit 305 via the data line 314, and then receives the syntactic analysis result from the syntactic analysis unit 305 via the data line 315. Furthermore, this input analysis control unit 301 activates the detection command generation unit 302 via the control line 317 and supplies the syntactic analysis result of the individual input sentence to the detection command generation unit 302 via the data line 308, and then receives the detection command from the detection command generation unit 302 via the data line 309.

The detection command generation unit 302 activates the viewpoint extraction unit 303 via the control line 318 for each individual input sentence and supplies the syntactic analysis result via the data line 310, and then receives viewpoint data extracted by the viewpoint extraction unit 303 via the data line 311. In addition, this detection command generation unit 302 extracts content words from the individual input sentence, constructs the detection command from the extracted content words, and outputs the constructed detection command to the input analysis control unit 301 via the data line 309.

Figure 4:
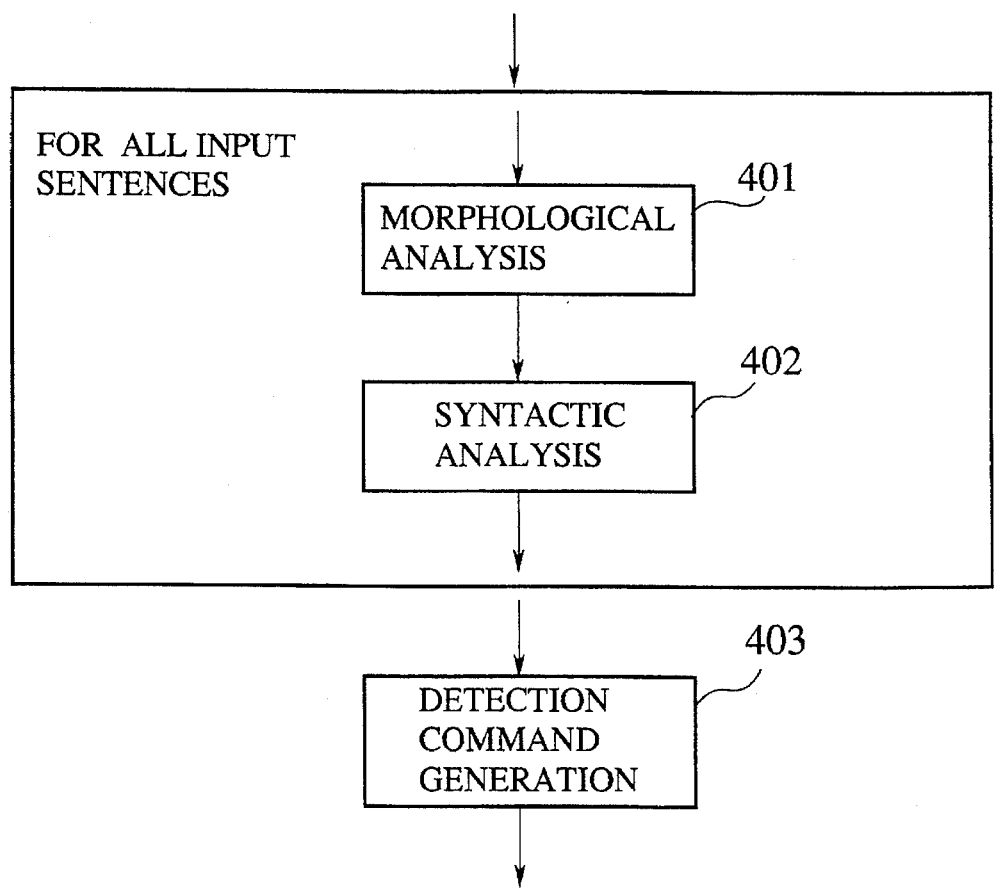
FIG. 4 is a flow chart for the operation of an input analysis control unit in the input analysis unit of FIG. 3.

The input analysis control unit 301 operates according to the flow chart of FIG. 4 as follows.

First, there is a possibility for a plurality of natural language sentences to be entered from the input unit 201. For this reason, with respect to each individual input sentence entered, the morphological analysis and the syntactic analysis are carried out at the steps 401 and 402 by using the morphological analysis unit 304 and the syntactic analysis unit 305. Here, the morphological analysis and the syntactic analysis are already well known from the field of machine translation, and the details of these analyses are not essential to the present invention so that their explanation will be omitted.

Then, according to the syntactic analysis result obtained for each individual input sentence entered, the detection command generation is carried out at the step 403 by using the detection command generation unit 302.

The detection command generation unit 302 operates according to the flow chart of FIG. 5 as follows.

Namely, according to the syntactic analysis result for individual input sentence, the viewpoint data is extracted at the step 501, and the content words constituting the individual input sentence are extracted at the step 502.

Then, after the viewpoint extraction and the content word extraction are carried out for all the input sentences, the extracted content words are merged for each viewpoint at the step 503, so as to construct the detection command.

Here, the extraction of the viewpoint data is carried out according to the viewpoint extraction rules such as those shown in the table illustrated in FIG. 6 which only shows a limited number of examples. In FIG. 6, each viewpoint extraction rule is given in a format of:

(matching portion)→viewpoint where the matching portion indicates a syntactic pattern to be matched, such that when the syntactic pattern of the matching portion on the left hand side matches with that in the individual input sentence, the viewpoint on the right hand side is determined as the viewpoint of the individual input sentence.

In a case the viewpoint data cannot be extracted according to the viewpoint extraction rules of FIG. 6, the detection command generation unit 302 constructs the detection command by adopting the default viewpoint set in advance. This default viewpoint may be set up from the input unit 201 before the execution of the detection command by the user.

For example, in a case of the viewpoint extraction rule at the first line in FIG. 6, a matching is made for a partial element of a sentence containing the syntactic pattern of "with an object of", while in a case of the viewpoint extraction rule at the second line in FIG. 6, a matching is made for a partial element of a sentence containing the syntactic pattern of "understand [perfect tense]", i.e., "understood", "have understood", etc.

It is to be noted however that the format of this matching portion depends on the syntactic analysis result obtained by the syntactic analysis and any suitable format other than that used in the examples of FIG. 6 may be used.

In the content word extraction, the noun parts are taken out from the syntactic analysis result, and then the unnecessary words are removed according to an unnecessary word dictionary (not shown) in the already known manner of the content word extraction from the syntactic analysis result.

The detection command has an exemplary format as shown in FIG. 7, where the detection command is defined as a combination of the keyword and the viewpoint list. The examples shown in FIG. 7 are four detection commands constructed from the input sentence of "A design tool based on examples developed with an object of a computer design.", in which the nouns "computer" and "design" are subordinate to "with an object of" while the nouns "example", "design", and "tool" are subordinate to "developed".

Figure 8:
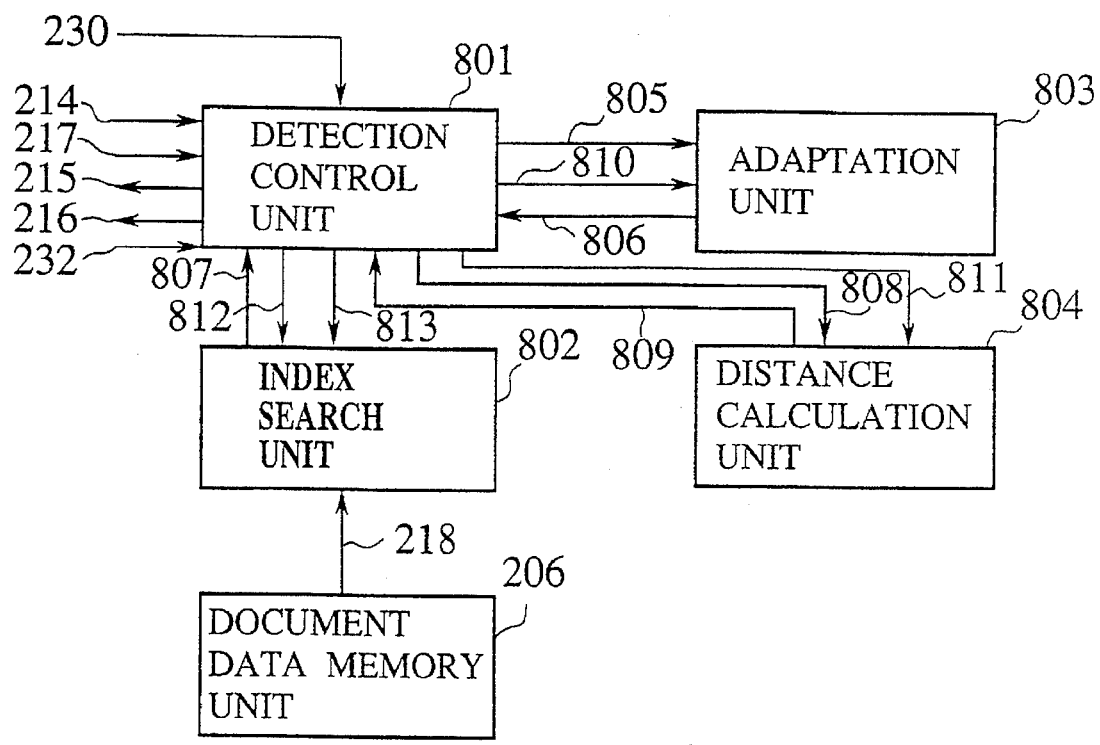
FIG. 8 is a block diagram of a detailed functional configuration of a detection unit in the document detection system of FIG. 2.

The detection unit 203 has a detailed functional configuration as shown in FIG. 8, which comprises a detection control unit 801 for controlling the detection unit 203 as a whole, an index search unit 802 for detecting related documents by searching through a keyword index stored in the document data memory unit 206, an adaptation unit 803 for receiving the accept/reject data for the documents from the detection result display unit 207 and carrying out an adaptation operation in a case of the re-detection, and a distance calculation unit 804 for calculating the similarities of the detected documents with respect to the detection commands and converting the calculated similarities into distances.

The detection control unit 801 carries out two types of operations including a detection operation when the detection commands are received and a re-detection operation when the accept/reject data for the documents are received from the detection result display unit 207.

The detection operation by the detection control unit 801 is carried out according to the flow chart of FIG. 9 as follows.

This detection operation is carried out first when the detection control unit 801 is activated via the control line 230.

First, the index search unit 802 is activated via the control line 812 according to the detection commands received via the data line 214. At this point, the detection commands are transmitted to the index search unit 802 via the data line 813.

In response, the index search unit 802 searches through the keyword index, and obtains the document IDs and the viewpoint data containing the keywords of the detection commands as candidate documents at the step 901. The document IDs and the viewpoint data obtained at the step 901 are then supplied to the detection control unit 801 via the data line 807.

Then, for all the candidate documents obtained at the step 901, the distance calculation unit 804 is activated via the control line 811, and the calculations of distances with respect to the detection commands are carried out at the step 902. At the distance calculation unit 804, the keywords of each candidate document and the detection commands are received from the detection control unit 801 via the data line 808, and the distance calculation is carried out according to an M×N matrix representation of each detection command Q defined by the following equation (1), a M×N matrix representation of each document Di defined by the following equation (2), and the distance Dist(Q, Di) defined by the following equation (3). The obtained distance is subsequently supplied to the detection control unit 801 via the data line 809.

$$Q = \begin{pmatrix} q11 & q12 & q13 & \ldots & q1M \\ q21 & q22 & q23 & \ldots & q2M \\ q31 & q32 & q33 & \ldots & q3M \\ . & . & . & & . \\ . & . & . & & . \\ . & . & . & & . \\ qN1 & qN2 & qN3 & \ldots & qNM \end{pmatrix} \quad (1)$$

$$Di = \begin{pmatrix} d11 & d12 & d13 & \ldots & d1M \\ d21 & d22 & d23 & \ldots & d2M \\ d31 & d32 & d33 & \ldots & d3M \\ . & . & . & & . \\ . & . & . & & . \\ . & . & . & & . \\ dN1 & dN2 & dN3 & \ldots & dNM \end{pmatrix} \quad (2)$$

$$Dist(Q, Di) = |Q - Di|/M \quad (3)$$

where the ij-th elements qij and dij at the i-th row and j-th column in the matrices of the equations (1) and (2) are for the i-th keyword and the j-th viewpoint of the detection comment and the document, respectively, which express weights for the keywords which are determined by analysing the detection command and the document.

For example, a ij-th element qij has a value 1 when the i-th keyword is used in the sentence belonging to the j-th viewpoint, or a value 0 otherwise. Here, when the keywords are developed into synonyms by using the synonym dictionary (not shown), it is also possible to give a value less than 1 and greater than 0 to the inferior words, superior words, or synonymous words. It is also possible to give a value less than 1 and greater than 0 according to the position of the keyword within the document structure such as the title, the chapter header, the main text, the footnote, etc.

These matrices Q and Di can be regarded as expressing feature vectors of the detection command and the document with respect to the viewpoints.

In the above equation (3), a symbol |A| for an arbitrary matrix A represents the meaning defined by the following equation (4).

$$|A| = \begin{pmatrix} \Sigma b1m \\ \Sigma b2m \\ \Sigma b3m \\ . \\ . \\ . \\ \Sigma bNm \end{pmatrix} \quad (4)$$

where, for each element aij of the matrix A, if aij <0 then bij=−aij, and otherwise bij=aij.

It is to be noted that the distance Dist(Q, Di) of the above equation (3) is the city block distance, but any other generally known distance measures may be used instead, if desired.

By the above equation (3), the distance between the detection command and the individual document is going to be obtained for each viewpoint.

FIG. 10 shows an exemplary content of the keyword index stored in the document data memory unit 206, which is suitable for Japanese.

Namely, this keyword index of FIG. 10 has the TRIE structure in which each kanji character involved in the keywords is assigned to a unique address, and each keyword formed by a plurality of kanji characters is specified by the link data registered after each kanji character, so as to reduce the required memory capacity and simplify the necessary detection procedure.

For example, the Japanese keyword "kikai" (meaning "machine") is formed by two kanji characters, the first character registered at the address 00053 in the head character storage region and has a link data "00305" specifying the second character of the keyword as that registered at the address 00305 in the subsequent character storage region. In addition, this second character at the address 00305 also has the link data "00623" specifying the third character and the third character at the address 00623 has the link data "00914" specifying the fourth character, for another keyword "kikai-honyaku" (meaning "machine translation") formed by four kanji characters which contains the above described keyword "kikai" as a first part.

Furthermore, the second character at the address 00305 also has a file data "file 4" indicating that the keyword "kikai" is contained in the document data having the document ID "file 4", accompanied by a viewpoint data "conclusion" indicating that this keyword "kikai" is used in the sentence concerning the viewpoint of "conclusion" in this document data "file 4".

Similarly, the fourth character at the address 00914 has two pairs of file data and viewpoint data set "file 25, object" and "file 21, conclusion", indicating that the keyword "kikai-honyaku" is contained in the document data "file 25" in the sentence concerning the viewpoint of "object", and in the document data "file 21" in the sentence concerning the viewpoint of "conclusion".

On the other hand, the first character at the address 000AD in the head character storage region is common to two keywords "sanpo" (meaning "algorithm") and "sanjutu" (meaning "arithmetic"), so that it has two link data "00A15" and "00A16" specifying the respective second characters for these two keywords.

In FIG. 10, an isolated "0" functions as a separator for separating the character, link data, and file data and viewpoint data pair. Also, the first characters of the keywords are registered in the continuous head character storage region in a sorted order such as that of JIS (Japanese Industrial Standard) codes.

FIG. 11 shows an exemplary format for detection result along with the actual examples of the detection results.

In this case, each document ID is associated with a plurality of distances, where the ij-th distance <DISTANCEij> is for the i-th document <DOCUMENTi> and the j-th viewpoint.

The detection results obtained by the detection unit 203 are then supplied to the record management unit 204 via the data line 215, as well as to the detection result display unit 207 via the data line 216.

Figure 12:
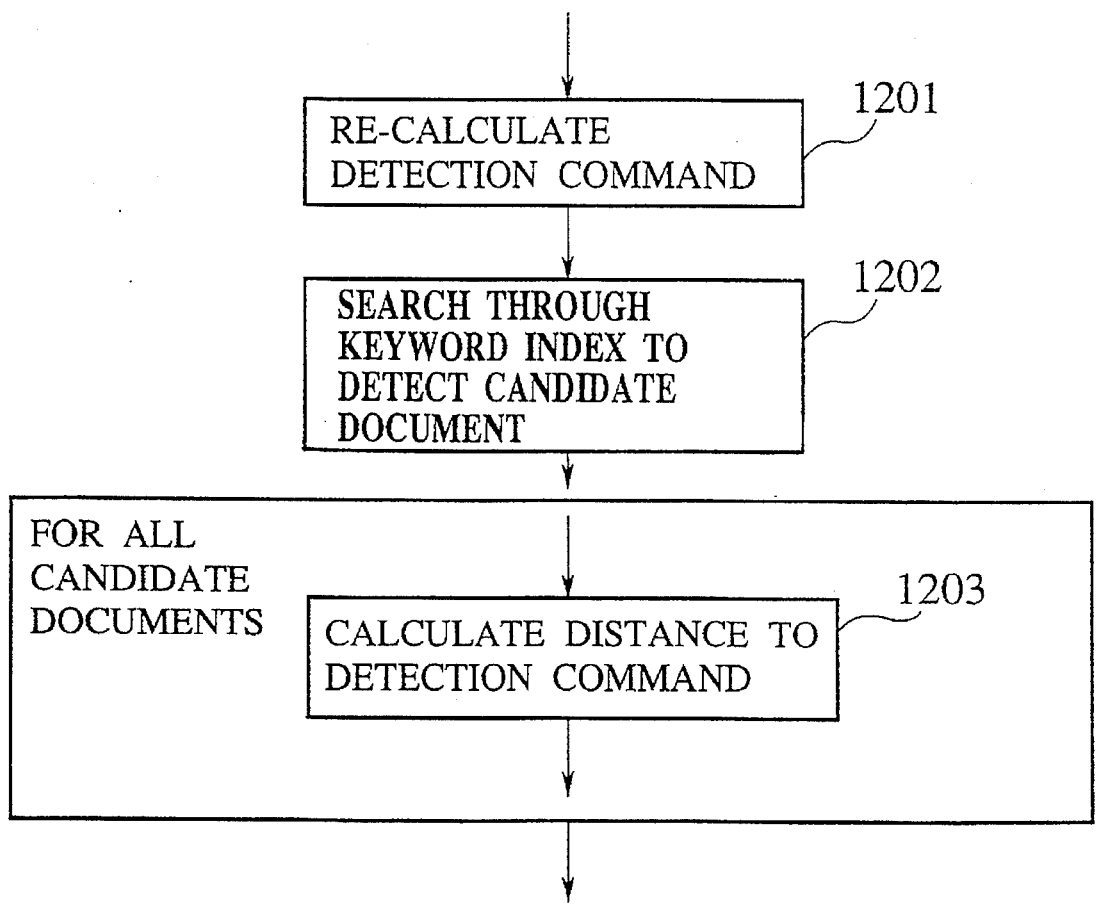
FIG. 12 is a flow chart for the re-detection operation of a detection control unit in the detection unit of FIG. 8.

On the other hand, the re-detection operation by the detection control unit 801 is carried out according to the flow chart of FIG. 12 as follows.

In this case, this re-detection operation is activated by the detection result display unit 207 (FIG. 2) via the control line 232. The detection control unit 801 then activates the adaptation unit 803 via the control line 810, using the detection result containing the accept/reject data for the documents as the input via the data line 217, so as to re-construct the detection commands at the step 1201. Here, the adaptation unit 803 calculates each re-constructed detection command Q' from each previous detection command Q according to the following equation (5).

$$Q' = w0 \cdot Q + \sum_{k=1}^{K} wk \cdot Qk \quad (5)$$

where Qk indicates the matrix representation of the document which is judged as proper for the detection result, i.e., accepted in the accept/reject data, and wk indicates a weight for taking a weighted average.

Figure 9:
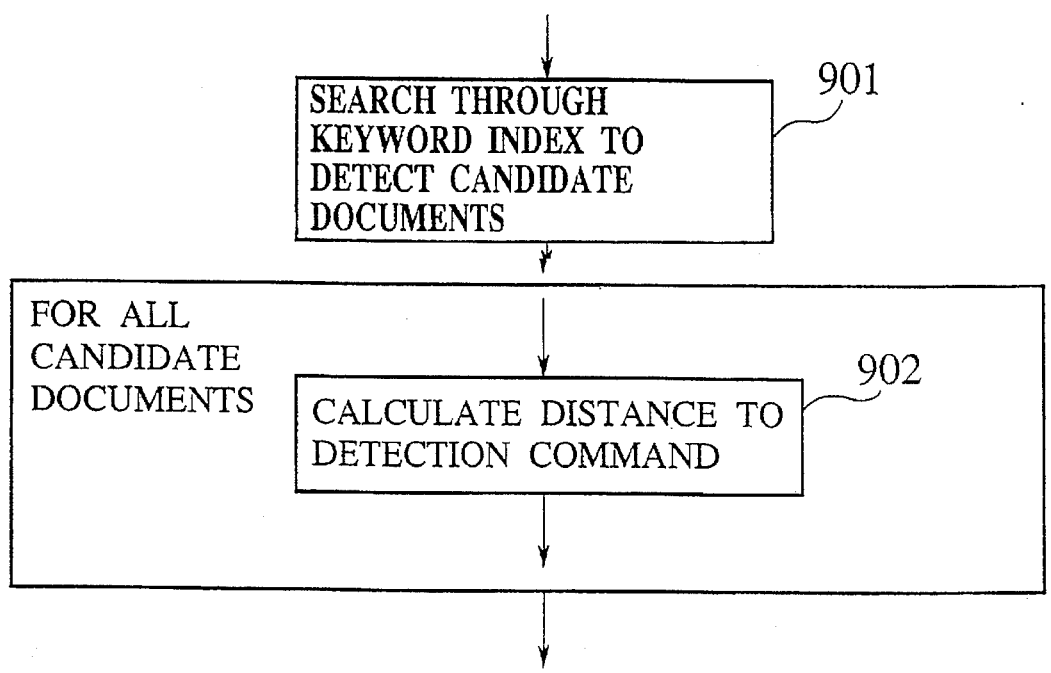
FIG. 9 is a flow chart for the detection operation of a detection control unit in the detection unit of FIG. 8.

After this re-calculation of the detection commands at the step 1201, the steps 1202 and 1203, similar to the steps 901 and 902 in FIG. 9 for the detection operation described above, are carried out for the re-constructed detection commands Q'.

Figure 13:
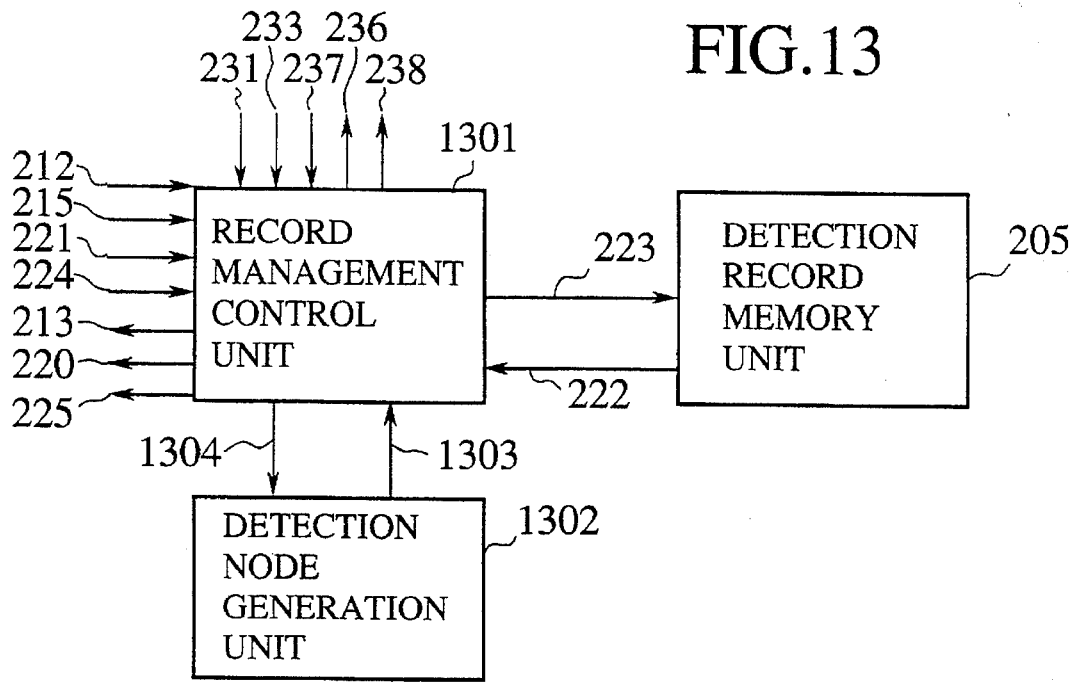
FIG. 13 is a block diagram of a detailed functional configuration of a record management unit in the document detection system of FIG. 2.

The record management unit 204 has a detailed functional configuration as shown in FIG. 13, which comprises a record management control unit 1301 and a detection node generation unit 1302.

The record management control unit 1301 operates according to the flow chart of FIG. 14 as follows.

Here, in accordance with an input message, the operation selectively proceeds to an appropriate one of operations of the steps 1402, 1403, and 1405 as described below from the step 1401.

Namely, in a case where the generation of the detection node ID is commanded from the input unit 201 via the control line 231, or from the detection result display unit 207 via the control line 233, the generation of the detection node using the detection node generation unit 1302 is carried out at the step 1402. The generated detection node is then stored into the detection record memory unit 205 via the data line 223.

Figures 15, 16:
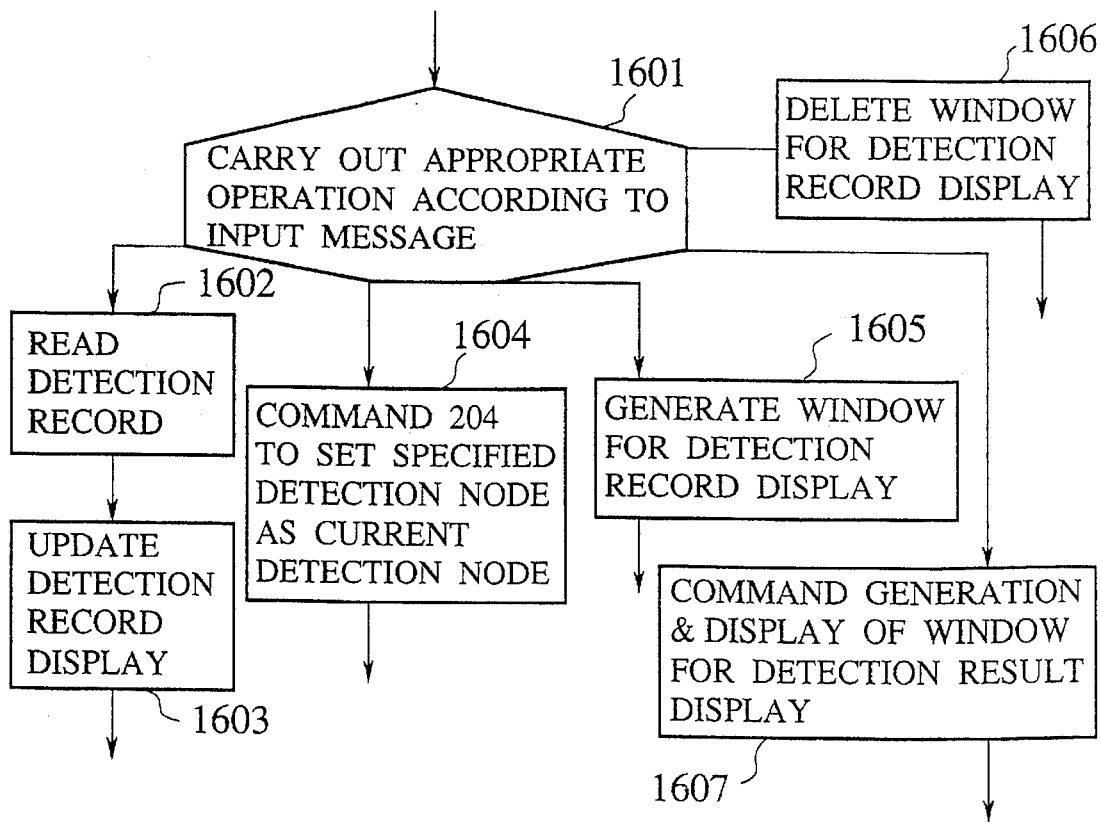
FIG. 15 is an illustration of a format and an example for a detection node stored in a detection record memory unit in the document detection system of FIG. 2.
FIG. 16 is a flow chart for the operation of a detection record display unit in the document detection system of FIG. 2.

In this case, each detection node is given in a format as shown in FIG. 15 along with an example, which comprises a set of four elements including a detection node ID, a parent node ID, the detection commands, and the detection results. Here, the detection node ID stores an identifier (ID) for identifying this detection node while the parent ID stores the ID of the detection node which stores the detection commands and the detection results for the immediately previous detection operation. The record management unit 204 manages the detection record according to the detection node ID.

In this generation of the detection node, a new detection node is generated by setting the current detection node as the parent node. Then, the detection node ID of the newly generated detection node is outputted to the input unit 201 via the data line 213 or to the detection result display unit 207 via the data line 220.

On the other hand, in a case a pair of the detection command and the detection node ID is entered from the input unit 201 via the data line 212 and a pair of the detection result and the detection node ID is entered from the detection unit 203 via the data line 215, the storing of the detection command and the detection result is carried out at the step 1403.

Then, the detection record display unit 208 is commanded via the control line 236 to transfer the detection nodes stored in the detection record memory unit 205 to the detection record display unit 208 via the data line 225, so as to update the detection record display at the step 1404.

Also, when the change of the current detection node is commanded from the detection record display unit 208 via the control line 237, the detection node specified by using the mouse or other input device on the detection record display unit 208 is entered via the data line 224, and the current detection node ID is changed accordingly at the step 1405. Then, the detection record display is updated at the step 1406, and the detection result display unit 207 is commanded to accordingly update the detection result display via the control line 238 at the step 1407.

The detection record display unit 208 operates according to the flow chart of FIG. 16 as follows.

Here, in accordance with an input message, the operation selectively proceeds to an appropriate one of the operations of the steps 1602, 1604, 1605, 1606, and 1607 as described below from the step 1601.

First, the generation of a display window for this detection record display unit 208 is commanded from the input unit 201 via the control line 235. In this case, the generation of a new window for the detection record display is carried out at the step 1605. Also, when the deletion of the window for the detection record display is commanded from the input unit 201 via the control line 235, the deletion of the window for the detection record display is carried out at the step 1606.

In a case a new record display is commanded from the record management unit 204 via the control line 236, the detection record to be newly displayed is read out via the data line 225 at the step 1602, and the detection record display is updated by the read out detection record on the window for the detection record display at the step 1603. Here, an exemplary detection record display made by this detection record display unit 208 is shown in FIG. 17A.

Figure 17A:
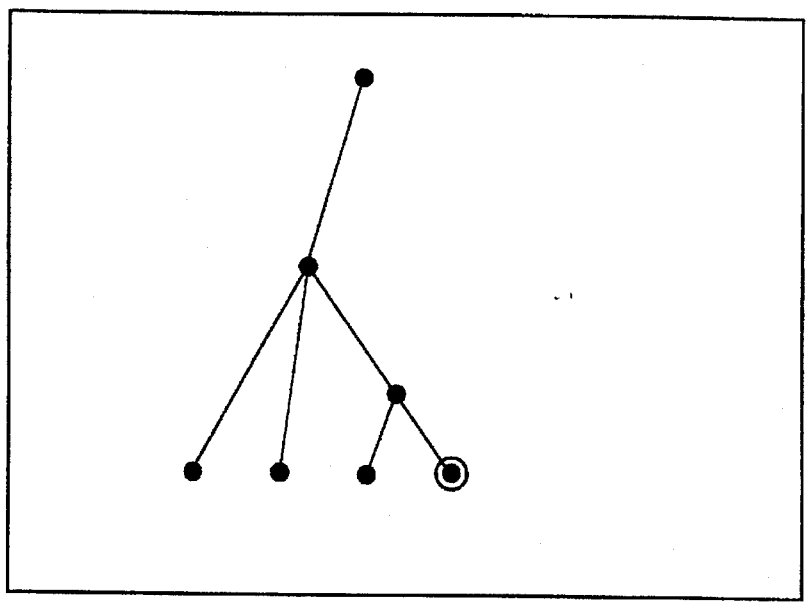
FIGS. 17A and 17B are illustrations of exemplary detection record displays presented by the detection record display unit in the document detection system of FIG. 2.

As shown in FIG. 17A, the detection record display is given in a form of the tree structure, in which the detection nodes are represented by black dots, where two nodes linked by a straight line have the parent and child relationship, and an encircled black dot indicates the current detection node. Here, in addition, the current detection node is displayed in a display mode for clearly distinguishing it from the other nodes such as blinking display mode, inverted display mode, distinct color display mode, etc.

At this detection record display unit 208, the user inputs for commanding the change of the current detection node and the generation of a new window for the detection result display can be received.

Figure 17B:
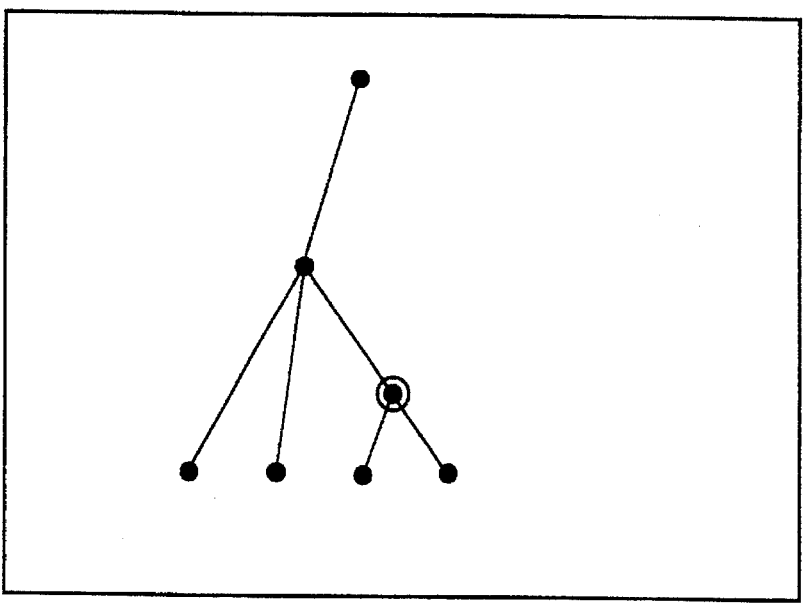

In a case of changing the current detection node, the user can enter the input for specifying the desired detection node among those displayed on the window for the detection record display by using the mouse or other input device. When the change of the current detection node is commanded, the detection record display unit 208 commands the record management unit 204 to set the specified detection node as a new current detection node, in response to which the record management control unit 1301 carries out the steps 1405 to 1407 of FIG. 14 described above. By changing the current detection node in the exemplary detection record display of FIG. 17A, the detection record display can be changed as shown in FIG. 17B, for example.

On the other hand, in a case the user input for generating a new window for the detection result display is received, the detection record display unit 208 commands the detection result display unit 207 to generate and display a new window for the detection result display via the control line 239.

The detection result display unit 207 operates according to the flow chart of FIG. 18 as follows.

Here, in accordance with an input message, the operation selectively proceeds to an appropriate one of the following operations of the steps 1802, 1803, 1804, 1806, 1807, and 1810 as described below from the step 1801.

Namely, this detection result display unit 207 carries out one of the display of the detection results entered from the detection unit 203 via the data line 216, the display of the detection results in the detection record data entered from the record management unit 204 via the data line 220, the input of the accept/reject data for the documents from the browsing unit 209 via the data line 226, the generation of the window for the detection result display commanded from the detection record display unit 208 via the control lime 239, and the generation of the window for the detection result display commanded from the input unit 201 via the control line 229.

In addition, this detection result display unit 207 also carries out one of the change of the displayed viewpoint, the activation of the browsing unit 209, and the re-activation of the detection unit 203 according to the accept/reject data for the documents, upon receiving the user's input.

In a case the generation of the window for the detection result display Is commanded from the input unit 201 or the detection record display unit 208, the window for the detection result display is generated at the step 1802. Here, the command from the detection record display unit 208 comes from the step 1607 of FIG. 16.

Also, when the detection results are entered from the detection unit 203 via the data line 216, or the detection results in the detection record data are entered from the record management unit 204 via the data line 220, the entered detection results are displayed at the step 1803.

Here, this detection result display is given in a form of a multi-dimensional display with each viewpoint stored in the detection results as an axis, the detection commands as an origin, and the distances between the detection commands and the candidate documents for each viewpoint as coordinates of data points representing the candidate documents.

In this first embodiment, this multi-dimensional display is given in an exemplary form shown in a part (a) of FIG. 19, which is showing a three-dimensional case as an example. Here, each axis is labelled by the viewpoint represented by each axis, such as "object" and "conclusion" for example.

In this example of FIG. 19, one of the viewpoint axis is labelled "others" because in this example a plurality of viewpoint axes are mapped onto this one axis labelled "others" as a number of viewpoints extracted from the detection commands exceeds a predetermined simultaneously displayable viewpoint number, so that the multi-dimensional space displayed by FIG. 19 is a contracted space obtained from the actual higher dimensional space. Here, the coordinates along this axis labelled "others" can be calculated by taking a weighted average of the coordinates along the axes to be contracted according to the following equation (6), for example.

$$r = \Sigma vi \cdot ri \tag{6}$$

where r is a coordinate along the axis labelled "others", ri is a coordinate along an i-th axis to be contracted, and vi is a weight for the i-th axis to be contracted.

It is also possible to modify the above equation (6) as in the following equation (7).

$$r = \sqrt{\sum_i vi \cdot (ri)^2} \tag{7}$$

In general, the formula for calculating the coordinates along this axis labelled "others" can be expressed as the following equation (8).

$$r = func2(\Sigma vi \cdot func1(ri)) \tag{8}$$

where func1 and func2 are suitable functions.

Instead of displaying the label "others" as shown in FIG. 19, it is also possible to use the label explicitly indicating the viewpoints represented by the contracted axes, such as "background+method" for example.

It is also to be noted that the three-dimensional display of the example shown in FIG. 19 can be easily reduced to the two-dimensional one or the one dimensional one by further contracting the axes.

In the part (a) of FIG. 19, the data points for the documents are indicated by black dots, accompanied by the document titles indicated in the solid line enclosures.

In a case the user entered the accept/reject data for the documents currently browsed at the browsing unit 209, the accept/reject data are received via the data line 226 at the step 1804. Here, each accept/reject data is received in the format of:

<document ID>;<accept/reject> where <accept/reject> is indicated by a value "0" indicating the reject of the document identified by the accompanying document ID as improper for the detected document or a value "1" indicating the accept of this document as proper for the detected document.

Then, at the detection result display unit 207, the display of the document corresponding to the entered document ID is updated accordingly as shown a part (c) of FIG. 19 at the step 1805. In this part (c) of FIG. 19, the data points for those documents which are rejected by the accept/reject data are indicated by blank circles, while the data points for those documents which are accepted by the accept/reject data remain to be indicated by black dots, and the document titles accompanying the blank circles and the black dots are display in different colors, as indicated by the dashed line enclosures and the solid line enclosures in the part (c) of FIG. 19.

Here, the accept/reject data received from the browsing unit 209 are stored in the data format shown in FIG. 20, until the new detection results are received.

The detection result display unit 207 can also activate the browsing unit 209 in response to the user's input using the mouse or the other input device on the window for the detection result display.

Namely, when the data point representing the individual document is specified on the window for the detection result display by the user, the detection result display unit 207 activates the browsing unit 209 for the specified document via the control line 234 at the step 1806. In this case, the detection result display is changed as shown in the part (b) of FIG. 19 in which the document title accompanying the data point for the currently browsed document is displaying in the blinking display mode or in the distinct color display mode, as indicated by the shading within the solid line enclosure in the part (b) of FIG. 19.

In a case where a displayed button "re-detect" is selected by the user on the window for the detection result display, the detection unit 203 is re-activated at the step 1807 according to the current detection results including the accept/reject data for currently displayed documents supplied via the data line 217.

In a case where a displayed button "viewpoint" is selected by the user on the window for the detection result display, the viewpoint is changed to a new viewpoint at the step 1808. Here, in changing the viewpoint, which viewpoint is to be allocated to which axis is changed in accordance with the user's input. Then, the detection results are displayed from the new viewpoint at the step 1809.

In a case where a displayed button "generate" is selected by the user on the window for the detection result display, the step 1802 described above Is carried out again to generate an additional window for the detection result display newly. Then, on the generated additional window, the same detection results as those displayed on the original window are also displayed. Here, by selecting different viewpoints for the original and additional windows, the detection results can be displayed from two different viewpoints. Here, however, the detection results themselves and the accept/reject data are shared among these original and additional windows, so that the display of the accept/reject data for the documents are going to be identical in the original and additional windows.

In a case where a displayed button "delete" is selected by the user on the window for the detection result display, the window for the detection result display is deleted at the step 1810.

Figure 21:
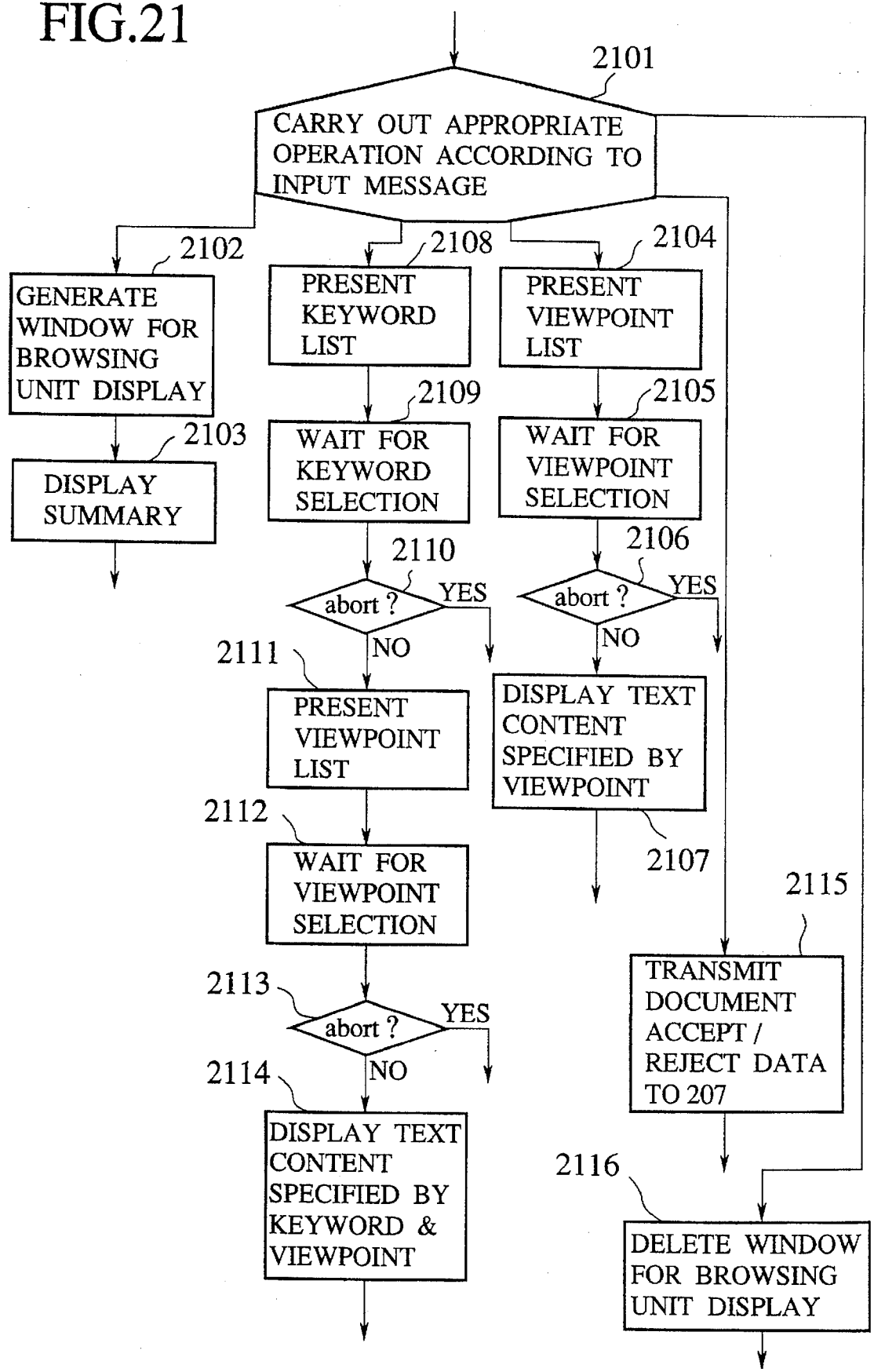
FIG. 21 is a flow chart for the operation of a browsing unit in the document detection system of FIG. 2.

The browsing unit 209 operates according to the flow chart of FIG. 21 as follows.

Here, in accordance with an input message, the operation selectively proceeds to an appropriate one of the following operations of the steps 2102, 2104, 2108, 2115, and 2116 as described below from the step 2101.

This browsing unit 209 is activated from the detection result display unit 207 via the control line 234 as described above, and displays the data content of the document specified by the user's input.

Figure 18:
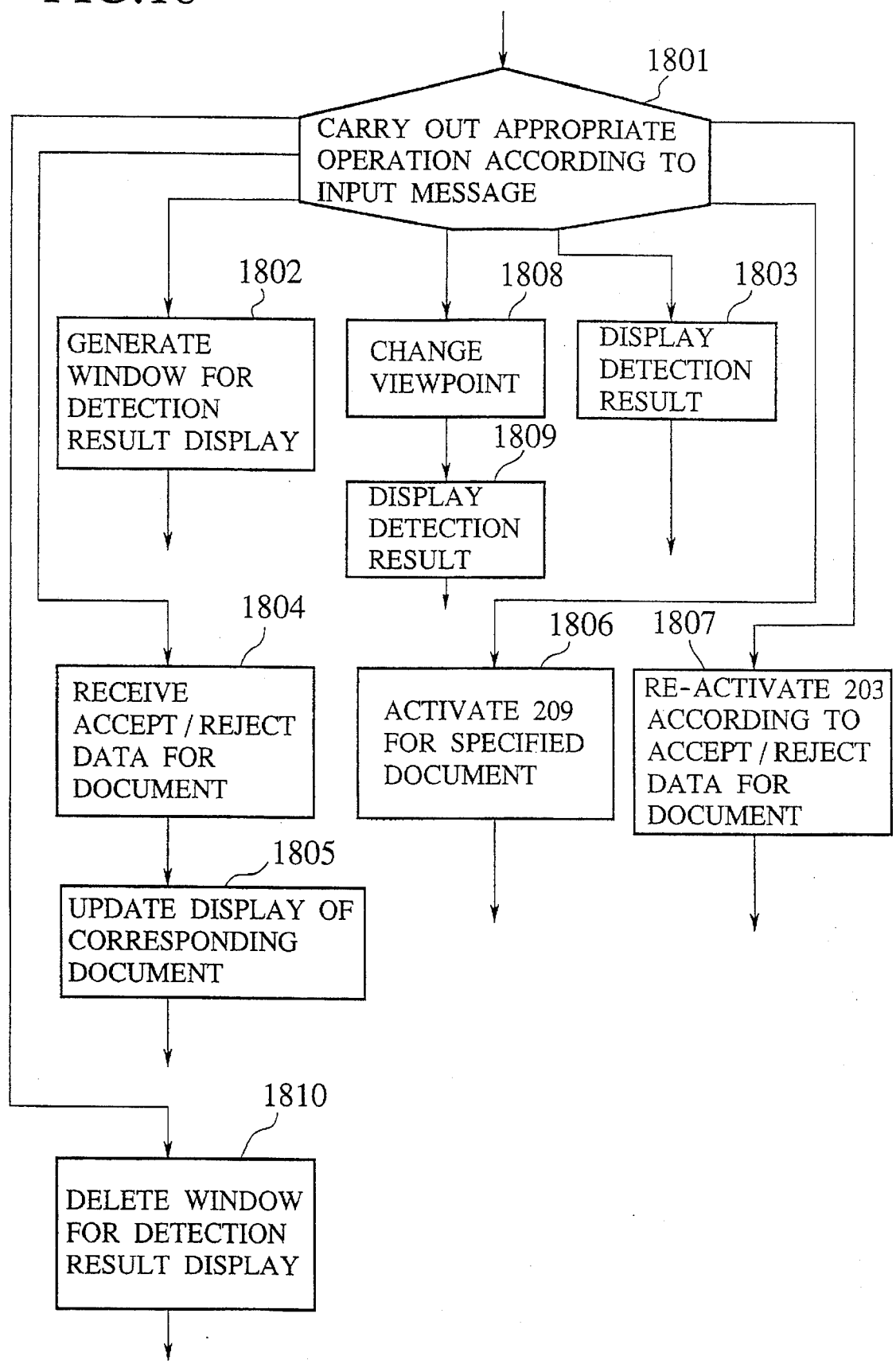
FIG. 18 is a flow chart for the operation of a detection result display unit in the document detection system of FIG. 2.

Namely, in a case this browsing unit 209 is activated by the step 1806 of FIG. 18, the window for the browsing unit display is generated at the step 2102. At this point, the document ID of the specified document is also entered from the detection result display unit 207 via the data line 227. Then, the document data of the specified document is read out from the document data memory unit 206 via the data line 219 and the summary of the specified document is displayed at the step 2103 on the window generated at the step 2102. Here, instead of the summary, the original document may be displayed if desired.

Figure 22:
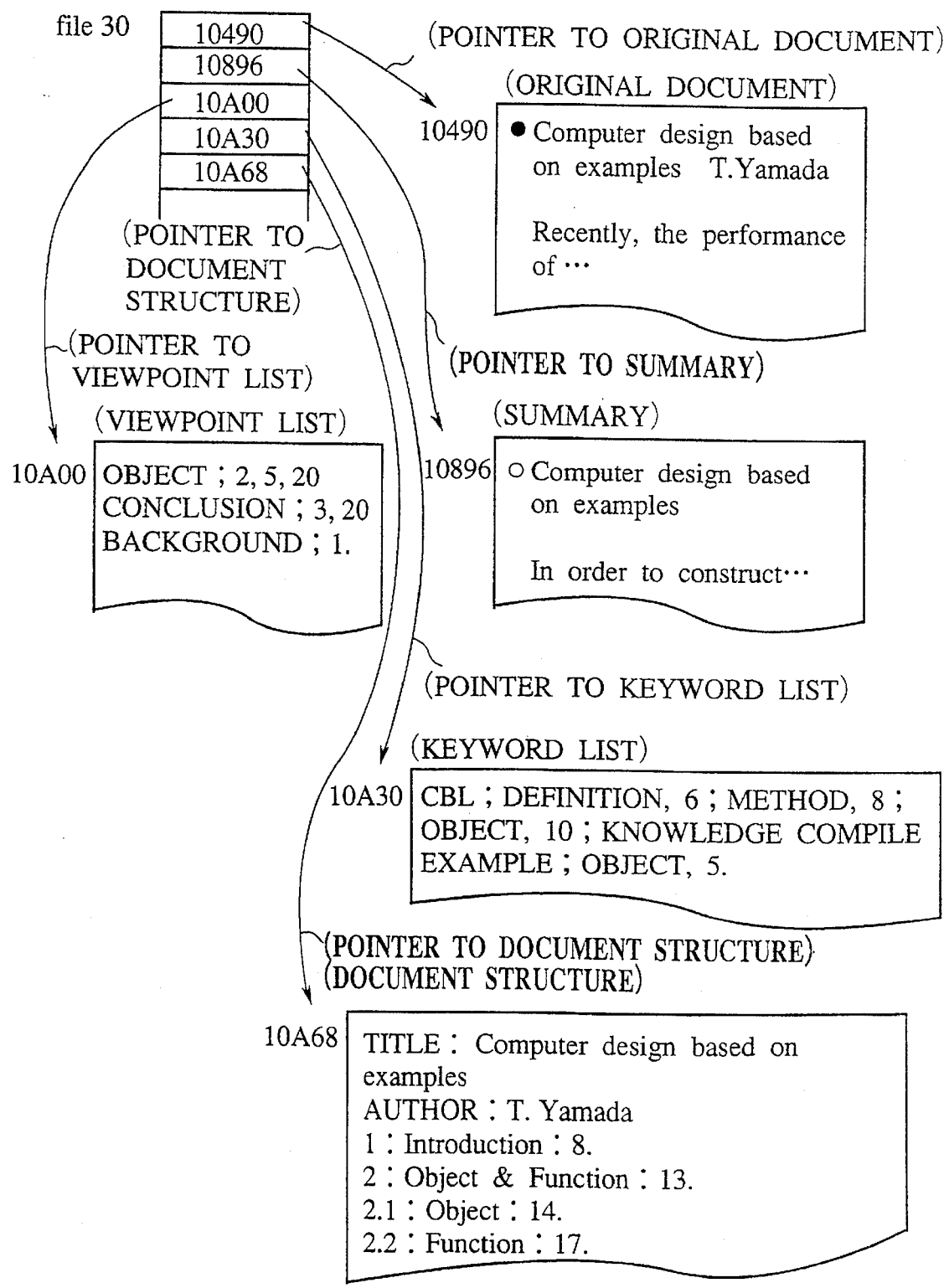
FIG. 22 is a diagrammatic illustration of a data format for the data content of the document stored in the document data memory unit in the document detection system of FIG. 2.

Here, the data content of the document is stored in the document data memory unit 206 in an exemplary data format shown in FIG. 22, in which pointers to original document, summary, keyword list, viewpoint list, and document structure are collectively registered.

Figure 23:
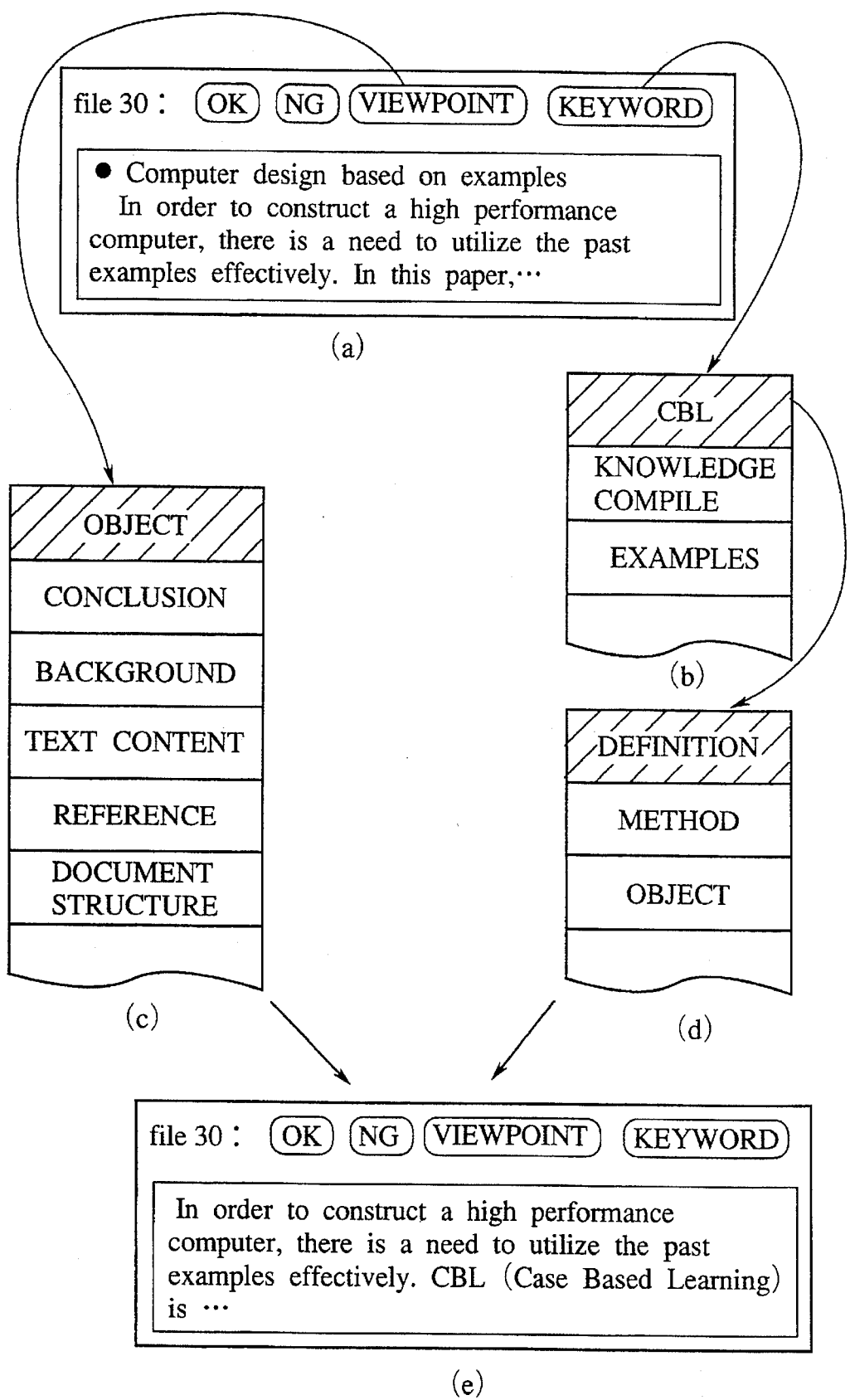
FIG. 23 is illustrations of exemplary browsing unit displays presented by the browsing unit in the document detection system of FIG. 2.

In this case, the browsing unit display can be given in an exemplary form as shown in FIG. 23, in which a part (a) shows an initial window display showing the summary of the specified document in a case of the step 2103 described above. This initial window display also provides displayed buttons for "viewpoint" and "keyword" and displayed buttons "OK" and "NG" for entering the accept/reject data.

In a case where a displayed button "viewpoint" is selected by the user on the window for the browsing unit display, the viewpoint list of all the viewpoints stored in the document data for the specified document is presented in a menu format shown in a part (c) of FIG. 23 at the step 2104, and the selection of the desired viewpoint by the user is awaited at the step 2105. Then, unless it is the abort at the step 2106, the text content of the document concerning the specified viewpoint is displayed in a form shown in a part (e) of FIG. 23 at the step 2107.

In a case where a displayed button "keyword" is selected by the user on the window for the browsing unit display, the keyword list of all the keywords stored in the document data for the specified document is presented in a menu format shown in a part (b) of FIG. 23 at the step 2108, and the selection of the desired keyword by the user is awaited at the step 2109. Then, unless it is the abort at the step 2110, the viewpoint list enlisting all the viewpoints concerning the specified keyword is presented in a menu format shown in a part (d) of FIG. 23 at the step 2111, and the selection of the desired viewpoint by the user is awaited at the step 2112. Then, unless it is the abort at the step 2113, the text content of the document concerning the specified viewpoint is displayed in a form shown in a part (e) of FIG. 23 at the step 2114.

In a case where a displayed button "OK" or "NG" is selected by the user on the window for the browsing unit display to specify the accept/reject data, the entered accept/reject data is transmitted to the detection result display unit 207 at the step 2115.

In a case where the deletion of the window for the browsing unit display is commanded by the user, the window for the browsing unit display is deleted at the step 2116.

As described in detail, according to this first embodiment, the distances between the detection commands and detected documents are obtained for a plurality of viewpoints, and the detection results are presented by displaying the obtained distances on the multi-dimensional space formed by using the viewpoints as axes, such that the user can readily comprehend how each detected document is close to the detection commands in what viewpoint according to the distribution of the data points on the multi-dimensional display.

Thus, according to this first embodiment, it is possible to provide a document detection system using a detection result presentation that can facilitate a user's quick comprehension of the relevancy of each detected document, so as to enable the user to conduct an entire operation using the document detection system smoothly.

It is also possible in this first embodiment to keep a record of the detection result display before the re-detection operation by storing the detection results and the corresponding accept/reject data as the detection record data, such that the detection result display before the re-detection operation can be reproduced even after the re-detection operation.

It is to be noted that the keyword index of FIG. 10 used in the first embodiment may be provided in plurality in correspondence to the plurality of viewpoints, such that the viewpoint data registered in each TRIE structure entry of the keyword index of FIG. 10 can be omitted.

It is also to be noted that the keyword index of FIG. 10 given in the TRIE structure may be replaced by the keyword index using the other known high speed referencing scheme such as that using the hash function.

Now, the second embodiment of a document detection system according to the present invention will be described in detail.

This second embodiment is a modification of the first embodiment described above concerning the operation of the detection result display unit 207. The features other than the operation of the detection result display unit 207 are substantially equivalent as those of the first embodiment described above.

Figure 24A:
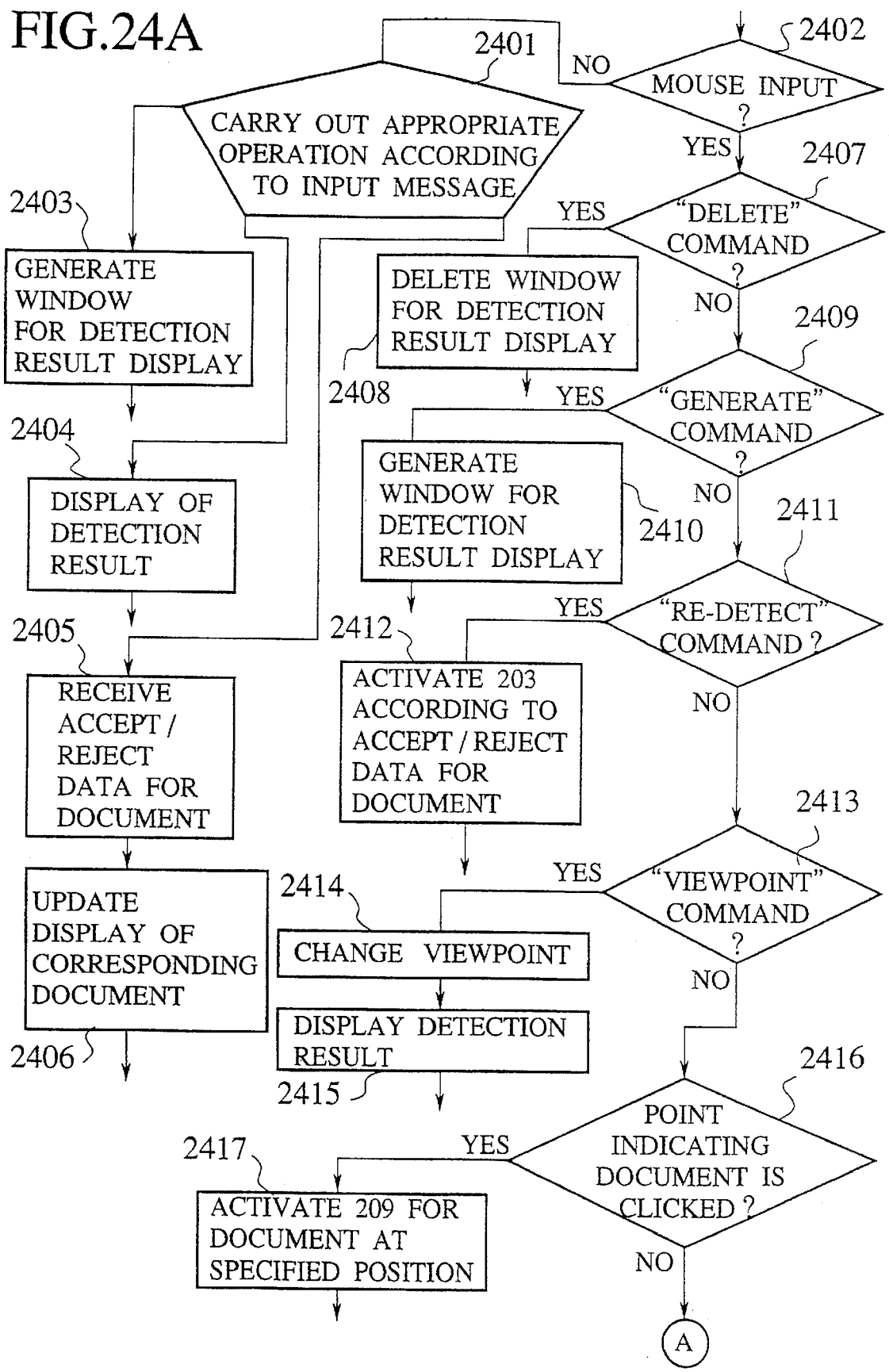
FIGS. 24A and 24B are a flow chart for the modified operation of the detection result display unit in a second embodiment of a document detection system according to the present invention.
Figure 24B:
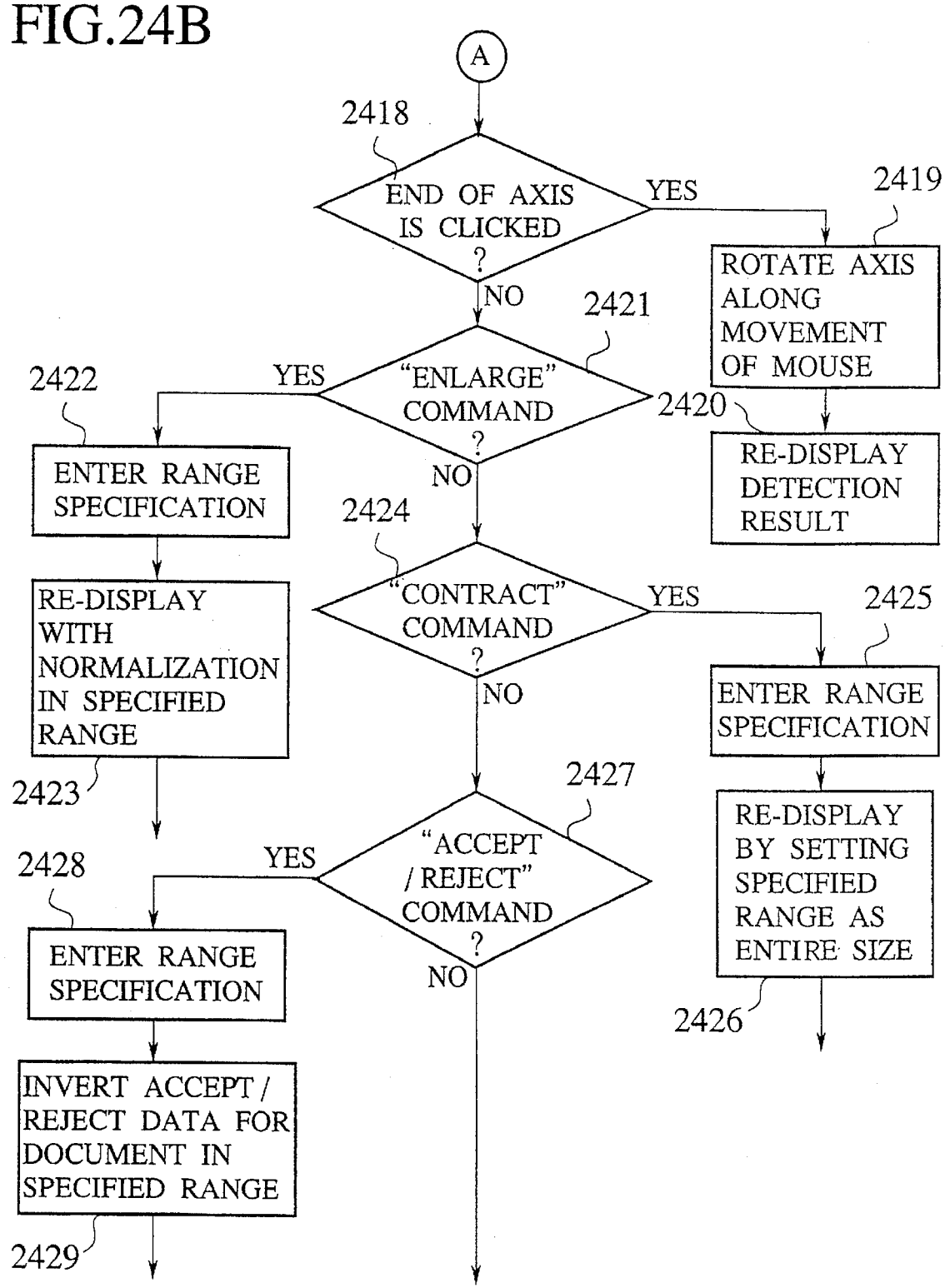

Namely, in this second embodiment, the detection result display unit 207 operates according to the flow chart of FIGS. 24A and 24B as follows.

First, whether an input message is a mouse input from the user or not is judged at the step 2402. If not, in accordance with the input message, the operation selectively proceeds to an appropriate one of the following operations of the steps 2402, 2403, 2404, and 2405 as described below from the step 2401. Here, the step 2403, 2404, 2405, and 2406 are equivalent to the steps 1802, 1803, 1804, and 1805 in the flow chart of FIG. 18 for the first embodiment, so that their descriptions will be omitted.

In a case of the mouse input, if the mouse input is a "delete" command, a "generate" command, a "re-detect" command, or a "viewpoint" command is sequentially judged at steps 2407, 2409, 2411, and 2413. When it is one of these commands, the operation proceeds to the steps 2408, 2410, 2412, or 2414 and 2415, respectively, which are equivalent to the steps 1810, 1802, 1807, or 1808 and 1809, respectively, in the flow chart of FIG. 18 for the first embodiment, so that their descriptions will be omitted. In addition, whether the mouse input is a clicking of a point indicating the document or not is judged at the step 2416. If so, the operation proceeds to the step 2417 which is equivalent to the step 1806 in the flow chart of FIG. 18 for the first embodiment, so that its description will be omitted.

Next, whether the mouse input is a clicking of an end of an axis or not is judged at the step 2418. If so, the axis specified by the clicking is rotated along the movement of the mouse entered by the user while appropriately enlarging or contracting the axis at the step 2419. For example, starting from the display as shown in a part (a) of FIG. 25, one axis can be rotated as shown in a part (b) of FIG. 25, or an origin can be shifted by rotating the axes together as shown in a part (c) of FIG. 25. Then, using the axes in changed orientations, the detection result is re-displayed at the step 2420.

Otherwise, whether the mouse input is an "enlarge" command or not is judged at the step 2421. If so, a range specification for a portion to be enlarged is entered by the user as shown in a part (d) of FIG. 25 at the step 2422. Then, the enlarged display is re-displayed by applying a normalization in the specified range. Namely, the enlarged display is obtained by re-scaling the distances according to the following equation (9).

$$Dist'(Q, Di) = \begin{pmatrix} b1' \\ b2' \\ b3' \\ . \\ . \\ . \\ bN' \end{pmatrix} \quad (9)$$

where bj'=aj/Rj, aj is an element of Dist(Q, Di), and Rj is a range of each axis obtained by a range specification.

Otherwise, whether the mouse input is a "contract" command or not is judged at the step 2424. If so, a range specification for a portion to be contracted is entered by the user at the step 2425. Then, the contracted display is re-displayed by setting the specified range as an entire size. Namely, the contracted display is obtained by re-scaling the distances according to the following equation (10).

$$Dist''(Q, Di) = \begin{pmatrix} b1'' \\ b2'' \\ b3'' \\ . \\ . \\ . \\ bN'' \end{pmatrix} \quad (10)$$

where bj''=aj×Rj, aj is an element of Dist(Q, Di), and Rj is a range of each axis obtained by a range specification.

Otherwise, whether the mouse input is a "accept/reject" command or not is judged at the step 2427. If so, a range specification for a portion within which the accept/reject data of the documents are to be inverted is entered by the user at the step 2428. Then, the display in which the accept/reject data for each document in the specified range is inverted is re-displayed at the step 2429.

It is to be noted that the above steps 2421 to 2427 may be modified such that the range specification can be made first, before the command content is specified.

It is also to be noted that in the detection result display by the detection result display unit 207, the perspective with respect to the origin in the depth direction can be expressed by the overwriting the data point and the title of the document located on a closer side over the data point and the title of the document located on a farther side. Moreover, the other computer graphic techniques for expressing the three-dimensional perspective such as a color gradation or a shading may be employed in addition, if desired.

It is also to be noted that, after the last step of each operation sequence in this flow chart of FIG. 24, the next input event such as the mouse input is awaited, and the operation starts from the beginning in response to the next input event.

Now, the third embodiment of a document detection system according to the present invention will be described in detail.

This third embodiment is a further modification of the second embodiment described above concerning the operation of the detection result display unit 207. The features other than the operation of the detection result display unit 207 are substantially equivalent as those of the first embodiment described above.

Namely, in this third embodiment, the detection result display unit 207 additionally operates according to the flow chart of FIG. 26A as follows.

Here, before the step 2618, the detection result display unit 207 can carry out the operations similar to those of the steps 2401 to 2417 of FIG. 24 for the second embodiment.

Then, at the step 2618, whether the mouse input is a "rotate" command or not is judged. If so, the input event is awaited at the step 2619, and whether the next input event is a clicking of a vicinity of an axis or not is judged at the step 2620.

If so, each data point representing each document of the detection result is rotated by a prescribed angle θ around the axis specified by the mouse input, and the new coordinates of each data point after the rotation are obtained at the step 2621. Then, the detection result is displayed by using the new coordinates obtained at the step 2621 for each data point at the step 2622.

Figure 26A:
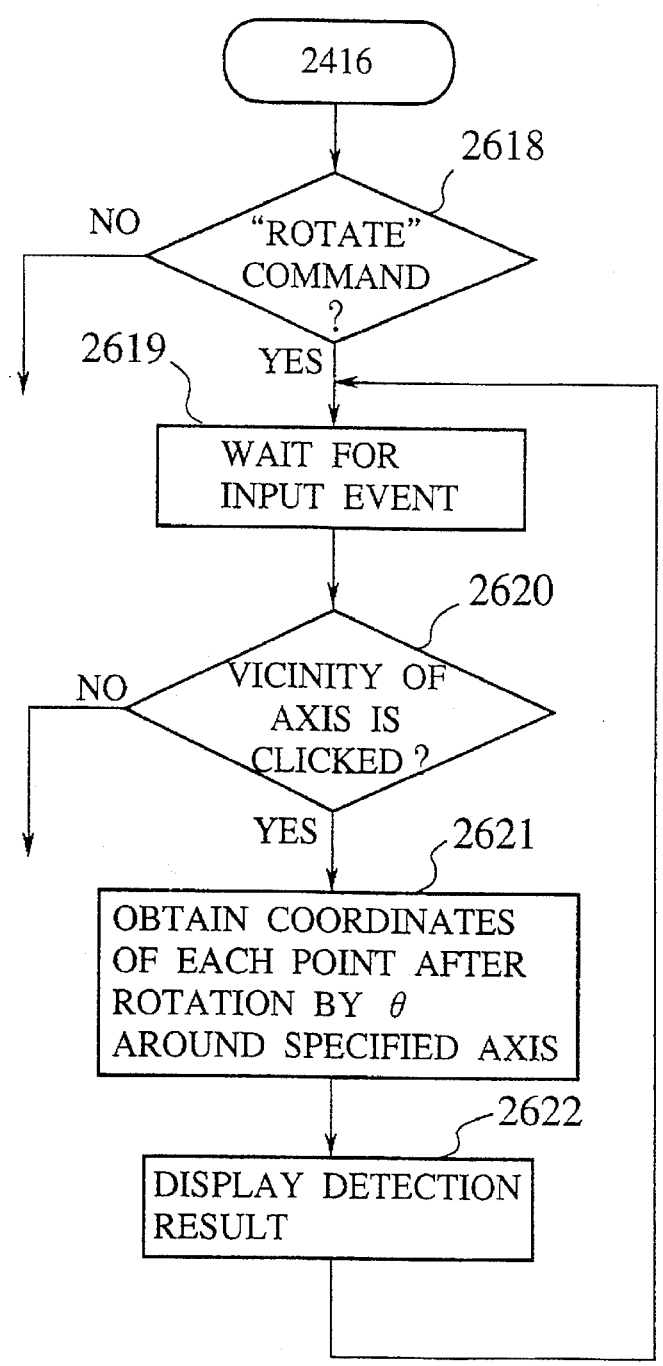
FIGS. 26A and 26B are a flow chart for the modified operation of the detection result display unit in a third embodiment of a document detection system according to the present invention.
Figure 26B:
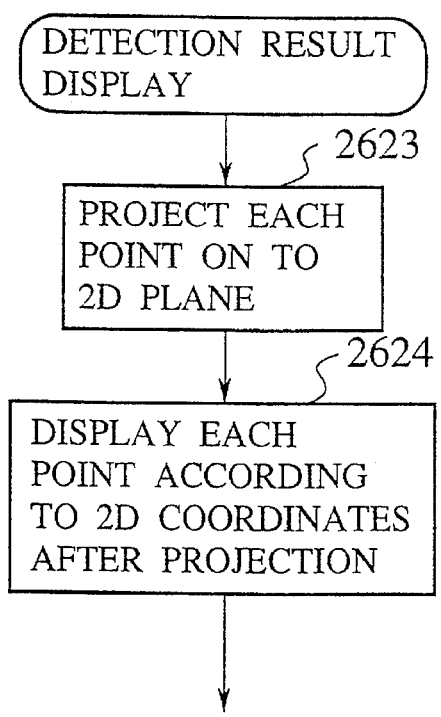

Here, the display of the detection result at the step 2622 can be carried out according to the flow chart of FIG. 26B, in which the coordinates of each data point representing each document of the detection result are projected onto a prescribed two-dimensional plane at the step 2623, and then the detection result display is obtained according to the projected coordinates of each data point on the two-dimensional plane. This detection result display operation of FIG. 26B can also be employed at the other steps requiring the detection result display such as those of the steps 2404, 2415, and 2420 in the flow chart of FIG. 24 for the second embodiment.

In the detection result display operation of FIG. 26B, the projection onto the two-dimensional plane is necessary obviously because of the need to present the multi-dimensional detection result display on a two dimensional display screen.

To this end, the general method for projecting a point in a certain dimensional coordinate system into a lower dimensional coordinate system is mathematically well known as a projection onto a partial space. The projection onto the two-dimensional plane at the step 2623 corresponds to a special case of this general method, so that this well known general method can be utilized at the step 2623.

As for the rotation at the step 2621, it is also well known that the coordinate vector "a" of each point can be transformed into a rotated coordinate vector "a'" by a rotation around a z-axis by an angle θ according to the following equation (11).

$$a' = \begin{pmatrix} \cos\theta & -\sin\theta & 0 \\ \sin\theta & \cos\theta & 0 \\ 0 & 0 & 1 \end{pmatrix} \quad (11)$$

Thus, in a case of the steps 2621 and 2622 in FIG. 26A, after the coordinates of all the data points are transformed according to this equation (11), the projection onto the two dimensional plane can be carried out to obtain the detection result display after the rotation.

Here, the general rotation around an arbitrary axis can be expressed as a linear combination of the rotations around three orthogonal coordinate axes, so that the rotation around any given axis can be obtained by sequentially carrying out the rotation around each of the orthogonal coordinate axes.

Figure 27A:
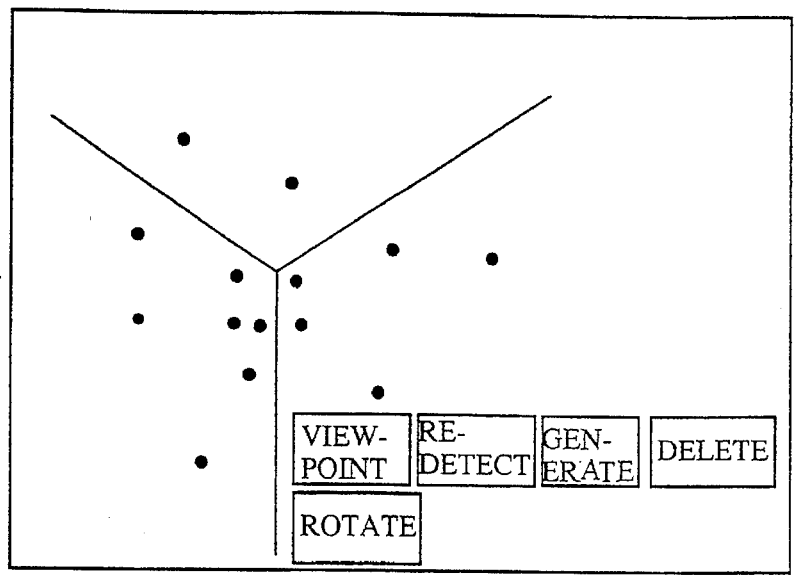
FIGS. 27A, 27B, and 27C are schematic illustrations of exemplary detection result displays presented by the detection result display unit according to the flow chart of FIGS. 26A and 26B.
Figure 27B:
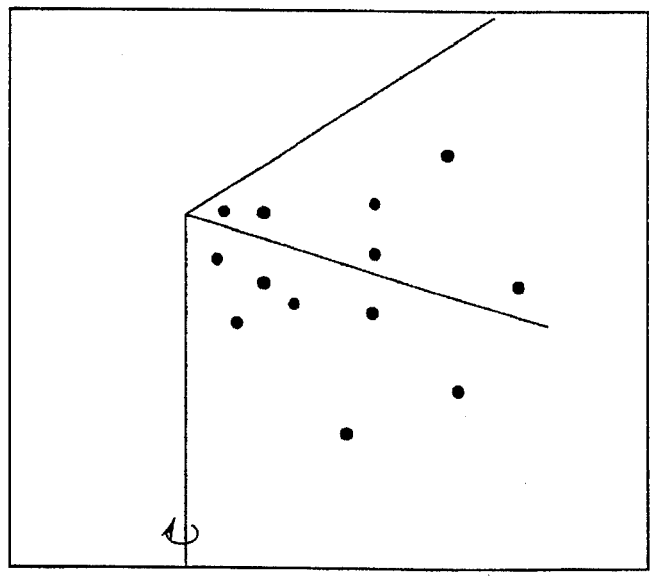

As an example, when the detection result display shown in FIG. 27A is rotated by selecting the "rotate" button and clicking a vicinity of the vertical axis in FIG. 27A, the detection result display can be changed as shown in FIG. 27B in which the entire detection result display is rotated around the vertical axis for a prescribed angle.

Figure 27C:
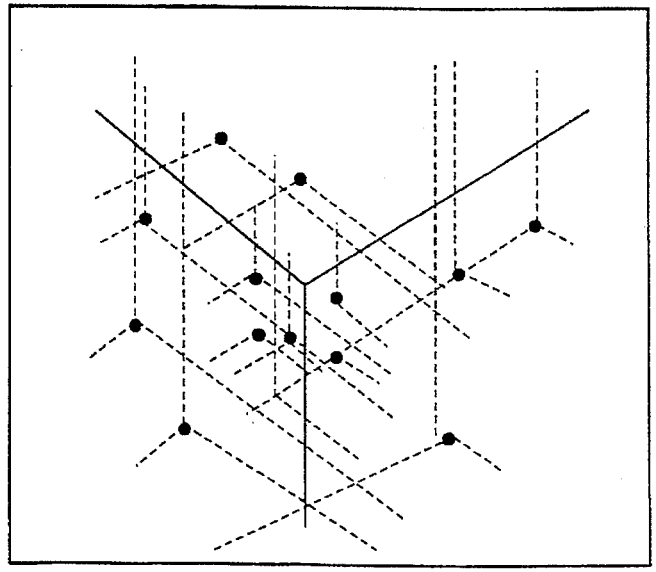

In addition, in obtaining the detection result by the operation of FIG. 26B by projecting the multi-dimensional detection result onto the two dimensional plane, the three-dimensional perspective can be enhanced by providing supplementary line segments as shown in FIG. 27C, where the supplementary line segments for each data point represent line segments extended from each data point along x, y, and z axes until they intersect with the y-z plane, z-x plane, and x-y plane, respectively, defined by the coordinate axes indicated by the solid lines.

It is to be noted that the mouse input used in this third embodiment for the purpose of specifying the rotation operation may be replaced by any other input device capable of the same function, such as a data globe utilized in the three dimensional object display manipulation in the computer graphics for example.

Next, the fourth embodiment of a document detection system according to the present invention will be described in detail.

Figure 28:
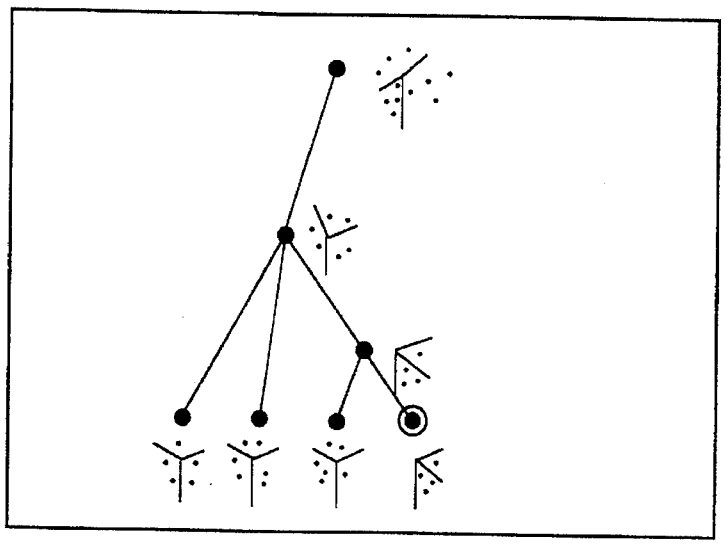
FIG. 28 is an illustration of an exemplary detection record display presented by the detection record display unit in a fourth embodiment of a document detection system according to the present invention.

In this fourth embodiment, the detection record display in a form of a tree structure used in the first embodiment described above is modified to further incorporate the contracted display of the corresponding detection result in a vicinity of each detection node as shown in FIG. 28.

With this modified detection record display of FIG. 28, it becomes easier for the user to comprehend the past detection performances.

Here, the contracted display of the detection result can be obtained by the manner similar to that used in the second embodiment in response to the mouse input for the "contract" command.

Next, the fifth embodiment of a document detection system according to the present invention will be described in detail.

Figure 29:
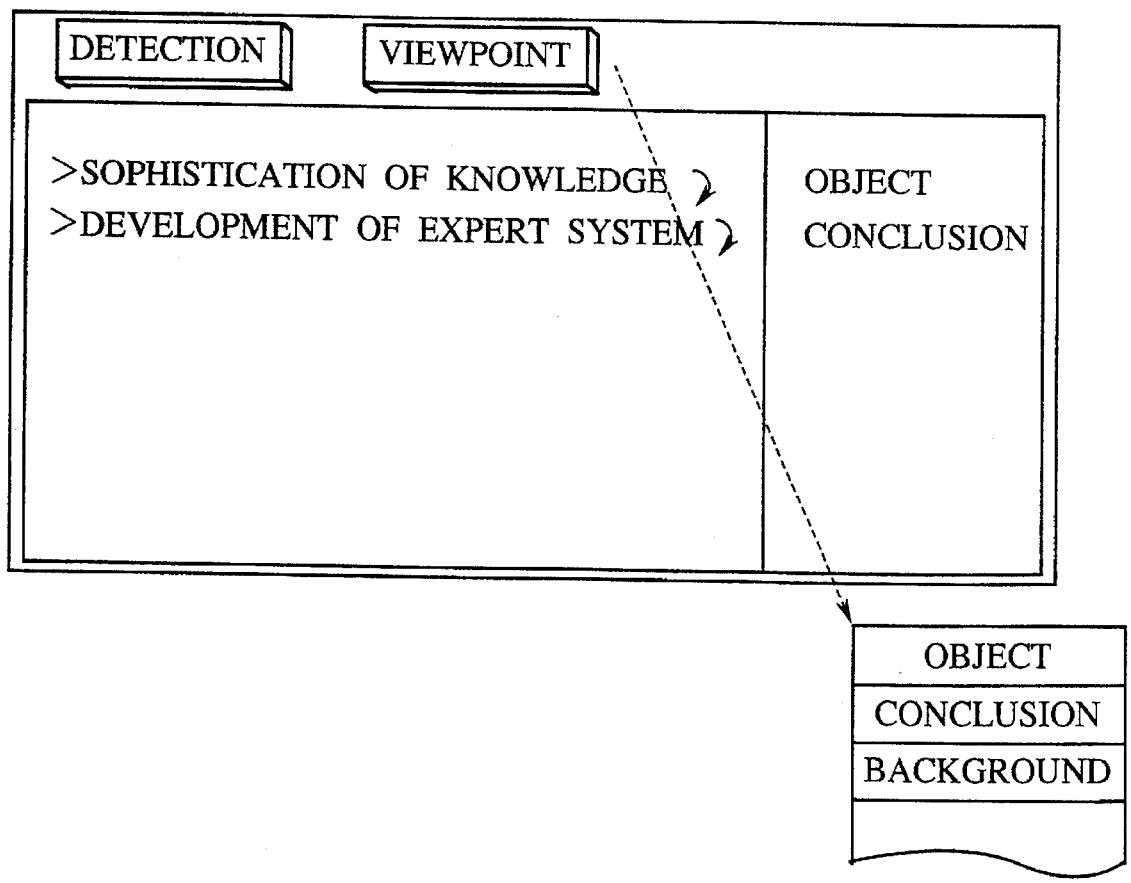
FIG. 29 is an illustration of a window for detection command sentence input used in a fifth embodiment of a document detection system according to the present invention.

In this fifth embodiment, instead of extracting the viewpoint data from the syntactic analysis result of the input sentences and using the default viewpoint setting in a case of the failure to extract any viewpoint data from the syntactic analysis result of the input sentences as in the first embodiment described above, it is made possible to carry out the setting of the viewpoint interactively, in a menu format, by providing a window for detection command sentence input equipped with a button for a viewpoint selection, as shown in FIG. 29. In this case, when the user selects the viewpoint button, the viewpoint menu enlisting all the available viewpoints appears as indicated in FIG. 29, such that the user can select any desired viewpoint from this viewpoint menu. Here, the viewpoint set up immediately before the detection command sentence input is finished by entering the last return is going to be employed for the construction of the detection command.

In the example shown in FIG. 29, a detection command sentence of "sophistication of knowledge" is entered from a viewpoint of "object", while another detection command sentence of "development of expert system" is entered from a viewpoint of "conclusion", as indicated at a right edge field in the window. This window may also have a detection button along the viewpoint button, as indicted in FIG. 29.

Next, the sixth embodiment of a document detection system according to the present invention will be described in detail.

In this sixth embodiment, the first embodiment described above are expanded in several aspects as follows. Here, only those features which are different from the corresponding features in the first embodiment will be described in detail.

Figure 5:
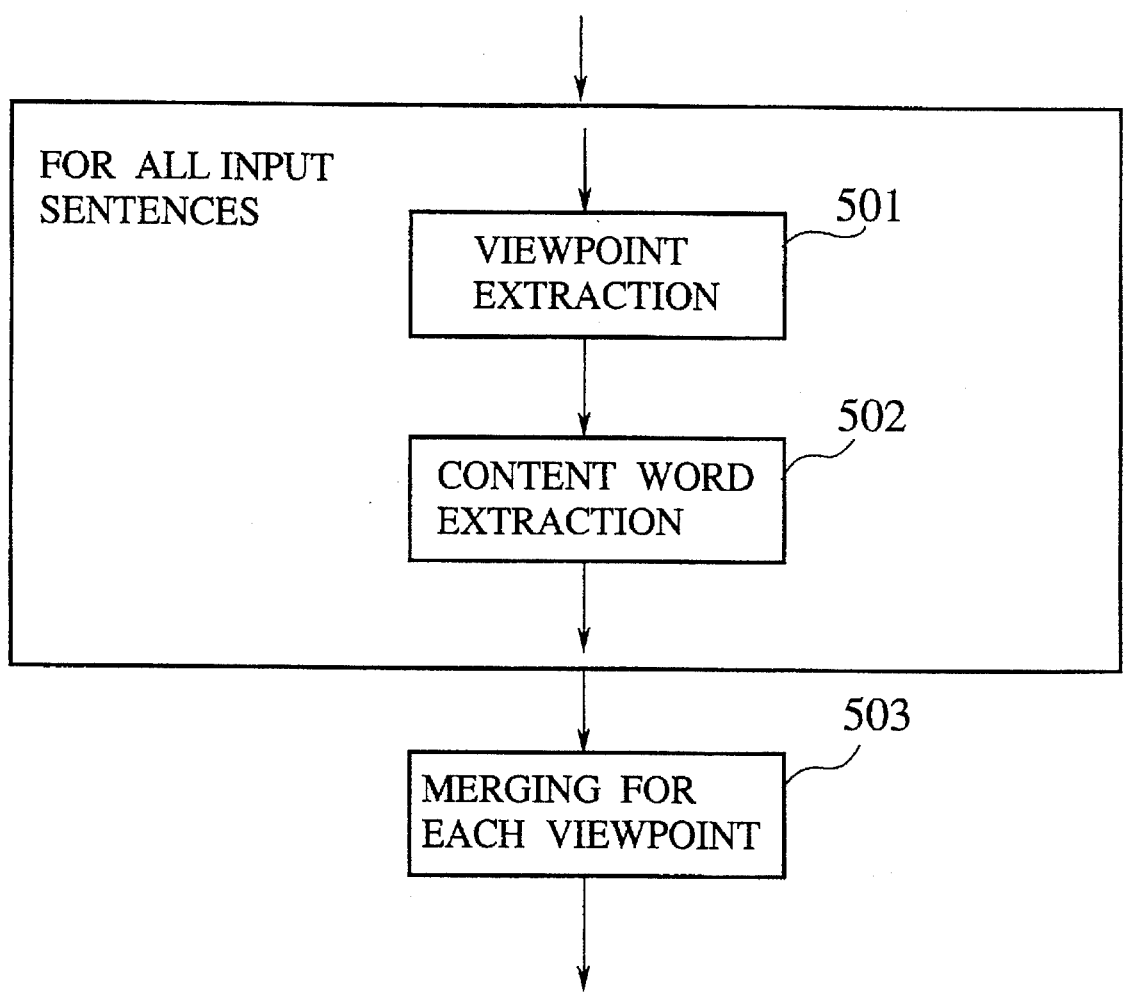
FIG. 5 is a flow chart for the operation of a detection command generation unit in the input analysis unit of FIG. 3.
Figures 30, 31:
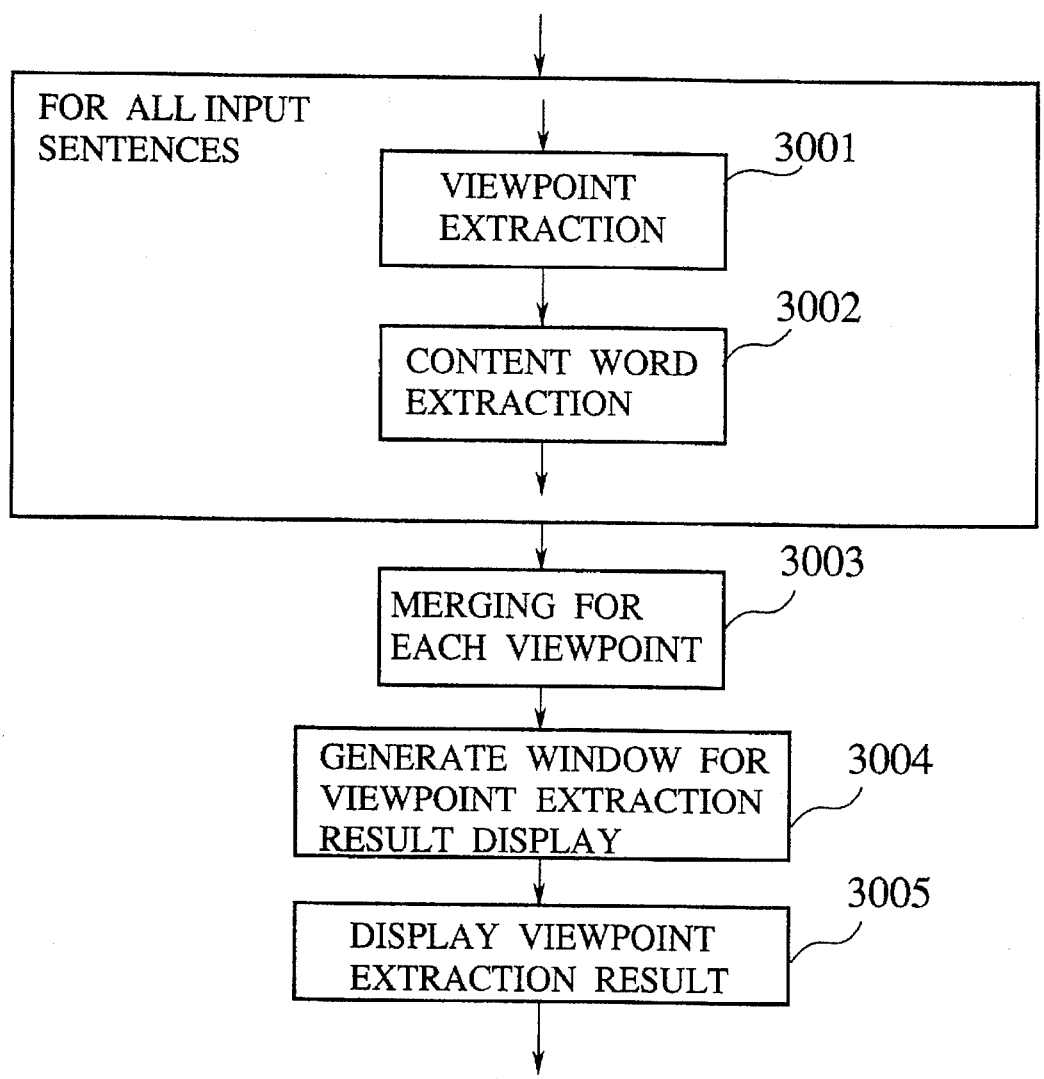
FIG. 30 is a flow chart for the modified operation of the detection command generation unit in a sixth embodiment of a document detection system according to the present invention.
FIG. 31 is an illustration of a viewpoint extraction result presented in the sixth embodiment of a document detection system according to the present invention.

In this sixth embodiment, the detection command generation unit 302 in the input analysis unit 202 operates according to the flow chart of FIG. 30, in which the steps 3001, 3002, and 3003 which are identical to the steps 501, 502, and 503 of FIG. 5 for the first embodiment are followed by a step 3004 in which a window for a viewpoint extraction result display is generated, and a step 3005 in which the viewpoint extraction result is displayed on the window generated at the step 3004.

In this case, the viewpoint extraction itself is carried out similarly to the first embodiment, but the result of the viewpoint extraction is displayed in a form shown in FIG. 31, in which the keywords associated with each viewpoint are tabulated.

Also, in this case, the distance calculation unit 804 of the detection unit 203 receives the viewpoint data along with the keywords and the detection commands from the detection control unit 801 via the data line 808.

On the other hand, the record management control unit 1301 of the record management unit 204 operates according to the flow chart of FIG. 32 as follows.

Figure 14:
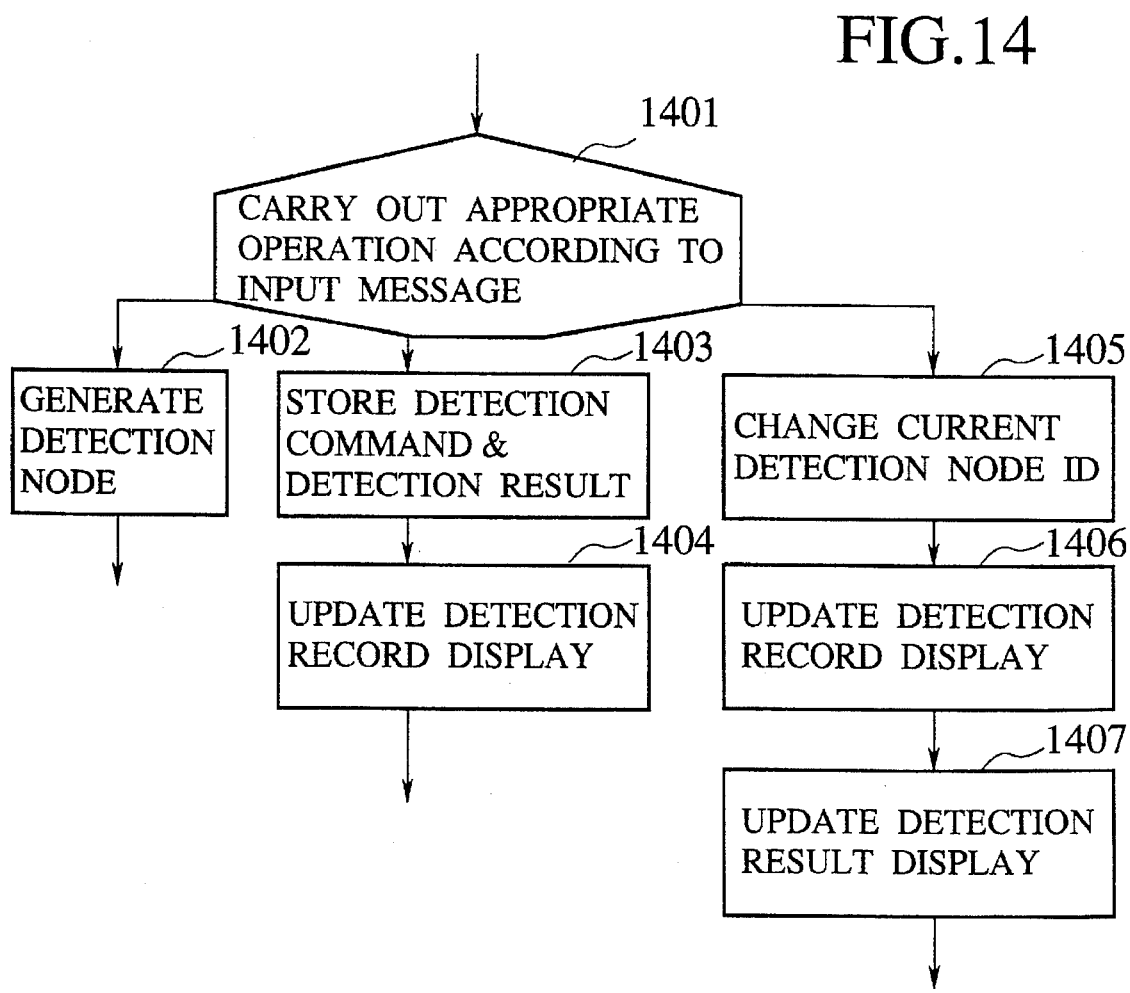
FIG. 14 is a flow chart for the operation of a record management control unit in the record management unit of FIG. 13.

Namely, in this flow chart of FIG. 32, the steps 3201 to 3207 are identical to the steps 1401 to 1407 in FIG. 14 for the first embodiment. In addition, there is provided a step 3208 between the steps 3206 and 3207 in which the detection node data are updated and displayed, and a step 3209 that can be proceeded from the step 3201 in which the accept/reject data for the documents are stored.

In this case, each detection node is given in a format as shown in FIG. 33 along with an example, where, in addition to the detection node ID, the parent node ID, the detection commands, and the detection results included in FIG. 15 for the first embodiment, FIG. 33 further includes a detection date and time, a detected input sentence, a number of detected documents, a number of OK documents, a list of the OK documents, a number of NG documents, and a list of the NG documents. Here, entries concerning the detection reflects the detection operation, while entries concerning the OK documents and the NG documents indicates the accept/reject data for the documents entered by the user at the browsing unit 209.

Figure 35A:
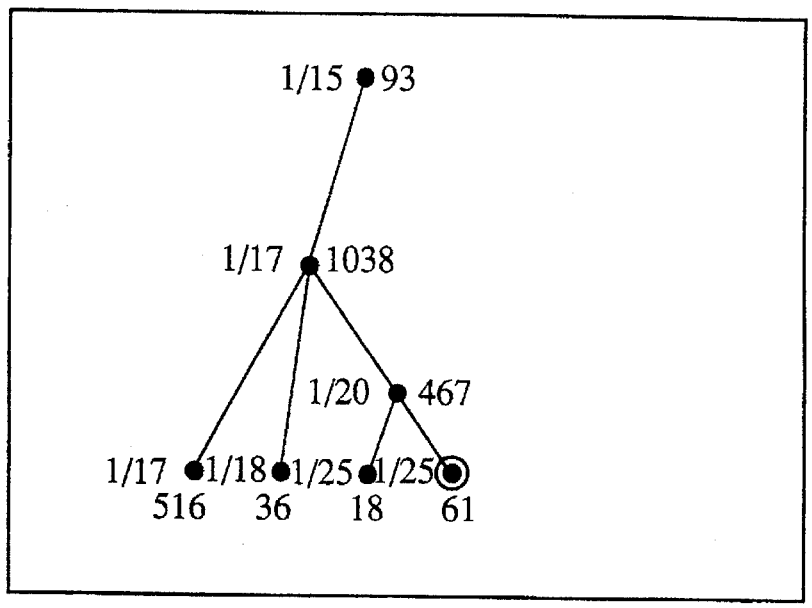
FIGS. 35A and 35B are illustrations of exemplary detection record displays presented by the detection record display unit in the sixth embodiment of a document detection system according to the present invention.
Figure 35B:
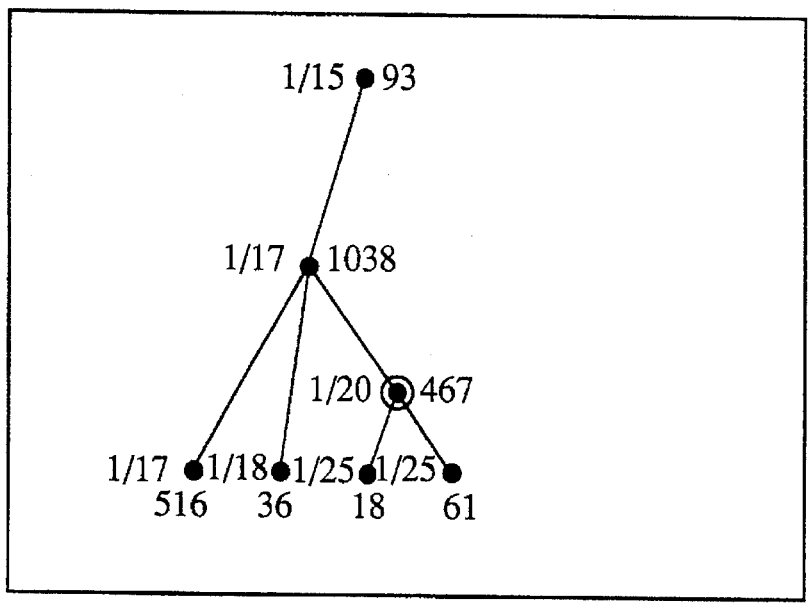

The detection record display unit 208 displays the detection record display in a form of the tree structure shown in FIG. 35A, which differs from that of FIG. 17A in that each detection node is represented by a black dot is accompanied by the detection date on left side and the number of detected documents on right side.

More specifically, the detection record display unit 208 operates according to the flow chart of FIG. 34 as follows.

Figure 34:
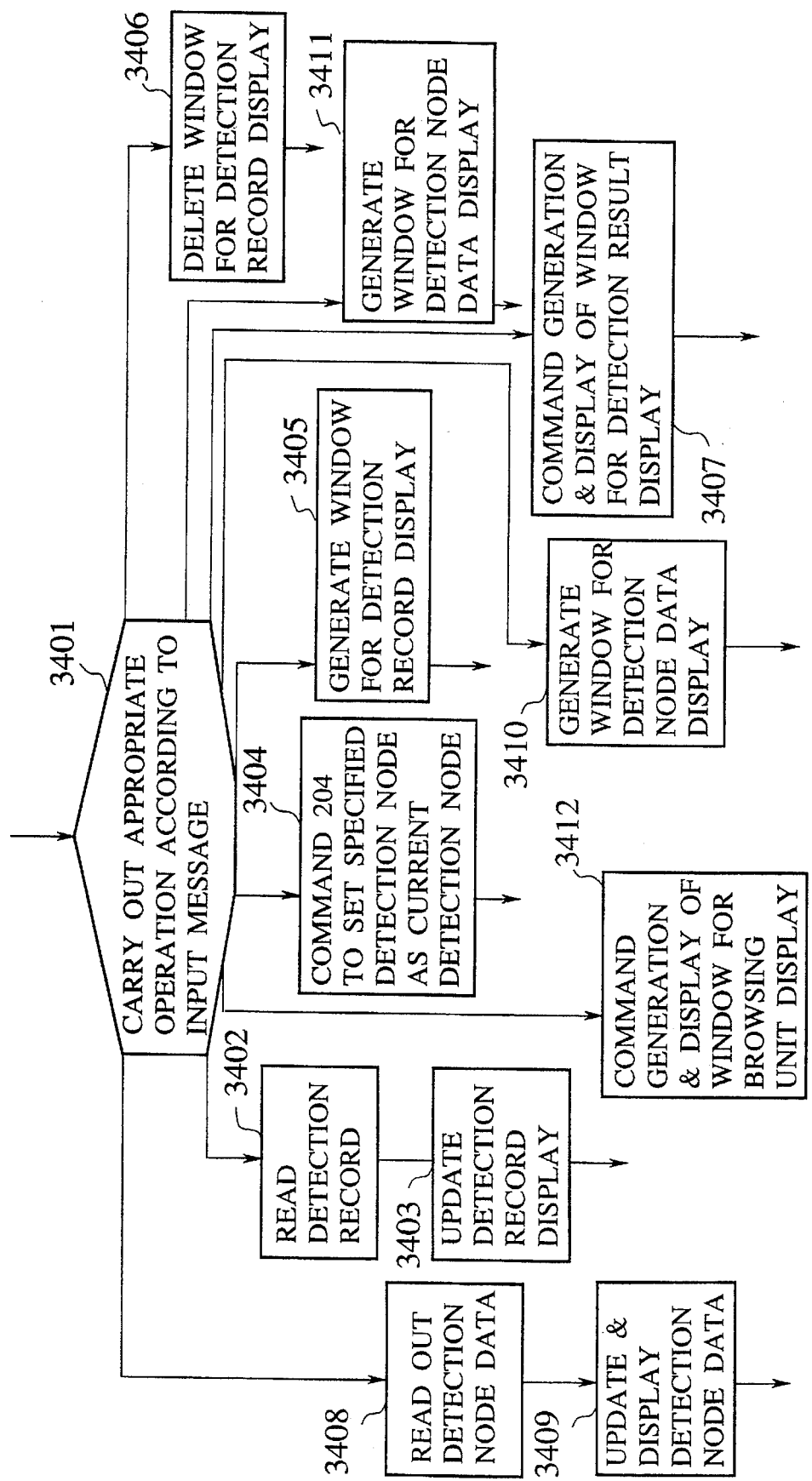
FIG. 34 is a flow chart for the modified operation of the detection record display unit in the sixth embodiment of a document detection system according to the present invention.

Namely, in this flow chart of FIG. 34, the steps 3401 to 3407 are identical to the steps 1601 to 1607 in FIG. 16 for the first embodiment. In addition, there is provided a step 3408 in which the detection node data are read out, followed by a step 3409 in which the read out detection node data are updated and displayed. Moreover, there are a step 3410 in which a window for the detection node data display is generated, a step 3411 in which a window for the detection node data display is generated, and a step 3412 in which a generation and a display of the window for the browsing unit display are commanded in a case the user specified the OK document name or the NG document name.

Here, the detection node data is displayed on the window for the detection node data display at the step 3411 in an exemplary form as shown in FIG. 36 in correspondence to the detection node of FIG. 33.

In this sixth embodiment, the detection result display unit 207 operates according to the flow chart of FIG. 37 as follows.

Figure 37:
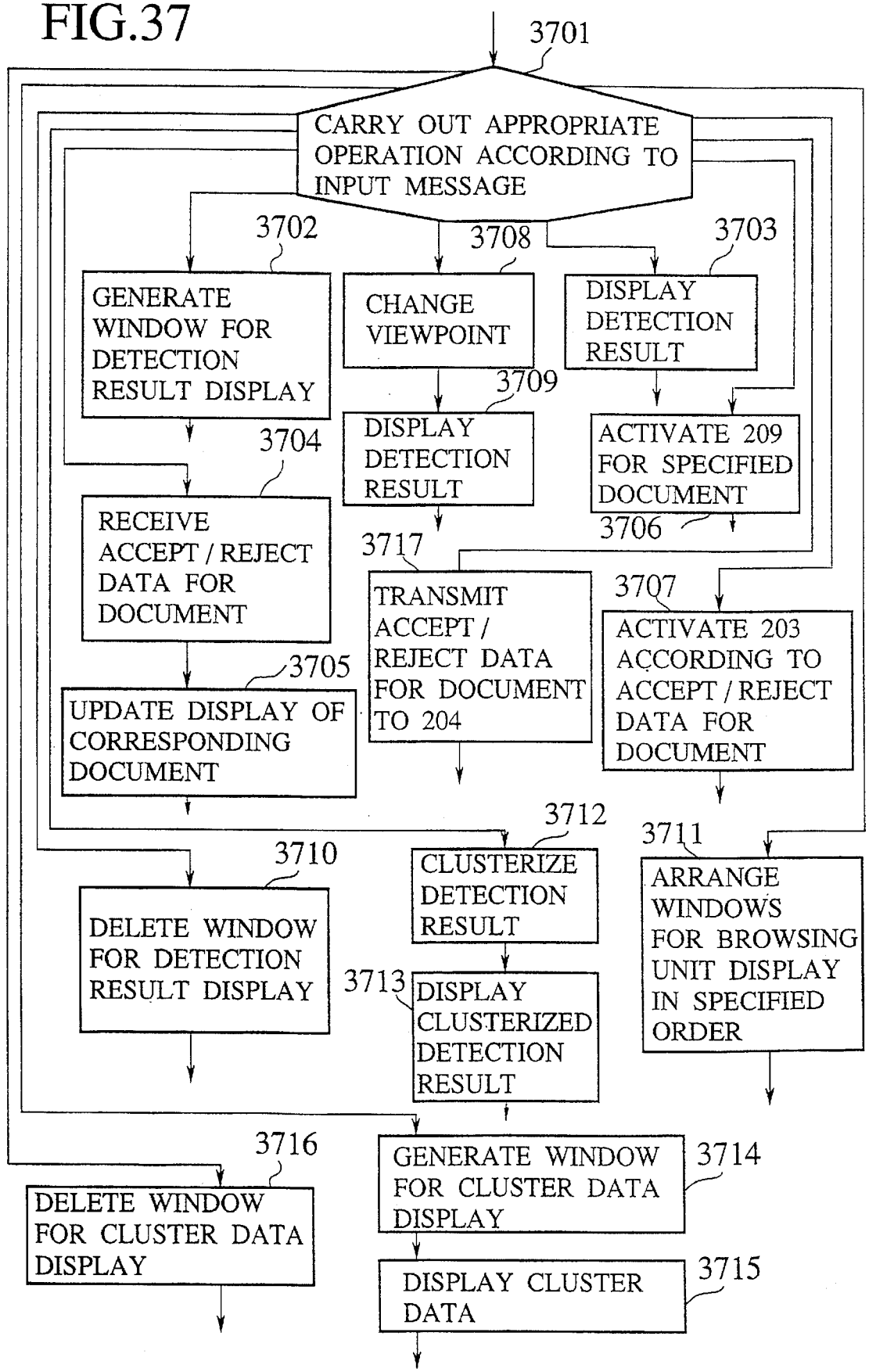
FIG. 37 is a flow chart for the modified operation of the detection result display unit in the sixth embodiment of a document detection system according to the present invention.

Namely, in this flow chart of FIG. 37, the steps 3701 to 3710 are identical to the steps 1801 to 1810 in FIG. 18 for the first embodiment.

In addition, in this sixth embodiment, there is a prescribed threshold for clusterizing to decide whether or not to clusterize the detection result display in which the documents within a prescribed distance range are grouped together to form a cluster to be displayed collectively. In a case a total number of detected documents does not exceeds this prescribed threshold, the multi-dimensional display of the detection result is made at the step 3703 just as in the first embodiment.

On the other hand, when the total number of detected documents exceeds the prescribed threshold, the detection result is clusterized at the step 3712, and then the clusterized detection result is displayed at the step 3713.

Figure 38:
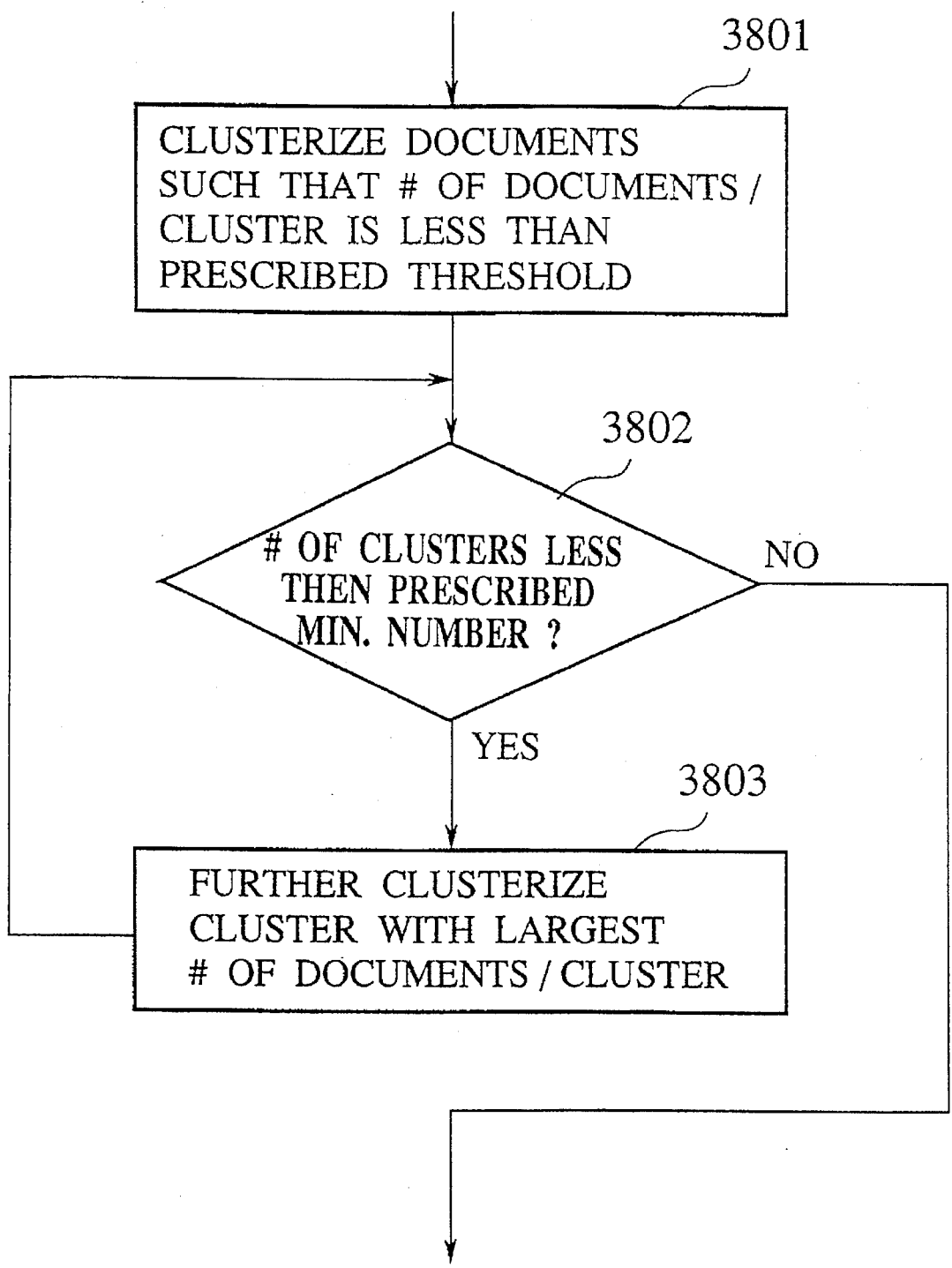
FIG. 38 is a flow chart for the clusterization at the detection result display unit in the flow chart of FIG. 37.

Here, the clusterization at the step 3712 is carried out according to the flow chart of FIG. 38 as follows. Namely, first the detected documents of the detection result are clusterized such that a number of detected documents per each cluster becomes less than the prescribed threshold for clusterizing at the step 3801. Then, whether a number of clusters resulting from the step 3801 is less than a prescribed minimum number of clusters or not is determined at the step 3802. When the number of clusters resulting from the step 3801 is less than the prescribed minimum number of clusters at the step 3802, a cluster having a largest number of detected documents is further clusterized at the step 3803 and the operation returns to the step 3802.

In further detail, the clusterization at the step 3801 is carried out according to the flow chart of FIG. 39 as follows. Namely, first the coordinate space of the detection result display is divided into eight sub-spaces at planes parallel to two coordinate axes and passing through a center of another one coordinate axes at the step 8901. Then, whether a number of detected documents in any sub-space is greater than a prescribed threshold for clusterizing is determined at the step 3902. When there is a sub-space for which the number of detected documents is greater than the prescribed threshold at the step 8902, this sub-space containing an excessive number of detected documents is further divided into eight sub-spaces at the step 8903, and the operation returns to the step 8902.

Figures 39, 40:
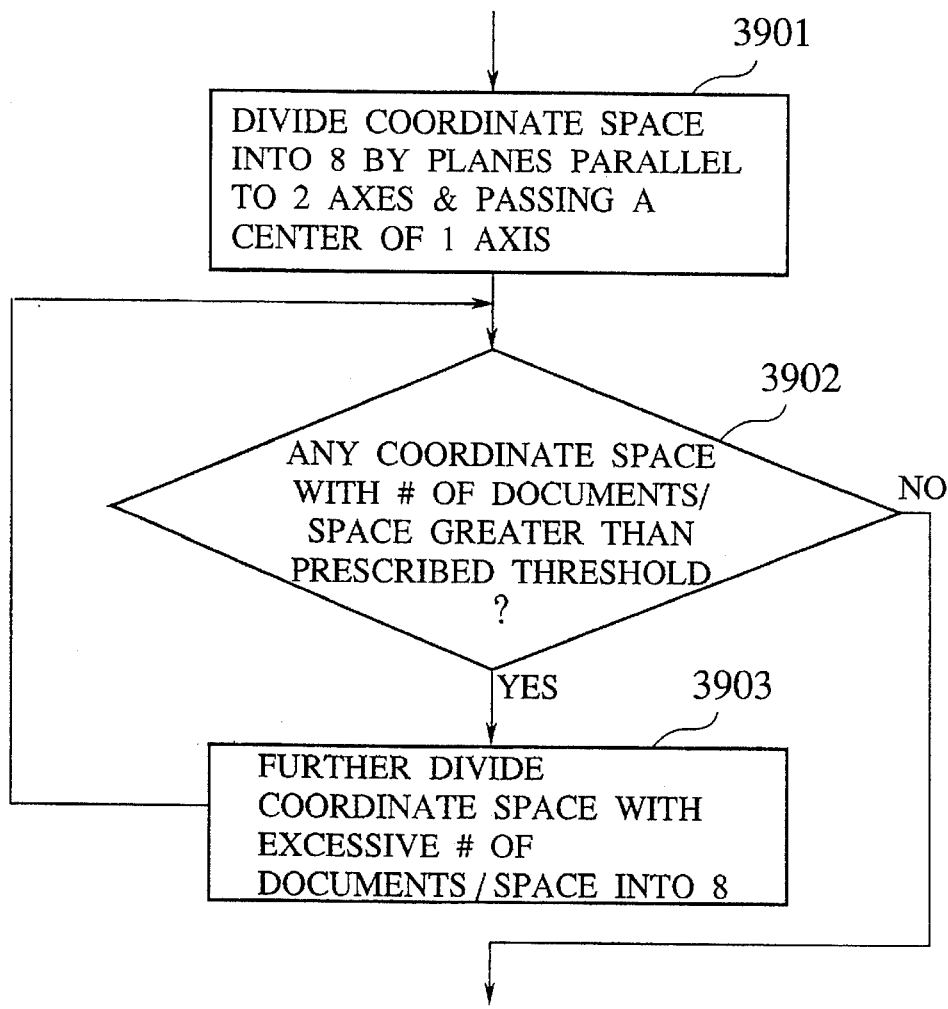
FIG. 39 is a flow chart for the clusterization at the detection result display unit in the flow chart of FIG. 38.
FIG. 40 is an illustration of a format and an example for a cluster document data presented by the detection result display unit in the sixth embodiment of a detection system according to the present invention.

In this clusterization operation of FIG. 89, the cluster document data shown in FIG. 40 for indicating the correspondences between the clusters and the detected documents are generated, to keep track of the clusterization operation.

Figure 41:
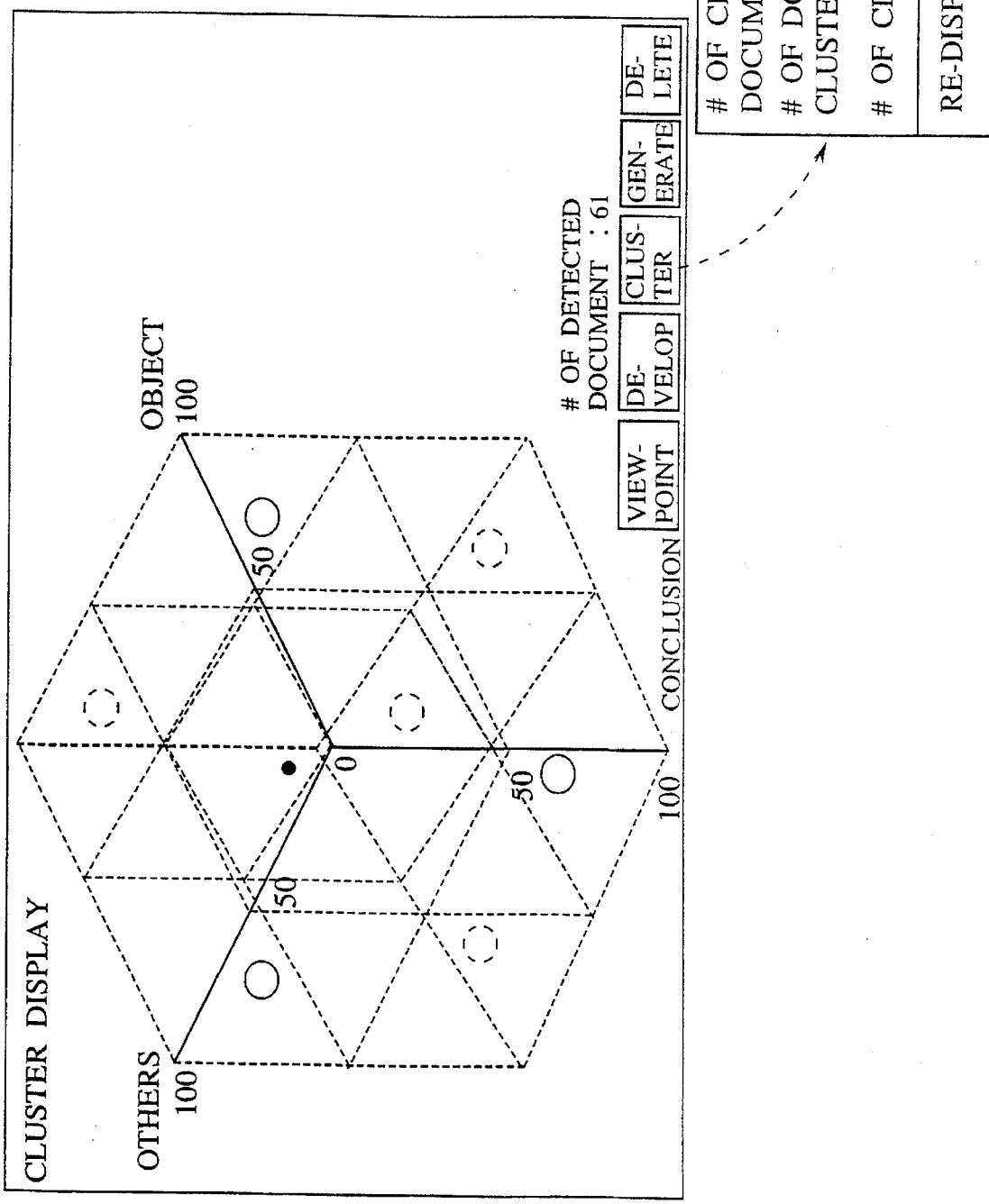
FIG. 41 is an illustration of an exemplary detection result display in a cluster display mode presented by the detection result display unit in the sixth embodiment of a detection system according to the present invention.

In this case, the clusterized detection result is displayed on the window for detection result display in an exemplary cluster display mode shown in FIG. 41, where each cluster is displayed according to a distance with respect to the detection commands at an origin in a three-dimensional space formed by axes representing the viewpoints. Here, each cluster is represented as a small sphere located at a coordinate position calculated from the coordinate positions of the detected documents contained in each cluster, such as an average coordinate position of the coordinate positions of the detected documents contained in each cluster for example. It is also possible to display a title of an arbitrary detected document contained in each cluster along the small sphere representing each cluster as a representative title.

In addition, the number of detected documents contained in each cluster is expressed by changing a size or a concentration level of each small sphere in accordance with the number of detected documents contained in each cluster. It is also possible to indicate the number of detected documents contained in each cluster by numerals to be displayed inside or in a vicinity of the small sphere representing each cluster.

It is also to be noted that in the detection result display in the cluster display mode of FIG. 41 by the detection result display unit 207, the perspective with respect to the origin in the depth direction can be expressed by the overwriting the small sphere for the cluster located on a closer side over the small sphere for the cluster located on a farther side. Moreover, the other computer graphic techniques for expressing the three-dimensional perspective such as a color gradation or a shading may be employed in addition, if desired. It is also possible to assign a serial number for the clusters in an increasing order of the distance with respect to the origin, and indicate this serial number for each cluster by numerals to be displayed inside or in a vicinity of the small sphere representing each cluster.

In addition, the detection result display in the cluster display mode of FIG. 41 also contains an indication of the total number of the detected documents, and displayed buttons for "viewpoint", "develop", "cluster", "generate", and "delete".

When the displayed button "cluster" is selected, a window for a cluster data display is generated at the step 3714 of FIG. 37, and the cluster data indicating a number of clusterized documents, a number of detected documents per cluster, and a number of clusters are displayed in this window at the step 3715, along with a displayed button "re-display" as shown in FIG. 41. Here, the user can change the settings of these numbers freely and command the re-display by selecting "re-display" button to obtain the re-display of the detection result display in the cluster display mode according to the changed settings. Also, by selecting the displayed button "cluster" again in this state, the window for the cluster data display can be deleted by the step 3716 of FIG. 37.

On the other hand, when the displayed button "develop" is selected while specifying at least one cluster by the mouse or other input device on the window for the detection result display, a new window for the detection result display is generated at the step 3702, and the multi-dimensional display for the detected documents within the specified cluster alone is displayed at the step 3703, in a form of an enlarged display in which the coordinate range of the specified cluster is set as an entire display coordinate space.

Here, in a case the user failed to specify the cluster properly, it is possible to display the group of clusters located within a predetermined distance from the specified point together in the enlarged display. Alternatively, it is also possible to display the cluster located closest to the specified point in the enlarged display. It is further possible to display the detected documents contained in the specified cluster sequentially in a prescribed order on the browsing unit 209. It is also possible to change the representative title of the detected document displayed in a vicinity of the small sphere representing each cluster sequentially in a prescribed order among the detected documents contained in each cluster.

Moreover, independently from the user's specification of the cluster, the detected documents of a prescribed number of clusters in an order of the distance with respect to the origin can be displayed on the separate windows for the detection result display, or the detected documents of a prescribed number of clusters in an order of a number of the detected documents contained in each cluster can be displayed on the separate windows for the detection result display. In these case, it is also possible to indicate the correspondences between the small spheres representing clusters and the windows for the detection result display which are displaying the detected documents of these clusters.

In this case, the window for the detection result display can display the detected documents of each cluster in response to the selection of the displayed button "develop" in an exemplary document display mode shown in a part (a) of FIG. 42, which is similar to the entire detection result display of FIG. 19 in the first embodiment, except that each axis representing each viewpoint has an indication for a range of that viewpoint for the displayed cluster. In addition, the detection result display in the document display mode of FIG. 42 also contains indications of the total number of the detected documents, and a number of the detected documents in the displayed cluster, and displayed buttons for "viewpoint", "re-detect", "generate", "delete", and "arrange".

It is also to be noted that in this window for the detection result display in the document display mode of FIG. 42 provided by the detection result display unit 207, the perspective with respect to the origin in the depth direction can be expressed by the overwriting the data point and the title of the document located on a closer side over the data point and the title of the document located on a farther side. Moreover, the other computer graphic techniques for expressing the three-dimensional perspective such as a color gradation or a shading may be employed in addition, if desired. It is also possible to assign a serial number for the detected documents in an increasing order of the distance with respect to the origin, and indicate this serial number for each detected document by numerals to be displayed in a vicinity of the data point representing each detected document.

In a case of using no clusterization as a total number of detected documents does not exceeds the prescribed threshold, the multi-dimensional display of the detection result at the step 8703 can be made similarly, except that the number of the detected documents in the displayed cluster is not included in such a case.

In the detection result displays of FIGS. 41 and 42, the scale on each viewpoint axis is given as a real scale at constant intervals, but it is also possible to utilizes a logarithmic scale if desired. It is also possible to allow the user to select the desired scale. In an example of FIG. 41, the scale runs from 0 to 100, while in an example of FIG. 42, the scale runs from 0 to 50 corresponding to the range covered by the coordinate space for the displayed cluster. Here, it is also possible to set the scale range in FIG. 42 in correspondence to the distance of the detected document or the cluster which is farthest from the origin along each axis within the displayed cluster or cluster group.

When one of the displayed buttons "viewpoint", "generate", or "delete" is selected on the detected result display in the cluster display mode of FIG. 41, the steps 3708 and 3709, 3702, or 3710, respectively, are carried out similarly to the first embodiment.

Similarly, when one of the displayed buttons "viewpoint", "re-detect", "generate", or "delete" is selected on the detected result display in the document display mode of FIG. 42, the steps 3708 and 3709, 3707, 3702, or 3710, respectively, are carried out similarly to the first embodiment.

Also, the detection result display in the document display mode shown in a part (a) of FIG. 42 can be changed to those shown in a part (b) or a part (c) of FIG. 42 in response to the activation of the browsing unit 209 or the accept/reject data entered from the browsing unit 209, just as in the cases of parts (b) and (c) of FIG. 19 in the first embodiment. In this case, the accept/reject data for the documents are memorized until the detection operation is terminated, at which point the accept/reject data for the documents are transmitted to the detection record management unit 204 and stored for the current detection node by the step 3717 of FIG. 37.

On the other hand, when the displayed button "arrange" is selected on the detected result display in the document display mode of FIG. 42, the browsing unit 209 is activated for each of the detected documents specified up to that point, and the windows for the browsing unit display are arranged in an order specified by the user at the step 3711 of FIG. 37.

Figure 43:
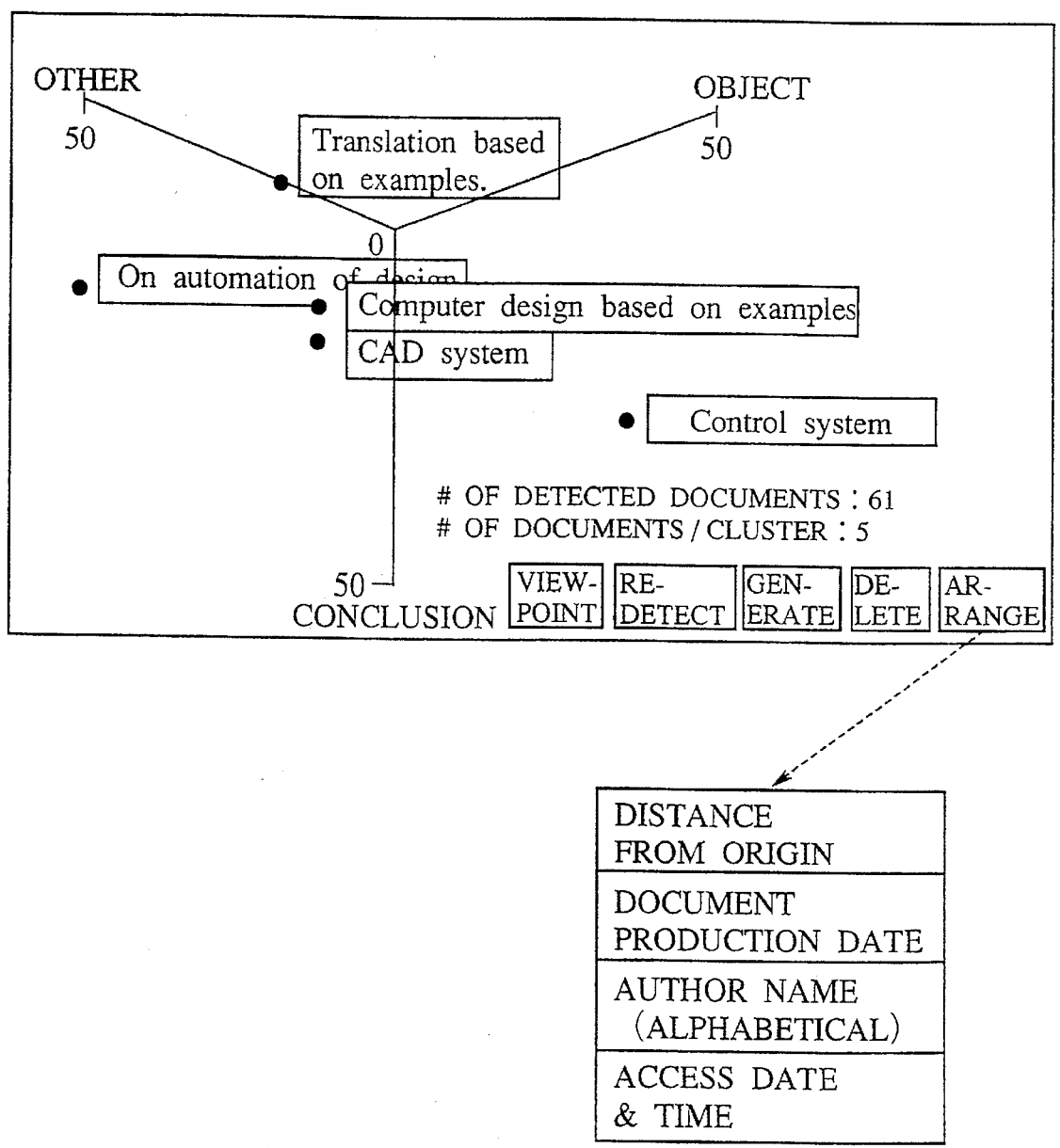
FIG. 43 is an illustration of an exemplary detection result display in a document display mode presented by the detection result display unit in the sixth embodiment of a detection system according to the present invention.

In this case, in response to the selection of the displayed button "arrange", a menu in an exemplary form shown in FIG. 43 appears, from which the manner of arranging the windows for the browsing unit display can be selected. In this example of FIG. 43, the user can choose any one of "distance from origin" arrangement in an increasing order of the distances of the specified documents with respect to the origin, "document production date" arrangement in an increasingly getting older order of the dates for the productions of the specified documents, "author name (alphabetical" arrangement in an alphabetical order of the authors of the specified documents, and "access date & time" arrangement in an increasingly getting older order of the latest accesses to the specified documents for the purpose of the display.

Figure 44A:
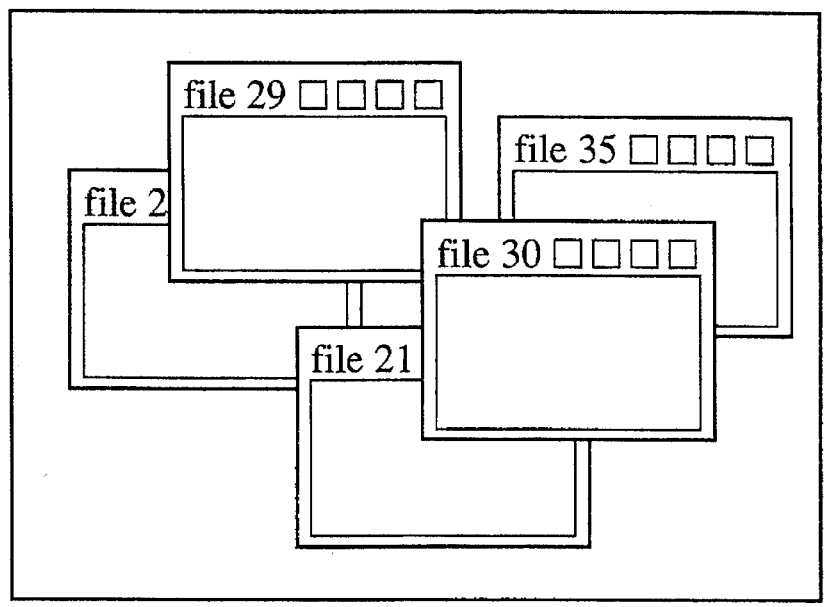
FIGS. 44A and 44B are illustrations of exemplary browsing unit displays presented by the browsing unit in the sixth embodiment of a detection system according to the present invention.
Figure 44B:
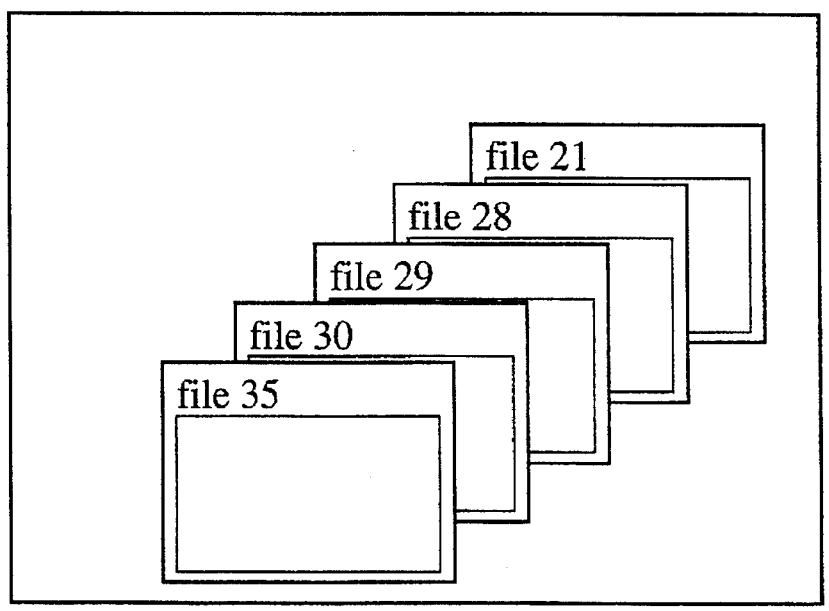

In response to the selection by the user on the menu of FIG. 43, an original state of the windows for the browsing unit display as shown in FIG. 44A can be changed into an arranged state as shown in FIG. 44B. In this display of the windows for the browsing unit display of FIGS. 44A and 44B, it is also possible to change the color of the concentration level of the frame or the background of each window according to a particular order, such as an increasing order of the distances of the specified documents with respect to the origin, a chronological order of the dates for the productions of the specified documents, an alphabetical order of the authors of the specified documents, or a chronological order of the latest accesses to the specified documents for the purpose of the display.

Figure 45:
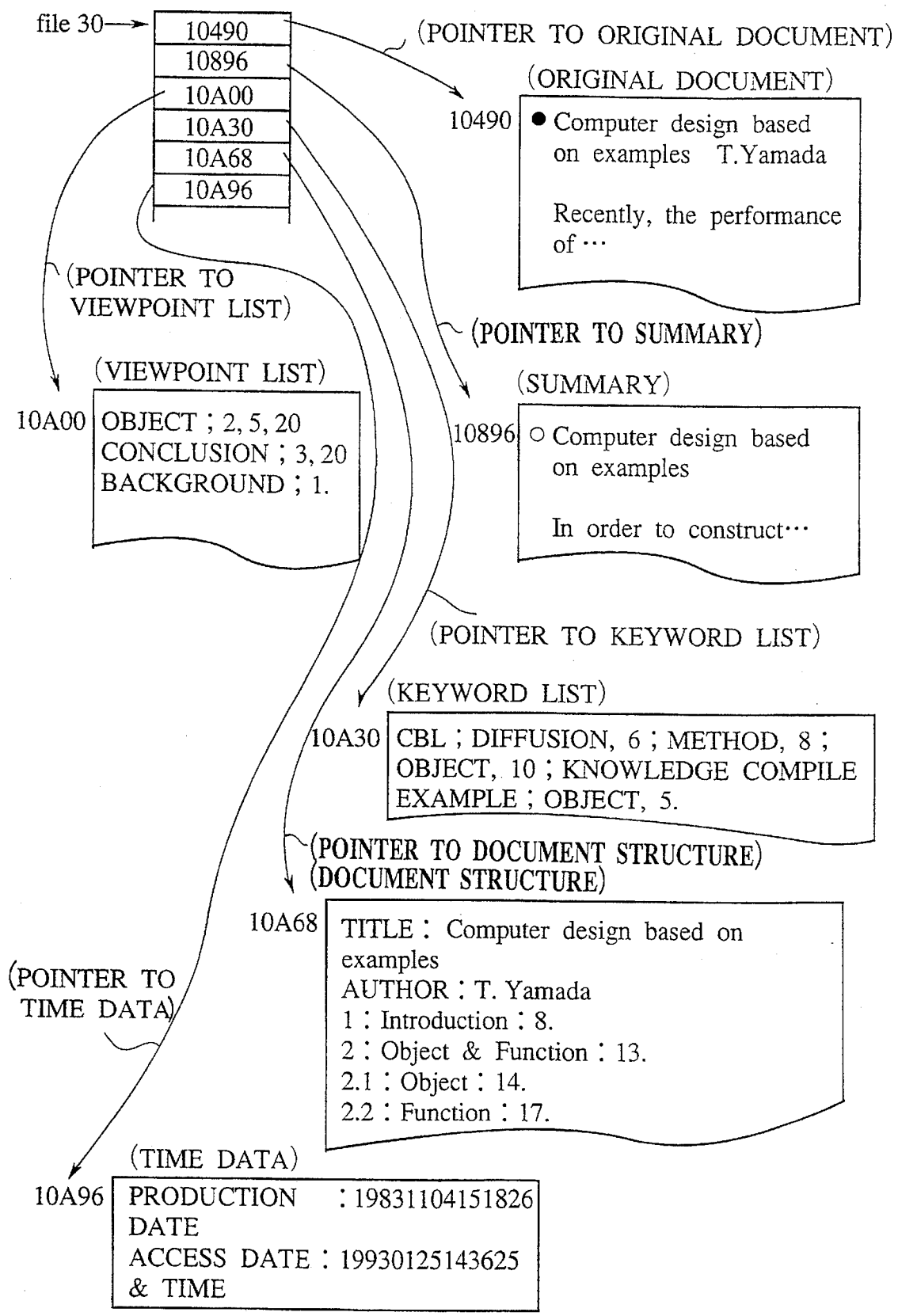
FIG. 45 is a diagrammatic illustration of a data format for the data content of the document stored in the document data memory unit in the sixth embodiment of a detection system according to the present invention.

For the purpose of this arrangement of the windows for the browsing unit display, the data content of the document stored in the document data memory unit 206 in this sixth embodiment further registers a pointer to time data containing the production date and the access data & time information as shown in FIG. 45, in addition to the format of FIG. 22 for the first embodiment.

Next, the seventh embodiment of a document detection system according to the present invention will be described in detail.

In this seventh embodiment, the detection result display unit 207 of the sixth embodiment described above is modified such that the accept/reject data for the documents can be entered on the detection result display in the cluster display mode of FIG. 41 or the detection result display in the document display mode of FIG. 42 provided by the detection result display unit 207, as follows.

Figure 46:
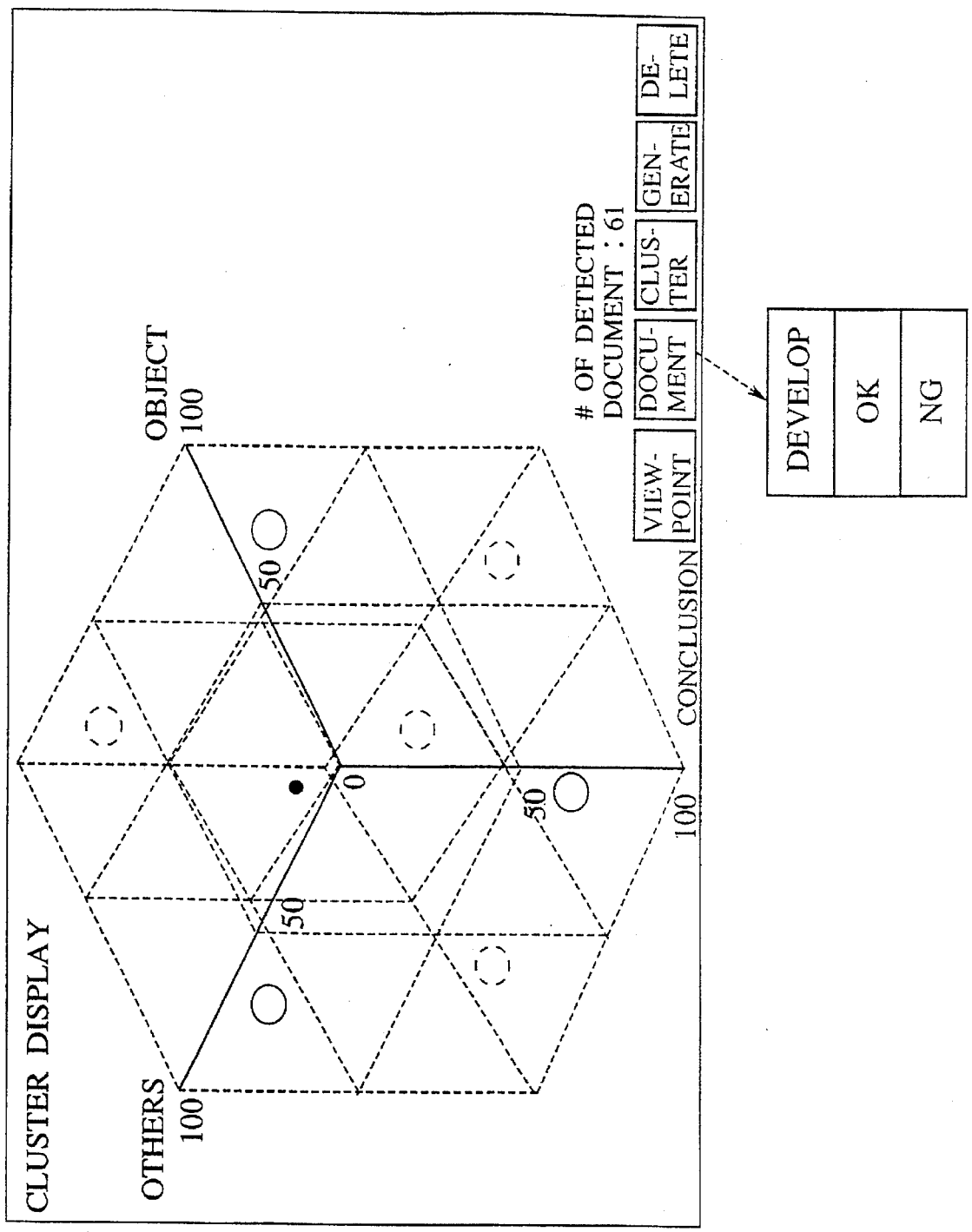
FIG. 46 is an illustration of an exemplary detection result display in a cluster display mode presented by the detection result display unit in the seventh embodiment of a detection system according to the present invention.

Namely, in this seventh embodiment, the detection result display in the cluster display mode is given in a form shown in FIG. 46 which contains a displayed button "document" instead of the displayed button "develop" in FIG. 41.

When this displayed button "document" is selected by the user after specifying at least one cluster, a menu containing items "develop", "OK", and "NG" appears as shown in FIG. 46. When the item "develop" is selected on this menu, the operation for displaying the detection result in the document display mode is carried out by the step 3703 of FIG. 37 just as in a case of selecting the displayed button "develop" in the sixth embodiment.

On the other hand, when the item "OK" is selected in this menu, the accept/reject data for all the detected documents contained in the specified cluster are set to 1 indicating the acceptance, whereas when the item "NG" is selected in this menu, the accept/reject data for all the detected documents contained in the specified cluster are set to 0 indicating the rejection.

On the window for the detection result display in the cluster display mode shown in FIG. 46, the small spheres representing those clusters for which the item "develop" or "OK" has been selected are shown by black spheres, while the small spheres representing those clusters for which the item "NG" has been selected are shown as white spheres, such that the state of the accept/reject data for each cluster can be indicated by the color of the small spheres representing the clusters. It is also possible to use the different concentration levels of the same color for indicating the state of the accept/reject data for each cluster. The accept/reject data entered on this window for the detection result display in the cluster display mode are subsequently transmitted to the record management unit 204 by the step 3717 of FIG. 37.

Figure 47:
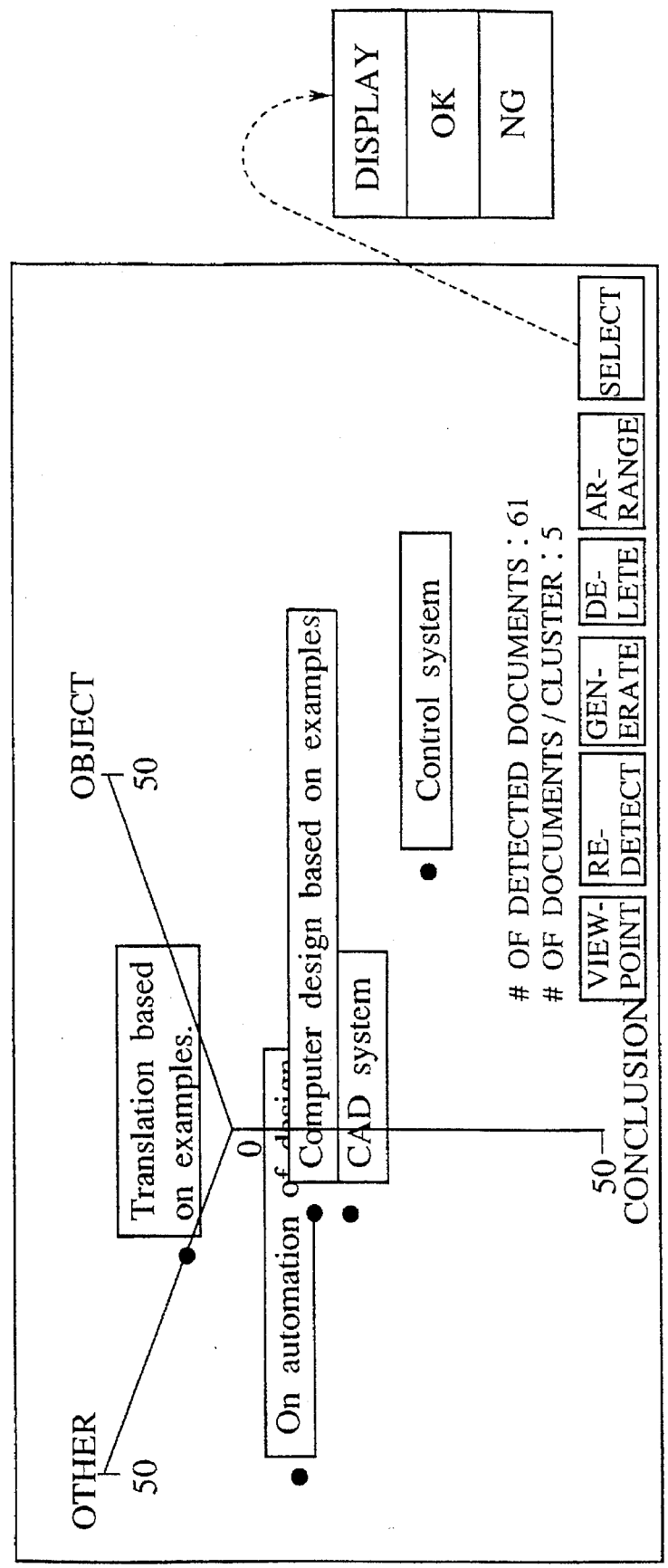
FIG. 47 is an illustration of an exemplary detection result display in a document display mode presented by the detection result display unit in the seventh embodiment of a detection system according to the present invention.

Similarly, in this seventh embodiment, the detection result display in the document display mode is given in a form shown in FIG. 47 which contains a displayed button "select" in addition to the displayed buttons contained in FIG. 42.

When this displayed button "select" is selected by the user after specifying at least one document, a menu containing items "develop", "OK", and "NG" appears as shown in FIG. 47. When the item "develop" is selected on this menu, the operation for displaying the data content of the specified document on the window for the browsing unit display is carried out by the step 3706 of FIG. 37 just as in a case of specifying the document on the window for the detection result display in the document display mode in the sixth embodiment.

On the other hand, when the item "OK" is selected in this menu, the accept/reject data for the specified detected document is set to 1 indicating the acceptance, whereas when the item "NG" is selected in this menu, the accept/reject data for the specified detected document is set to 0 indicating the rejection.

On the window for the detection result display in the document display mode shown in FIG. 47, the data points and titles representing those detected documents for which the item "develop" or "OK" has been selected are shown in black, while the data points and titles representing those detected documents for which the item "NG" has been selected are shown in white, such that the state of the accept/reject data for each detected document can be indicated by the color of the data points and titles representing the detected documents. It is also possible to use the different concentration levels of the same color for indicating the state of the accept/reject data for each detected document. The accept/reject data entered on this window for the detection result display in the document display mode are subsequently transmitted to the record management unit 204 by the step 3717 of FIG. 37.

The remaining features of this seventh embodiment are substantially identical to those of the sixth embodiment described above.

It is to be noted that the detection result displays of FIGS. 46 and 47 may be given in one or two-dimensional display instead of being in the three-dimensional display as shown. It is also possible to modify the manner of specifying the clusters and the detected documents such that the user can specify the range on the display in order to specify all the clusters or the detected documents contained within the specified range collectively.

Next, the eighth embodiment of a document detection system according to the present invention will be described in detail.

In this eighth embodiment, the manner of presenting the detection result in the sixth embodiment described above is modified as follows.

Figure 48:
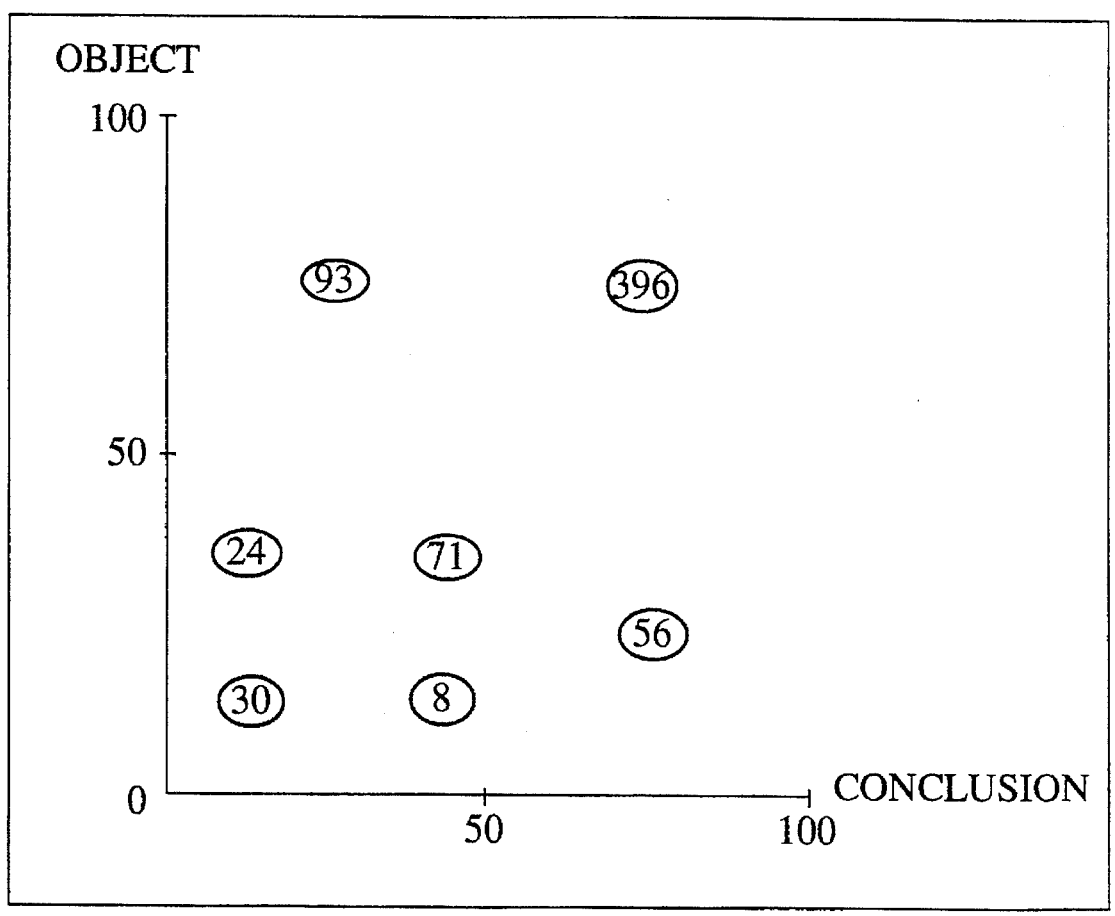
FIG. 48 is an illustration of an exemplary detection result display presented by the detection result display unit in the eighth embodiment of a detection system according to the present invention.

Namely, in this eighth embodiment, instead of presenting the detection result display in the cluster display mode given in the multi-dimensional display as in the sixth embodiment, the number of detected documents for each cluster are indicated in a form of a two-dimensional graph as shown in FIG. 48 according to the coordinate position of each cluster, and the similarities among the detected documents of each cluster in various viewpoints are indicated in a form a table shown in FIG. 49.

In FIG. 48, the numerals shown within circles representing clusters on this two-dimensional graph indicate the number of detected documents contained in the respective clusters, whereas in FIG. 49, the numerical values enlisted below each viewpoint heading indicate the similarity levels of the enlisted detected documents in each viewpoint.

Next, the ninth embodiment of a document detection system according to the present invention will be described in detail.

In this ninth embodiment, the first embodiment described above is modified to present the distribution of the documents stored in the document data memory unit 206 according to the viewpoints, by checking all the indices within the document data memory unit 206, independently from the detection operation based on the selected viewpoints extracted from the input sentences.

Namely, in this ninth embodiment, when a plurality of document data classes such as a plurality of databases are contained in the document data memory unit 206, a number of documents stored in each of these document data classes for each of the viewpoints utilized in the document data memory unit 206 is presented in a form of a table shown in FIG. 50, in which the total number of the documents as well as a number of the documents in each viewpoint including those already displayed as the detected documents are enlisted for each document data class identified by its name.

Also, whenever the document stored in the document data memory unit 206 is updated, it is possible to indicate the change of the distribution of the stored documents by updating the numbers enlisted in this table of FIG. 50.

Next, the tenth embodiment of a document detection system according to the present invention will be described in detail.

In this tenth embodiment, the detection operation and the multi-dimensional display of the detection result based on the selected viewpoints extracted from the input sentences in the first embodiment described above is modified such that the detection operation and the multi-dimensional display of the detection result can be carried out according to the numerical values such as date, price, and processing speed, which are extracted from the input sentences according to the prescribed numerical value expression extraction rules.

Figures 51, 52:
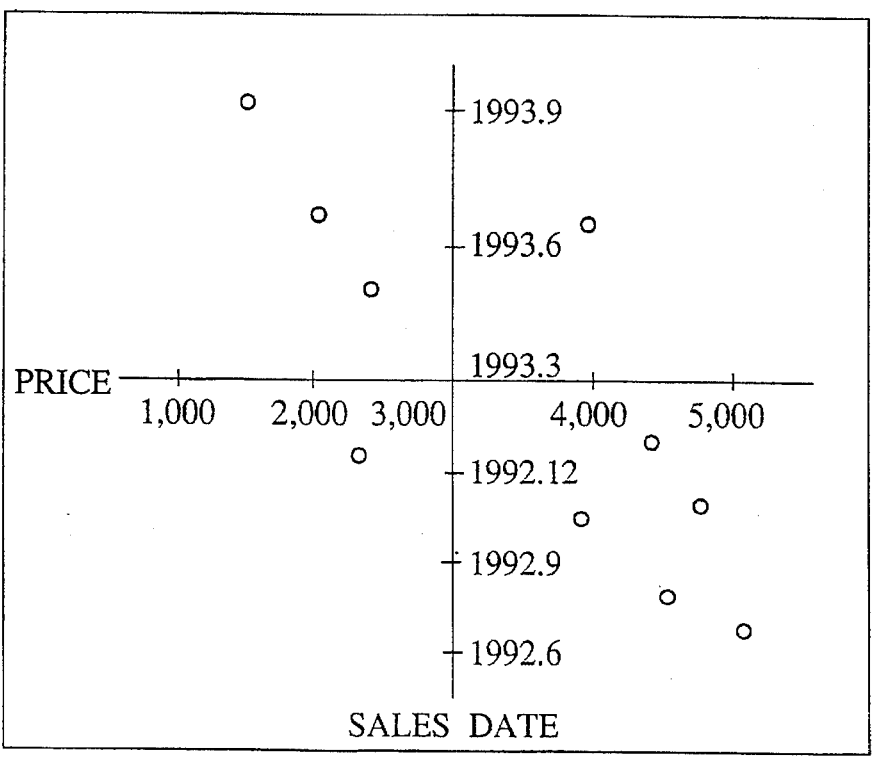
FIG. 51 is a table of exemplary numerical value expression extraction rules used in the tenth embodiment of a detection system according to the present invention.
FIG. 52 is an illustration of an exemplary detection result display presented by the detection result display unit in the tenth embodiment of a detection system according to the present invention.

Namely, in this tenth embodiment, each numerical value expression extraction rule is given in a format of:

(matching portion)→numerical value expression type as in the typical examples shown in a table of FIG. 51, in which the variables X, Y, Z represent the numerical values to be extracted.

In this case, the detection result display can be given in a form of a two-dimensional graph as shown in FIG. 52 for an exemplary case of using the numerical values of the price and the sales date of a certain product such as an IC memory for example. In this FIG. 52, the circles represent the documents such as the newspaper articles concerning the price and the sales date of each product.

Next, the eleventh embodiment of a document detection system according to the present invention will be described in detail.

In this eleventh embodiment, the sixth embodiment described above is modified such that the user can specify the range for each axis instead of specifying a small sphere or a data point or title representing the cluster or the document in the detection result display, such that the enlarged display of the specified range can be obtained.

Namely, on the original detection result display as shown in FIG. 53A which is given in the two-dimensional display in this example, the user can specify the ranges on two axes as indicated by dashed lines, and in response, the enlarged display of the data within this specified ranges as shown in FIG. 53B can be obtained.

Here, either the original detection result display of FIG. 53A is replaced by the enlarged display of FIG. 53B, or both of the original detection result display of FIG. 53A and the enlarged display of FIG. 53B can be presented together side by side.

Next, the twelfth embodiment of a document detection system according to the present invention will be described in detail.

In this twelfth embodiment, the viewpoint extraction rules used in the first embodiment described above is modified to incorporate different weight factors for different viewpoints.

Namely, in this twelfth embodiment, each viewpoint extraction rule is given in a format of:

(matching portion)→viewpoint, weight as in the typical examples shown in a table of FIG. 54.

In this case, the matrix representations Q and Di of the detection command and the document are given by the following equations (12) to (15).

$$Q = \begin{pmatrix} X1 \\ X2 \\ X3 \\ . \\ . \\ . \\ XN \end{pmatrix} \quad (12)$$

where $$Xj = \begin{pmatrix} q11 & q12 & q13 & \ldots & q1M \\ q21 & q22 & q23 & \ldots & q2M \\ q31 & q32 & q33 & \ldots & q3M \\ . & . & . & & . \\ . & . & . & & . \\ . & . & . & & . \\ qK1 & qK2 & qK3 & \ldots & qKM \end{pmatrix} \quad (13)$$

$$Di = \begin{pmatrix} Y1 \\ Y2 \\ Y3 \\ . \\ . \\ . \\ YN \end{pmatrix} \quad (14)$$

where $$Yj = \begin{pmatrix} d11 & d12 & d13 & \ldots & d1M \\ d21 & d22 & d23 & \ldots & d2M \\ d31 & d32 & d33 & \ldots & d3M \\ . & . & . & & . \\ . & . & . & & . \\ . & . & . & & . \\ dK1 & dK2 & dK3 & \ldots & dKM \end{pmatrix} \quad (15)$$

and where the j-th elements Xj and Yj at the j-th row of Q and Di in the respective equations (12) and (14) are for the j-th viewpoint, and the ij-th elements qij and dij at the i-th row and j-th column of Xj and Yj in the respective equations (13) and (15) are for the i-th keyword and the j-th weight of the detection comment and the document, respectively.

Then, the formula for calculating the distance Dist(Q, Di) between the detection command and the document is defined by the following equations (16) to (18).

$$Dist(Q, Di) = \begin{pmatrix} z1 \\ z2 \\ z3 \\ . \\ . \\ . \\ zN \end{pmatrix} \quad (16)$$

and $$zj = Func(Dist'(Xj, Yj)) \quad (17)$$

where $$Dist'(Xj, Yj) = |Xj - Yj|/M \quad (18)$$

In the above equation (18), a symbol |A| for an arbitrary matrix A represents the meaning defined by the following equation (19).

$$|A| = \begin{pmatrix} \Sigma b1m \\ \Sigma b2m \\ \Sigma b3m \\ . \\ . \\ . \\ \Sigma bKm \end{pmatrix} \quad (19)$$

where, for each element aij of the matrix A, if aij<0 then bij=−aij, and otherwise bij=aij.

Also, in the above equation (17), the function Func(C) for an arbitrary argument C is defined by the following equation.

$$Func(C) = \left( \sum_{k=1}^{K} ck \times wk \right) / \sum_{k=1}^{K} wk \quad (20)$$

where wk is a weight for ck, and ck is the k-th element of the argument C which can be expressed by the following equation (21).

$$C = \begin{pmatrix} c1 \\ c2 \\ c3 \\ . \\ . \\ . \\ cK \end{pmatrix} \quad (21)$$

In addition, in this twelfth embodiment, the user can freely register the desired viewpoint extraction rule, and change the setting of the weight factor for each viewpoint.

Namely, the registration of the viewpoint extraction rule and the changing of the weight factor for each viewpoint can be carried out as shown in FIGS. 55A to 55D.

Figure 55A:
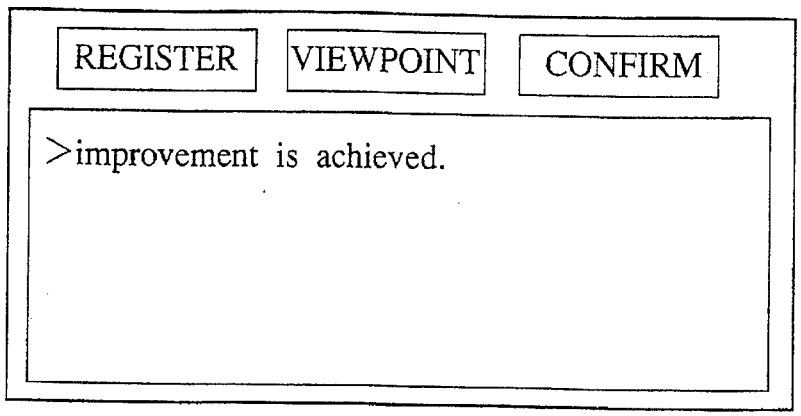
FIGS. 55A, 55B, 55C, and 55D are illustrations of windows for registering a viewpoint extraction rule in the twelfth embodiment of a detection system according to the present invention.

FIG. 55A shows a display for entering the character string for the registration of the viewpoint extraction rule, which includes displayed buttons of "register", "viewpoint", and "confirm".

Figure 55B:
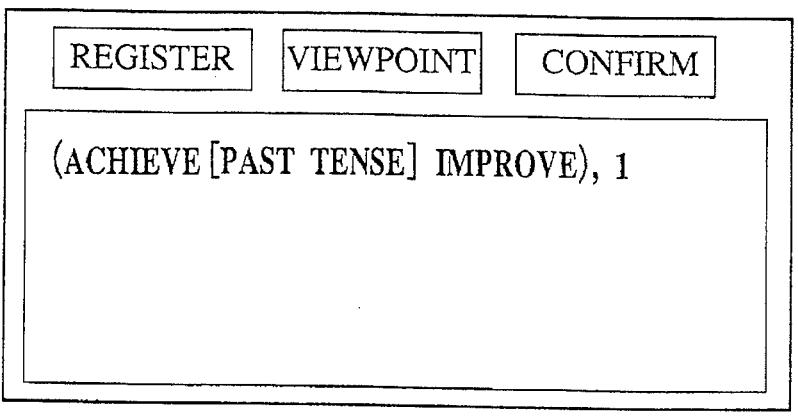

The character string entered in the display shown in FIG. 55A is then analyzed at the input analysis unit 202, to obtain the analysis result as the matching portion of the viewpoint extraction rule which is presented as shown in FIG. 55B. Here, the weight is set to an initial setting of 1.

Figure 55C:
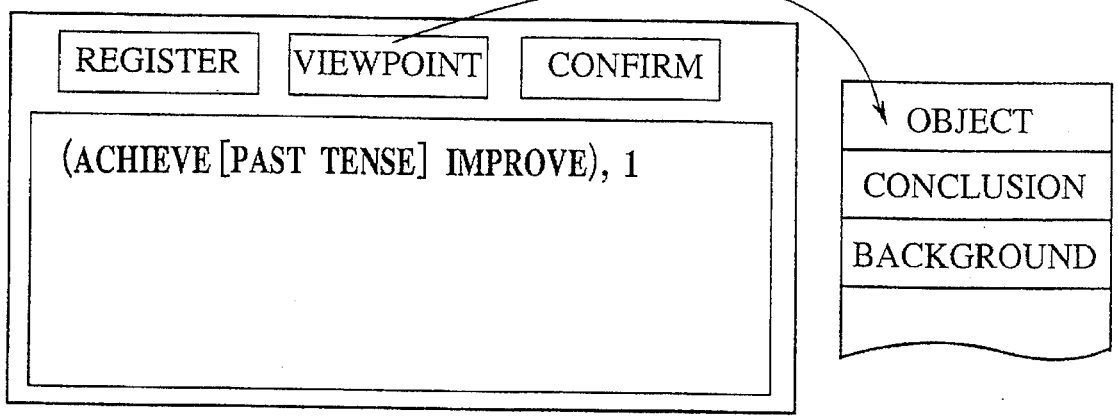

Next, when the user selects the displayed button "viewpoint", a menu enlisting all the available viewpoints appears as shown in FIG. 55C, from which the user can choose any desired viewpoint to be registered in correspondence to the displayed matching portion.

Figure 55D:
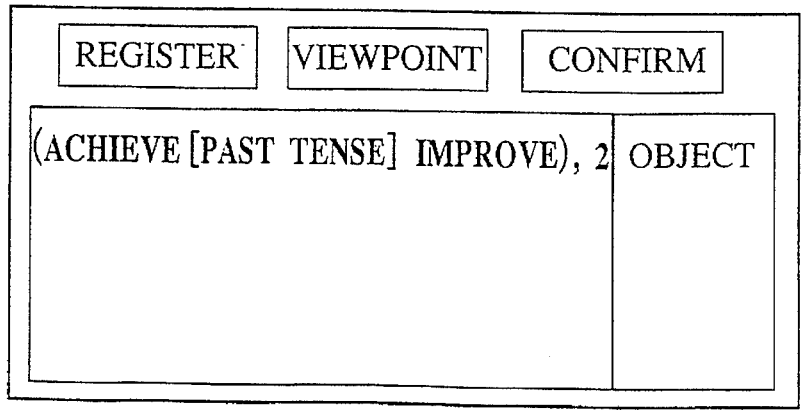

FIG. 55D shows a state in which the user has selected the viewpoint of "object" in the menu of FIG. 55C, and then changed the weight to 2 while deleting "improve" from the matching pattern. At this point, when the user selects the displayed button "confirm", the viewpoint extraction rule shown in FIG. 55D is stored in to the viewpoint extraction rule dictionary in the input analysis unit 202 to complete the registration.

Next, the thirteenth embodiment of a document detection system according to the present invention will be described in detail.

In this thirteenth embodiment, the first embodiment described above is modified such that the detection record displayed on the window for the detection record display can be edited, and the detection commands and the detection results for a plurality of specified detection records can be presented to facilitate the comparison.

Figure 56A:
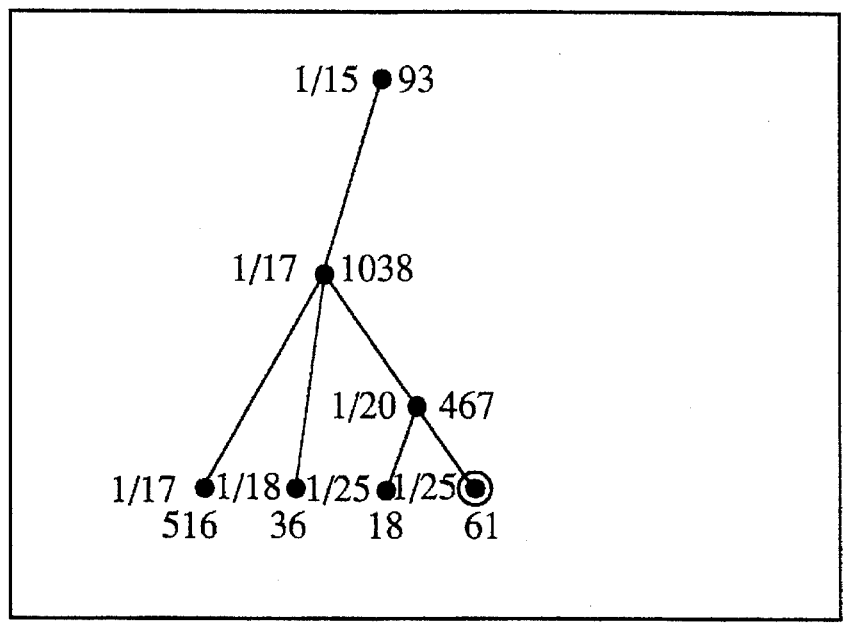
FIGS. 56A and 56B are illustrations of exemplary detection record displays presented by the detection record display unit in the thirteenth embodiment of a document detection system according to the present invention.
Figure 56B:
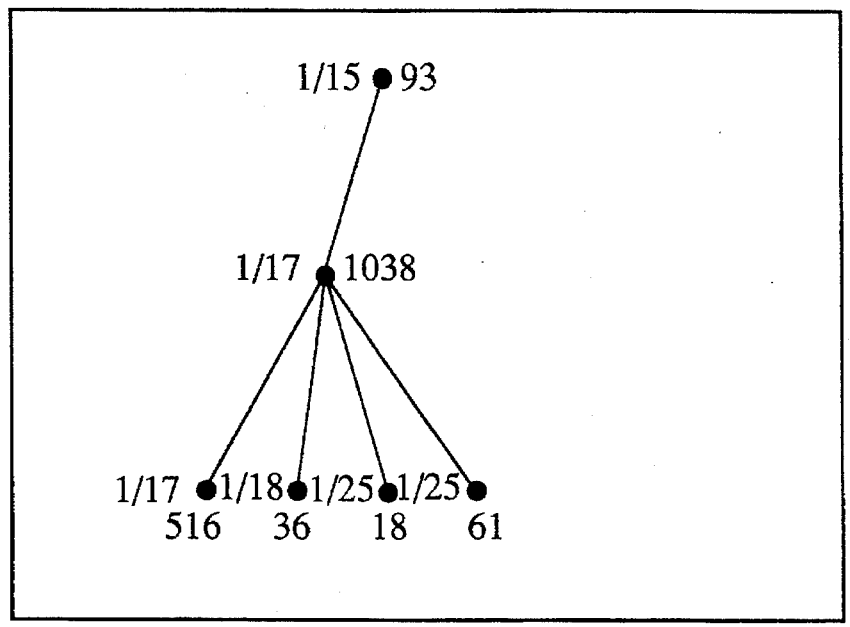

Namely, in this thirteenth embodiment, the original detection record as shown in FIG. 56A can be modified into the modified detection record as shown in FIG. 56B according to the user's input to remove one unnecessary detection node for example.

Figure 57:
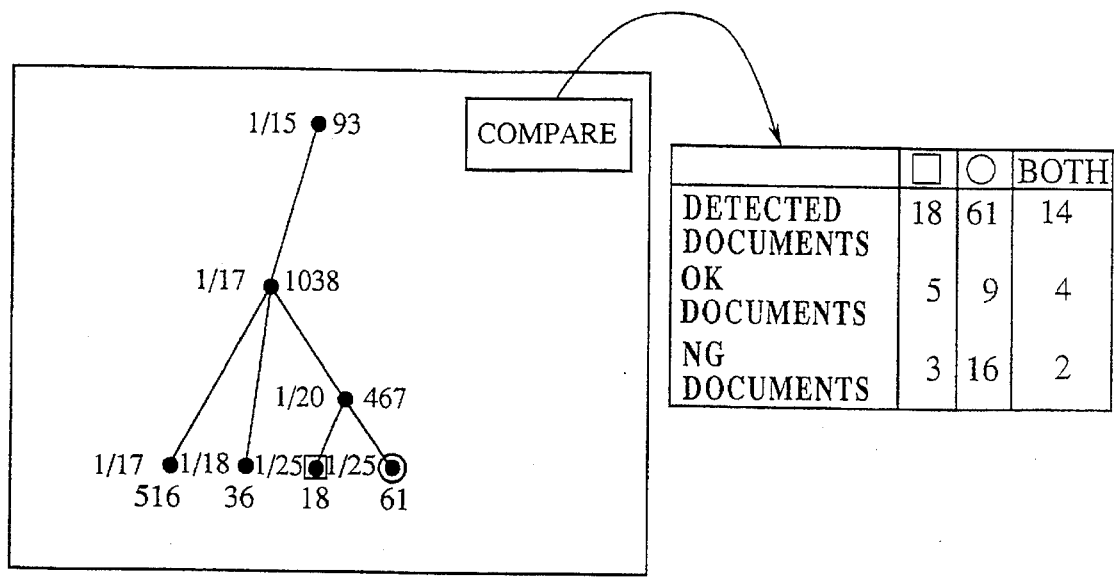
FIG. 57 is an illustration of another exemplary detection record display presented by the detection record display unit in the thirteenth embodiment of a document detection system according to the present invention.

In addition, in this thirteenth embodiment, a displayed button "comparison" is provided on the window for the detection record display as shown in FIG. 57, and when this displayed button "comparison" is selected by the user after specifying two detection nodes indicated by square and circular enclosures around the dots representing the detection nodes, the comparison data indicating the number of detected documents, the number of OK documents, and the number of NG documents for each of these detection nodes as well as the number of detected documents, the number of OK documents, and the number of NG documents common to both of these detection nodes are presented as shown in FIG. 57, so as to facilitate the comparison of these two detection nodes by the user.

Next, the fourteenth embodiment of a document detection system according to the present invention will be described in detail.

In this fourteenth embodiment, the browsing unit 209 in the first embodiment described above is modified such that document link data indicating relationships between any two documents can be set up on the window for the browsing unit display, and the set up document link data can be indicated on the browsing unit 209.

Namely, in this fourteenth embodiment, the document link data can be expressed in a format of:

<document ID (1)>; <link name>; <document ID (2)> where the link name is given by a character string such as "reference" and "original".

Figure 58:
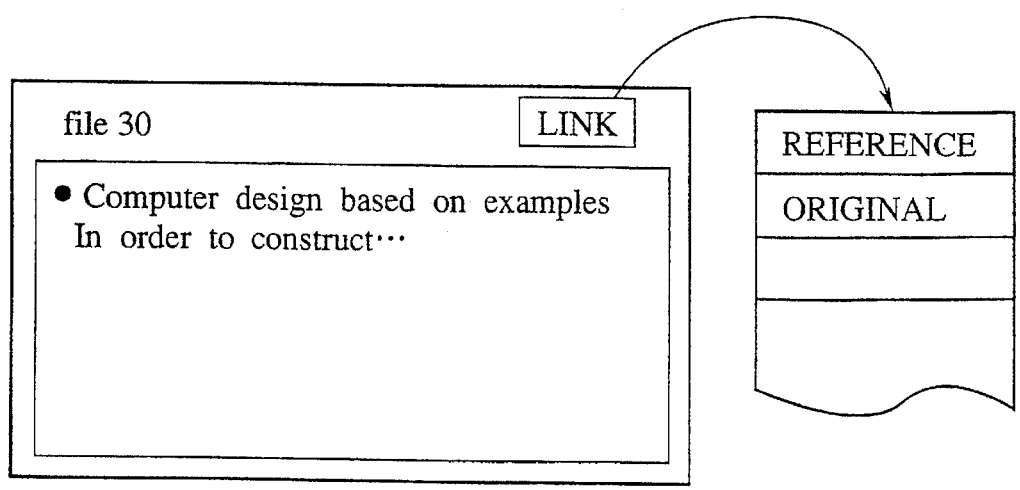
FIG. 58 is an illustration of an exemplary browsing unit display presented by the browsing unit in the fourteenth embodiment of a document detection system according to the present invention.

In this case, the window for the browsing unit display is given in an exemplary form shown in FIG. 58, on which a displayed button "link" is provided. When the user selects this displayed button "link" after specifying one window for the browsing unit display other than this one, a menu enlisting all the available link names is presented as shown in FIG. 58, from which the user can choose any desired link name appropriate for the intended relationship to be established between the document displayed on this window and the document displayed on the specified window. Then, the browsing unit 209 sets up the document link data in the above described format from the document ID of the document displayed on the specified window, the link name selected from the menu, and the document ID of the document displayed on this window.

Figure 59:
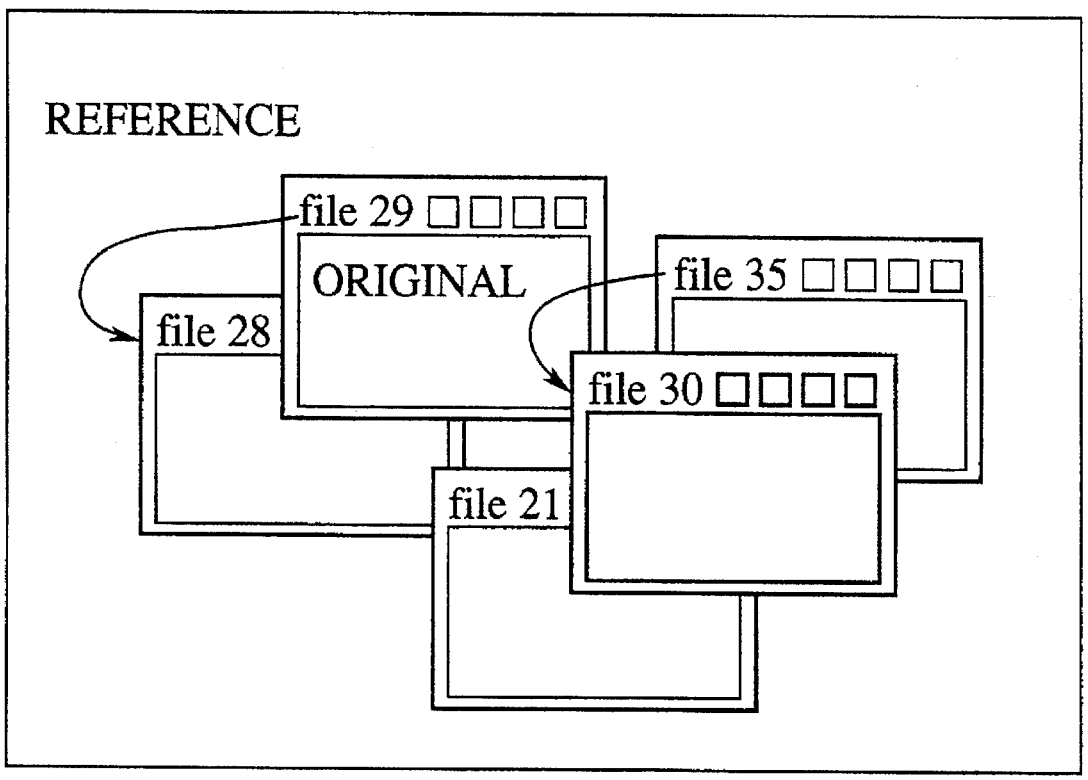
FIG. 59 is an illustration of exemplary windows for browsing unit displays presented by the browsing unit in the fourteenth embodiment of a document detection system according to the present invention.

Here, the document link data set up by the browsing unit 209 can be indicated on the windows for the browsing unit display as shown in FIG. 59 by connecting the windows displaying the linked documents by a pointer arrow.

Figure 60:
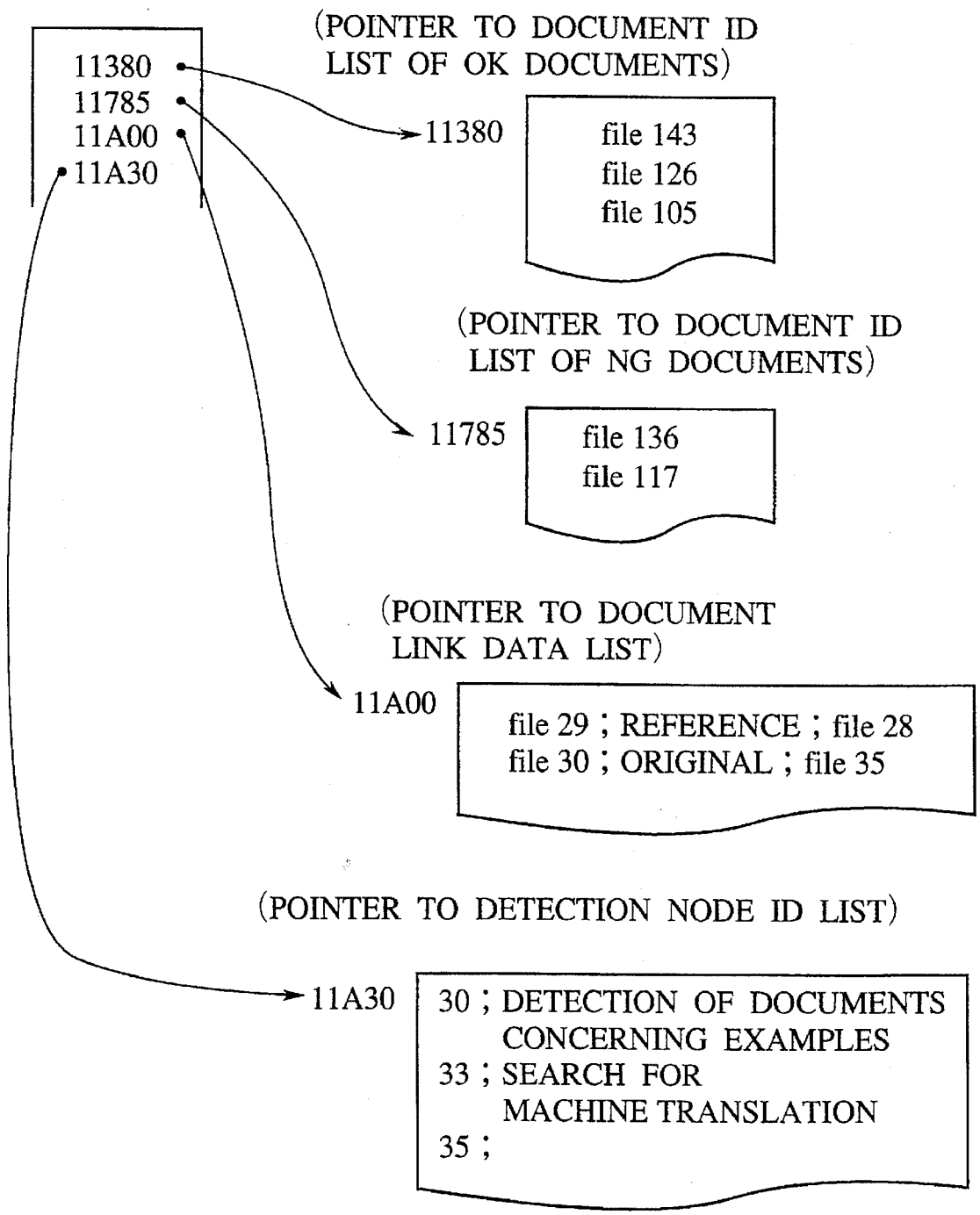
FIG. 60 is a diagrammatic illustration of a data format for the individual data used in the fourteenth embodiment of a detection system according to the present invention.

In addition, in this fourteenth embodiment, It is also possible to provide an individual data for each document in a data format shown in FIG. 60, in which pointers to document IDs of the OK documents, document IDs of the NG documents, document link data list, and detection node ID list, etc. are collectively registered. Here, it is possible to include the pointers to a part or a whole of the detection records or the detection results in this individual data. In addition, as in the detection node ID list pointed by the pointer to the detection node ID list shown in FIG. 60, it is also possible for the user to add memo to any desired part of the individual data at a time of storing this individual data.

Next, the fifteenth embodiment of a document detection system according to the present invention will be described in detail.

In this fifteenth embodiment, the detection result display in the document display mode by the detection result display unit 207 in the sixth embodiment described above is modified such that the positioning of the axes and the assignment of the viewpoint to each axis in the multi-dimensional display can be specified by the user.

Figure 61:
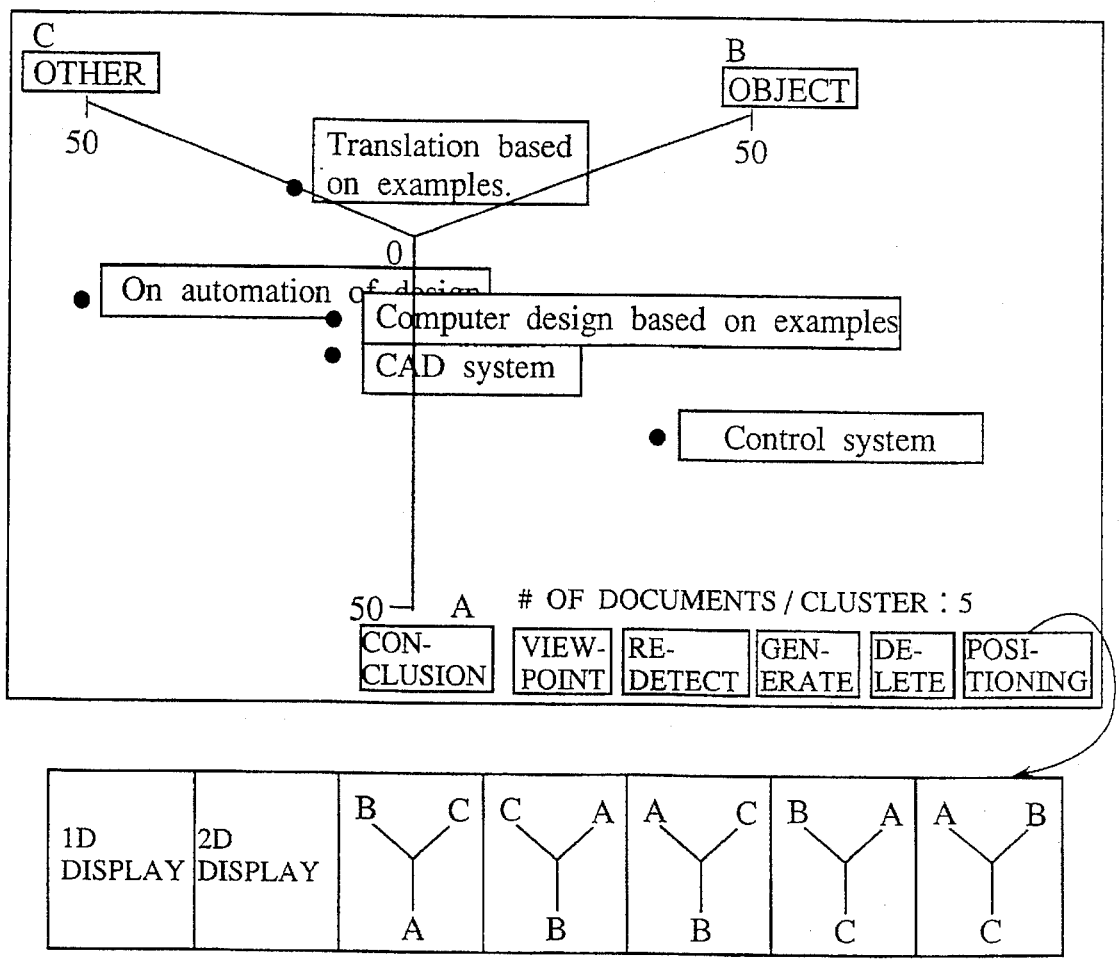
FIG. 61 is an illustration of an exemplary detection result display in a document display mode presented by the detection result display unit in the fifteenth embodiment of a detection system according to the present invention.

Namely, in this fifteenth embodiment, the window for the detection result display in the document display mode is given as shown in FIG. 61 which includes a displayed button "positioning" instead of the display button "arrange" in FIG. 42 for the sixth embodiment.

When the user selected this displayed button "positioning", a menu enlisting possible positioning patterns is presented as shown in FIG. 61, from which the user can choose any desired positioning pattern item to change the positioning of the axes in the detection result display, where "A", "B", "C" used in the menu represents the assigned viewpoints as indicated in the detection result display. This menu also includes items for the one-dimensional display and the two-dimensional display, in response to which the dimensionality of the detection result display can be changed accordingly.

Figure 62:
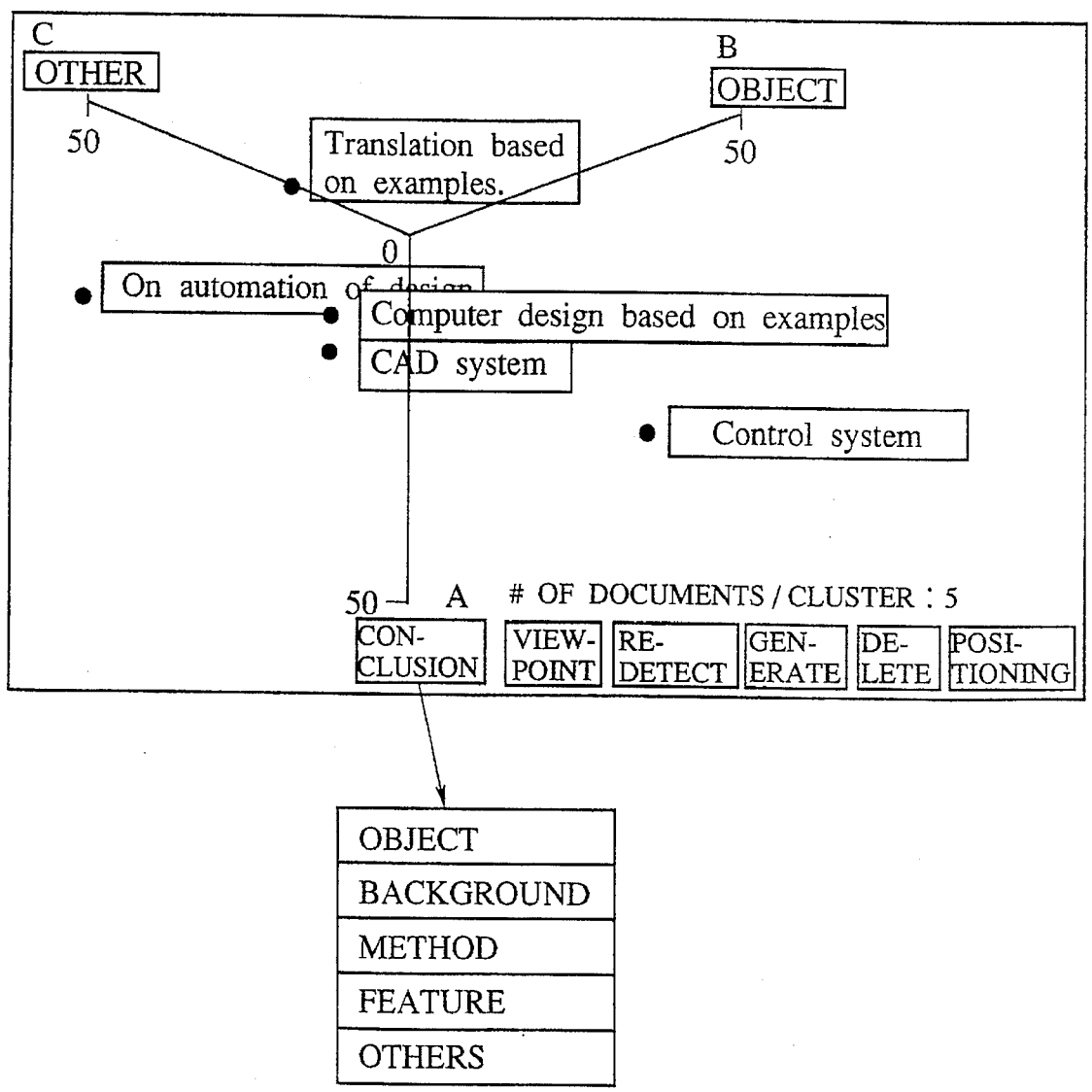
FIG. 62 is an illustration of another exemplary detection result display in a document display mode presented by the detection result display unit in the fifteenth embodiment of a detection system according to the present invention.

In addition, on the window for the detection result display in the document display mode of this fifteenth embodiment, the labels indicating the viewpoints assigned to the axes of the detection result display are also made to be displayed buttons that can be selected by the user. For example, when the user selects the displayed button "conclusion" assigned to one axis as shown in FIG. 62, a menu enlisting the other available viewpoints is presented as shown in FIG. 62, from which the user can choose any desired viewpoint to be assigned to this axis instead of the current assignment of "conclusion".

Furthermore, in this fifteenth embodiment, the adaptive learning function can be provided for the purpose of learning the viewpoint assignments and the axes positioning selected by each user, such that the same viewpoint assignments and the axes positioning preferred by each user can be resumed at a time of the subsequent detection operation by the same user automatically.

Next, the sixteenth embodiment of a document detection system according to the present invention will be described in detail.

In this sixteenth embodiment, the sixth embodiment described above is modified such that the display of the windows for the browsing unit display generated during the previous detection operations can be continued during the subsequent detection operation, while distinguishing the windows belonging to different detection operations by changing the window display manners.

Namely, in this sixteenth embodiment, the windows for the browsing unit display generated during the previous detection operations and the windows for the browsing unit display generated during the subsequent detection operation are distinguished by changing the colors or the concentration levels of the frame or background of each window according to the order of detection operations for example.

Figure 63:
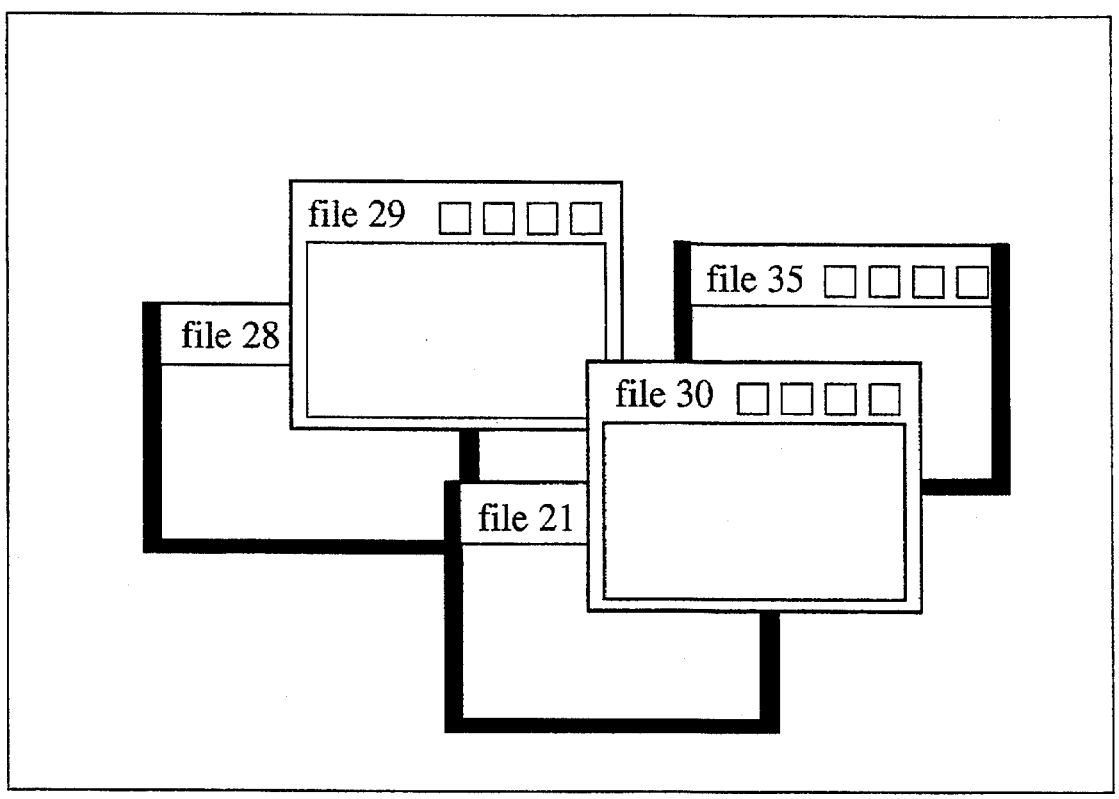
FIG. 63 is an illustration of exemplary windows for browsing unit displays presented by the browsing unit in the sixteenth embodiment of a document detection system according to the present invention.

FIG. 63 shows an exemplary state of the display of the windows for the browsing unit display in which the windows having the blackened side and lower edges belong to the previous detection operation, in contrast to the other windows belonging to the present detection operation.

It is to be noted here that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A document detection system, comprising:
   document memory means for storing a plurality of documents;
   input means for entering user's input, the user's input requesting a document detection to be carried out in the documents stored in the document memory means;
   input analysis means for analyzing the user's input entered by the input means to extract keywords and viewpoints from the user's input, each viewpoint indicating a context in which a keyword is used in the user's input, and for constructing a detection command from the keywords and the viewpoints extracted from the user's input; and
   detection means for detecting those documents stored in the document memory means which match with the detection command constructed by the input analysis means as detected documents of a detection result.

2. The system of claim 1, wherein the input analysis means extracts viewpoints relevant to a particular keyword according to prescribed viewpoint extraction rules specifying expression patterns by matching a part of the user's input containing the particular keyword with the expression patterns and extracting a viewpoint corresponding to the expression patterns as a viewpoint relevant to the particular keyword.

3. The system of claim 1, wherein the detection means detects the detected documents by searching a set of each keyword and a viewpoint relevant to said each keyword through a keyword index enlisting all keywords of the documents stored in the document memory means in relation to the viewpoints.

4. A document detection system, comprising:
   document memory means for storing a plurality of documents;
   input means for entering user's input, the user's input requesting a document detection to be carried out in the documents stored in the document memory means;
   input analysis means for analyzing the user's input entered by the input means to extract keywords and viewpoints from the user's input, each viewpoint indicating a context in which a keyword is used in the user's input, and for constructing a detection command from the keywords and the viewpoints extracted from the user's input;
   detection means for detecting those documents stored in the document memory means which match with the detection command constructed by the input analysis means as detected documents of a detection result;
   distance calculation means for calculating distances of the detected documents detected by the detection means with respect to the detection command, for each viewpoint; and
   detection result display means for presenting a detection result display indicating the detection result obtained by the detection means, in a multi-dimensional display formed by setting different viewpoints to respective axes with the detection command as an origin and using the distances of the detected documents for said each viewpoint calculated by the distance calculation means as coordinates of the detected documents with respect to each axis representing said each viewpoint.

5. The system of claim 4, further comprising:
   record management means for managing detection records each comprised of a detection command and a corresponding detection result; and
   detection record display means for presenting a detection record display indicating relations among the detection records managed by the detection record management means in a form of a tree structure in which each detection record is represented by a node in the tree structure.

6. The system of claim 5, wherein the detection record display means commands the detection result display means to present a detection result display for a detection record represented by a node specified by a user on the detection record display.

7. The system of claim 4, further comprising:
   means for entering accept/reject data for indicating an acceptance/rejection of each detected document in the detection result display, wherein the detection result display means indicates those detection documents which are accepted by the accept/reject data distinguishably from those detection documents which are rejected by the accept/reject data.

8. The system of claim 7, wherein the detection means constructs a new detection command according to the accept/reject data, and re-detects those documents stored in the document memory means which match the new detection command.

9. The system of claim 4, further comprising:
browsing means for displaying data indicative of each detected document specified by a user on the detection result display, wherein the detection result display means indicates each detected document for which the browsing means displays the data distinguishably from other detected documents on the detection result display.

10. The system of claim 9, wherein the browsing means displays at least one of a summary, a keyword list, and a viewpoint list as the data indicative of each detected document.

11. The system of claim 9, wherein the browsing means generates a window for separately displaying the data indicative of each detected document specified by the user on the detection result display, and arranges a plurality of windows for displaying the data for a plurality of the detected documents specified by the user in a desired order specified by the user.

12. The system of claim 4, wherein the detection result display means rotates the detection result display according to an input for specifying a rotation entered by a user on the detection result display.

13. The system of claim 4, wherein the detection result display means enlarges/contracts the detection result display according to an input for specifying a range in the multi-dimensional display entered by a user on the detection result display.

14. The system of claim 4, wherein the detection result display means presents the detection result display in a cluster display mode in which a multi-dimensional space of the multi-dimensional display is divided into a number of sub-spaces, and the detected documents located within each sub-space is represented collectively as a cluster.

15. The system of claim 14, wherein the detection result display means also presents the detection result display in a document display mode which includes the multi-dimensional display for only a cluster specified by a user on the detection result display in the cluster display mode.

16. The system of claim 14, wherein the detection result display means changes the detection result display in the cluster display mode according to a number of the detected documents contained in each cluster.

17. The system of claim 14, wherein the detection result display means enters accept/reject data for indicating an acceptance/rejection of all the detected documents in each cluster in the detection result display in the cluster display mode collectively.

18. A method of document detection, comprising the steps of:
analyzing a user's input for commanding a document detection to extract keywords and viewpoints relevant to each keyword from the user's input, the viewpoints each indicating a context in which said each key word is used in the user's input;
constructing a detection command from the keywords and the viewpoints extracted from the user's input at the analyzing step; and
detecting those documents among a plurality of stored documents which match with the detection command constructed at the constructing step as detected documents of a detection result.

19. A method of document detection, comprising the steps of:
analyzing a user's input for commanding a document detection to extract keywords and viewpoints relevant to each keyword from the user's input, the viewpoints each indicating a context in which said each keyword is used in the user's input;
constructing a detection command from the keywords and the viewpoints extracted from the user's input at the analyzing step;
detecting those documents among a plurality of stored documents which match with the detection command constructed at the constructing step as detected documents of a detection result;
calculating distances of the detected documents obtained at the executing step with respect to the detection command for each viewpoint; and
presenting a detection result display indicating the detection result obtained at the detecting step, in a multi-dimensional display formed by setting the viewpoints to respective axes with the detection command as an origin and using the distances of the detected commands for each viewpoint calculated at the calculating step as coordinates of the detected documents with respect to each axis representing each viewpoint.

20. The method of claim 19, wherein the presenting step presents the detection result display in a cluster display mode in which a multi-dimensional space of the multi-dimensional display is divided into a number of sub-spaces, and the detected documents located within each sub-space is represented collectively as a cluster.

21. A document detection system, comprising:
a memory storing a plurality of documents;
an input device for receiving a user command, the user command requesting a document detection in accordance with a user request;
a processing unit connected to receive the user command from the input device, wherein the processing unit
extracts one or more keywords from the user request and for each keyword determines one or more corresponding viewpoints indicating a context in which the keyword is used in the user request,
generates a detection command based on the extracted keywords and the corresponding viewpoints, and
identifies documents among the plurality of documents stored in the memory which satisfy the detection command as detected documents; and
a display device connected to the processing unit to display a representation of the detected documents as a function of the viewpoints used to generate the detection command.

* * * * *